US010996383B2

(12) United States Patent
Dal Negro et al.

(10) Patent No.: US 10,996,383 B2
(45) Date of Patent: May 4, 2021

(54) DIFFRACTIVE AXILENSES AND USES THEREOF

(71) Applicant: Trustees of Boston University, Boston, MA (US)

(72) Inventors: Luca Dal Negro, Boston, MA (US); Yuyao Chen, Boston, MA (US); Wesley Britton, Boston, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 16/870,741

(22) Filed: May 8, 2020

(65) Prior Publication Data

US 2020/0355858 A1 Nov. 12, 2020

Related U.S. Application Data

(63) Continuation of application No. 62/900,009, filed on Sep. 13, 2019.

(60) Provisional application No. 62/845,517, filed on May 9, 2019.

(51) Int. Cl.
*G02B 5/18* (2006.01)
*G02B 1/11* (2015.01)

(52) U.S. Cl.
CPC ......... *G02B 5/1857* (2013.01); *G02B 5/1814* (2013.01); *G02B 5/1828* (2013.01); *G02B 1/11* (2013.01)

(58) Field of Classification Search
CPC ...... G02B 5/18; G02B 5/1857; G02B 5/1814; G02B 5/1828; G02B 5/02; G02B 5/021; G02B 5/0257; G02B 5/0263; G02B 5/0278; G02B 1/00; G02B 1/002; G02B 1/11; G02B 27/0075; G02B 27/44; G02C 7/06; G02C 7/04; G02C 7/041
USPC ....... 359/564–566, 568, 569, 575, 576, 581, 359/589; 351/159.11, 159.12, 159.14, 351/159.15
See application file for complete search history.

(56) References Cited

U.S. PATENT DOCUMENTS 5,257,132 A * 10/1993 Ceglio ................... G02B 5/188
359/565
5,422,746 A 6/1995 Aharoni
5,581,405 A 12/1996 Meyers
6,341,036 B1 1/2002 Tearney
(Continued)

OTHER PUBLICATIONS

Moustakas, T.D., "Sputtered hydrogenated amorphous silicon," Journal of Electronic Materials 8, 391-435 (1979).
(Continued)

*Primary Examiner* — Jie Lei
(74) *Attorney, Agent, or Firm* — Nixon Peabody LLP

(57) ABSTRACT

An optical element includes a substrate and a pattern. The substrate has a top surface and a bottom surface. The pattern is provided on the top surface. The pattern includes multiple levels such that a thickness of the pattern is less than a design wavelength. The pattern is configured to focus an incident radiation, received at one of the top surface or the bottom surface of the substrate, at one or more prescribed focal locations on a detection plane. The one or more prescribed focal locations on the detection plane changes in proportion to a wavelength of the incident radiation. The detection plane is an achromatic focal plane when the incident radiation includes multiple wavelengths.

28 Claims, 40 Drawing Sheets

(56) References Cited

U.S. PATENT DOCUMENTS

| | | | |
|---|---|---|---|
| 6,469,822 | B1 | 10/2002 | Zhu |
| 6,781,756 | B1 * | 8/2004 | Ishii .................... G02B 5/1866 359/566 |
| 2005/0073746 | A1 | 4/2005 | Kleemann |
| 2005/0207315 | A1 | 9/2005 | Nomura |
| 2007/0070276 | A1 | 3/2007 | Tan |
| 2009/0225796 | A1 | 9/2009 | Kato |
| 2011/0300490 | A1 | 12/2011 | Rachet |
| 2013/0266326 | A1 | 10/2013 | Joseph |
| 2014/0327966 | A1 | 11/2014 | Tani |
| 2014/0361270 | A1 | 12/2014 | Cui |
| 2015/0261008 | A1 | 9/2015 | Fujii |
| 2018/0088440 | A1 | 3/2018 | Gladnick |

OTHER PUBLICATIONS

Rivolta, C., "Airy disk diffraction pattern: comparison of some values of f/no. and obscuration ratio," Applied Optics 25, 2404-2408 (1986).
Swanson, G.J., "Binary optics technology: the theory and design of multi-level diffractive optical elements," Tech. Rep. (Massachusetts Inst. of Tech. Lexington Lincoln Lab, 1989).
Vasara, A. et al., "Realization of general non-diffracting beams with computer-generated holograms," JOSA A 6, 1748-1754 (1989).
Davidson, N. et al, "Holographic axilens: high resolution and long focal depth," Opt. Letters 16, 523-525 (1991).
Davies, N.A. et al., "Design and analysis of an image transfer system using microlens arrays," Optical Engineering 33, 3624-3634 (1994).
Fleming, M.B. & Hutley, M.C., "Blazed diffractive optics," Applied Optics 36, 4635-4643 (1997).
Jansen, H. et al., "Bsm 7: Rie lag in high aspect ratio trench etching of silicon," Microelectric Engineering 35, 45-50 (1997).
Kasischke, E.S. et al., "The use of imaging radars for ecological applications review," Remote Sensing of Environment 59, 141-156 (1997).
Nussbaum, P.H. et al., "Design, fabrication and testing of microlens arrays for sensors and microsystems," Pure and Applied Optics: Journal of the European Optical Society Part A 6, 617 (1997).
Pawlowski, E. & Engel, H., "Multilevel diffractive optical elements fabricated with a single amplitude-phase mask," Pure Appl. Opt. J. Eur. Opt. Soc. Part A 6, 655 (1997).
Bewersdorf, J. et al., "Multi-focal multiphoton microscopy," Optics Letters 23, 655-657 (1998).
Lalanne, P. et al., "Design and fabrication of blazed binary diffractive elements with sampling periods smaller than the structural cutoff," JOSA A 16, 1143-1156 (1999).
Chen, S. et al., "Monolithic integration technique for microlens arrays with infrared focal plane arrays," Infrared Physics and Technology 43, 109-112 (2002).
Chao, D. et al., "Immersion zone-plate-array lithography," Journal of Vacuum Science & Technoloy B: Microelectronics and Nanometer Structures Processing, Measurement, and Phenomena 23, 2657-2661 (2005).
Golub, M.A. & Friesem, A.A., "Analytic design and solutions for resonance domain diffractive optical elements," JOSA A 24, 687-695 (2007).
Krishna, S. et al., "Quantum dot based infrared focal plane arrays," Proc. IEEE 95, 1838-1853 (2007).
Zhang, X. & Liu, Z., "Superlenses to overcome the diffraction limit," Nature Materials 7, 435-441 (2008).
Stiff-Roberts, A.D., "Quantum-dot infrared photodetectors: a review," Journal of Nanophotonics 3: 031607 (2009).
Gunapala, S.D. et al., "Demonstration of megapixel dual-band qwip focal plane array," IEEE Journal of Quantum Electronics 46, 285-293 (2010).
Mahler, L. et al., "Quasi-periodic distributed feedback laser," Nature Photonics, 4(3): 165 (2010).

Trevino, J. et al., "Circularly Symmetric LightScattering from Nanoplasmonic Spirals," Nano Letters, 11(5): 2008-2016, Apr. 5, 2011.
Noh, H. et al., "Lasing in Thue-Morse structures with optimized aperiodicity," Applied. Physics Letters, 98(20): 201109, May 2011.
Blanchard, R. et al., "Gratings with an aperiodic basis: single-mode emission in multi-wavelength lasers." New Journal of Physics, 13(11): 113023 (2011).
Hoover, E.E. et al., "Remote focusing for programmable multi-layer differential multiphoton microscopy," Biomedical Optics Express 2, 113-122 (2011).
Yu, N. et al., "Light propagation with phase discontinuities: generalized laws of reflection and refraction," Science 334, 333-337 (2011).
Dal Negro, L. & Borsikina, S., "Deterministic aperiodic nanostructures for photonics and plasmonics applications," Laser & Photonics Review, 6(2): 178-218, Apr. 2012.
Forestiere, C. et al., "Genetically Engineered Plasmonic Nanoarrays," Nano Letters 12, 2037-2044, Mar. 1, 2012.
Pecora, E.F. et al., "Nanopatterning of silicon nanowires for enhancing visible photoluminescence," Nanoscale 4, 2863-2866, Mar. 2, 2012.
Dal Negro, L. et al., "Analytical light scattering and orbital angular momentum spectra of arbitrary Vogel spirals," Optics Express, 20(16): 18209-18223, Jul. 30, 2012.
Lawrence, N. et al., "Control of optical orbital angular momentum by Vogel spiral arrays of metallic nanoparticles," Optics Letters, 37(24): 5076-5078, Dec. 15, 2012.
Jian-Hua, Y. et al., "Design and fabrication of novel microlensmicromirrors array for infrared focal plane array," Microw. Opt. Technol. Lett. 54, 879-884 (2012).
Rogers, E.T.F. et al., "A super-oscillatory lens optical microscope for subwavelength imaging," Nature Materials, 11(5): 432 (2012).
Trevino, J. et al., "Plasmonic-photonic arrays with aperiodic spiral order for ultra-thin film solar cells," Optics Express, 20(3): A418-A430 (2012).
Zheludev, N.I. & Kivshar, Y.S., "From meta-materials to metadevices," Nature Materials 11, 917-924 (2012).
Kildishev, A.V. et al., "Planar photonics with metasurfaces," Science 339: 1232009 (2013).
Redding, B. et al., "Compact spectrometer based on a disordered photonic chip," Nature Photonics, 7(9): 746 (2013).
Vijayakumar, A. & Bhattacharya, S., "Quasi-achromatic Fresnel zone lens with a ring focus," Applied Optics, 53(9): 1970-1974, Mar. 20, 2014.
Bai, J. et al., "Performance optimization of insb infrared focal-plane arrays with diffractive microlenses," J. Eletronic Materials 43, 2795-2801 (2014).
Lin, D. et al., "Dielectric gradient metasurface optical elements," Science 345, 298-302 (2014).
Lu, G. & Baowei, F., "Medical hyperspectral imaging: a review," Journal of Biomedical Optics 19: 010901 (2014).
Metcalf, B.J. et al., "Quantum teleportation on a photonic chip," Nature Photonics, 8(10): 770 (2014).
Yu, N. & Capasso, F., "Flat optics with designer metasurfaces," Nature Materials 13, 139-150 (2014).
Akin, O. & Demir, H.V., "Mid-wave infrared metasurface microlensed focal plane array for optical crosstalk suppression," Optics Express 23, 27020-27027 (2015).
Arbabi, A. et al., "Subwavelength-thick lenses with high numerical apertures and large efficiency based on high-contrast transmitarrays," Nat. Communications 6, 7069 (2015).
Carolan, J. et al., "Universal linear optics," Science, 349(6249): 711-716 (2015).
Chen, X. et al., "Longitudinal multifoci metalens for circularly polarized light," Advanced Optical Materials, 3(9): 1201-1206 (2015).
Koenderink, A.F. et al., "Nanophotonics: shrinking light-based technology," Science 348, 516-521 (2015).
Vijayakumar, A. et al., "Conical Fresnel zone lens for optical trapping," Int. Conf. on Opt. Photonics 2015, 9654 (2015).
Wang, W. et al., "Polarization-independent longitudinal multifocusing metalens," Optics Express, 23(23): 29855-29866 (2015).

(56) References Cited

OTHER PUBLICATIONS

Zheng, G. et al., "Metasurface holograms reaching 80% efficiency," Nat. Nanotechnology 10, 308 (2015).
Khorasaninejad, M. et al., "Metalenses at visible wavelengths: Diffraction-limited focusing and subwavelength resolution imaging," Science, 352(6290): 1190-1194, Jun. 3, 2016.
Allen, K.W. et al., "Increasing sensitivity and angle-of-view of mid-wave infrared detectors by integration with dielectric microspheres," Applied Physics Letters 108: 241108 (2016).
Arbabi, E. et al., "Multiwavelength polarization-insensitive lenses based on dielectric metasurfaces with meta-molecules," Optica 3, 628-633 (2016).
Hu, X. et al., "Metamaterial absorber integrated microfluidic terahertz sensors," Laser & Photonics Reviews, 10(6):962-969 (2016).
Kamali, S.M. et al., "Highly tunable elastic dielectric metasurface lenses," Laser & Photonics Reviews 10, 1002-1008 (2016).
Khorasaninejad, M. et al., "Multispectral chiral imaging with a metalens," Nano Letters 16, 4595-4600 (2016).
Khorasaninejad, M. et al., "Polarization-insensitive metalenses at visible wavelengths," Nano Letters 16, 7229-7234 (2016).
Kuznetsov, A.I. et al., "Optically resonant dielectric nanostructures," Science 354: aag2472 (2016).
Zhan, A. et al., "Low-contrast dielectric metasurface optics," ACS Photonics 3, 209-214 (2016).
Lin, D. et al., "Optical metasurfaces for high angle steering at visible wavelengths," Scientific Reports, 7(1), May 2017.
Choi, K. et al., "Resonant detectors and focal plane arrays for infrared detection," Infrared Physics and Technology 84, 94-101 (2017).
Genevet, P. et al., "Recent advances in planar optics: from plasmonic to dielectric metasurfaces," Optica 4, 139-152 (2017).
Lalanne, P. & Chavel, P., "Metalenses at visible wavelengths: past, present, perspectives," Laser & Photonics Reviews 11: 1600295 (2017).
Williams, C. et al., "Plasmonic metalens for narrowband dual-focus imaging," Advanced Optical Materials 5: 1700811 (2017).
Yuan, G.H. et al., "Achromatic super-oscillatory lenses with sub-wavelength focusing," Light Sci. & Appl. 6: e17036 (2017).
Zhu, A.Y. et al., "Traditional and emerging materials for optical metasurfaces," Nanophontics 6, 452-471 (2017).
Wang, R. et al., "Spectral statistics and scattering resonances of complex primes arrays," Physical Review B, 97(2): 024202, Jan. 16, 2018.
Jang, M. et al., "Wavefront Shaping with Disorder-Engineered Metasurfaces," Nature Photonics, 12(2): 84-90, Feb. 1, 2018.
Paniagua-Dominguez, R. et al., "A Metalens with a Near-Unity Numerical Aperture," Nano Letters, 18(3): 2124-2132, Feb. 27, 2018.
Chen, W.T. et al., "A broadband achromatic metalens for focusing and imaging in the visible," Nature Nanotechnology 13, 220-226, Mar. 2018.
Zhang, S. et al., "Solid-immersion metalenses for infrared focal plane arrays," Applied Physics Letters 113: 11104, Sep. 11, 2018.
Capasso, F., "The future and promise of flat optics: a personal perspective," Nanophotonics 7, 953-957 (2018).
Cheben, P. et al., "Subwavelength integrated photonics," Nature, 560(7720): 565-572 (2018).
Gorsky, S. et al., Directional light emission enhancement from led-phosphor converters using dielectric vogel spiral arrays, APL Photonics, 3(12):126103 (2018).
Kim, J. et al., "Calculation of vectorial diffraction in optical systems," JOSA A 35, 526-535 (2018).
Lutz, H. et al., "Towards ultra-small pixel pitch cooled mw and lw ir-modules, Infrared Technology and Applications XLIV, vol. 10624 (International Society for Optics and Photonics, 2018). p. 106240B.
Mohammad, N. et al., "Broadband imaging with one planar diffractive lens," Scientific Reports 8, 1-6 (2018).
Romagnoli, M. et al., "Graphene-based integrated photonics for next-generation Datacom and telecom," Nature Reviews Materials, 3(10): 392-414 (2018).
She, A. et al., "Large area metalenses: design, characterization, and mass manufacturing," Optics Express, 26(2): 1573-1585 (2018).
Shrestha, S. et al., "Broadband achromatic dielectric metalenses," Light Sci. & Appl. 7, 85 (2018).
Zhu, A.Y. et al., "Compact aberration-corrected spectrometers in the visible using dispersion tailored metasurfaces," Advanced Optical Materials, 1801144 (2018).
Banerji, S. et al., "Imaging with flat optics: metalenses or diffractive lenses?" Optica 6, 805-810 (2019).
Boschetti, A. et al., "Spectral super-resolution spectroscopy using a random laser," Nature Photonics, 1-6 (2019).
Chen, W.T. et al., "A broadband achromatic polarization-insensitive metalens consisting of anisotropic nanostructures," Nat. Commun. 10. 355 (2019).
Gorsky, S. et al., "Engineered hyper-uniformity for directional light extraction," APL Photonics, 4(11):110801 (2019).
Shimoni, M. et al., "Hyperspectral imaging for military and security applications: Combining myriad processing and sensing techniques," IEEE Geoscience and Remoted Sensing Magazine 7, 101-117 (2019).
Tang, X. et al., "Dual-band infrared imaging using stacked colloidal quantum dot photodiodes," Nature Photonics 13, 277 (2019).
Tian, S. et al., "Dielectric longitudinal bifocal metalens with adjustable intensity and high focusing efficiency," Optics Express, 27(2): 680-688 (2019).
Beaulieu, D.R. et al., "Simultaneous multiplane imaging with reverberation two-photon microscopy," Nature Methods 17, 283-286 (2020).
Britton, W.A. et al., "Compact dual-band multi-focal diffractive lenses," arXiv:2004.08670 (2020).
Britton, W.A. et al., "Phase-modulated axilenses as ultra-compact spectroscopic tools," arXiv:2003.08012 (2020).
Chen, Y. et al., "Phase-modulated axilenses for infrared multi-band imaging and spectroscopy," Journal of Optics (2020).
Chen, Y. et al., "Infrared microspectrometers based on phase-modulated axilenses," Boston University (2020).
Chen, Y. et al., "Phase-modulated axilenses for infrared multiband spectroscopy," Optics Letters, 45(8): 2371-2374 (2020).
Dal Negro, L. et al., "Structured photonic surfaces for imaging and spectroscopy," Boston University (2020).
Kwon, H. et al., "Single-shot quantitative phase gradient microscopy using a system of multifunctional metasurfaces," Nature Photonics 14, pp. 109-114 (2020).
Holoor, "Multi-Focal Brochure," available online: https://www.holoor.co.il/wp-content/uploads/2018/03/Multi-focal-brochure-1.pdf?x35309.
International Search Report and Written Opinion of International Searching Authority for Application No. PCT/US2020/032199, dated Oct. 30, 2020 (15 pages).

* cited by examiner

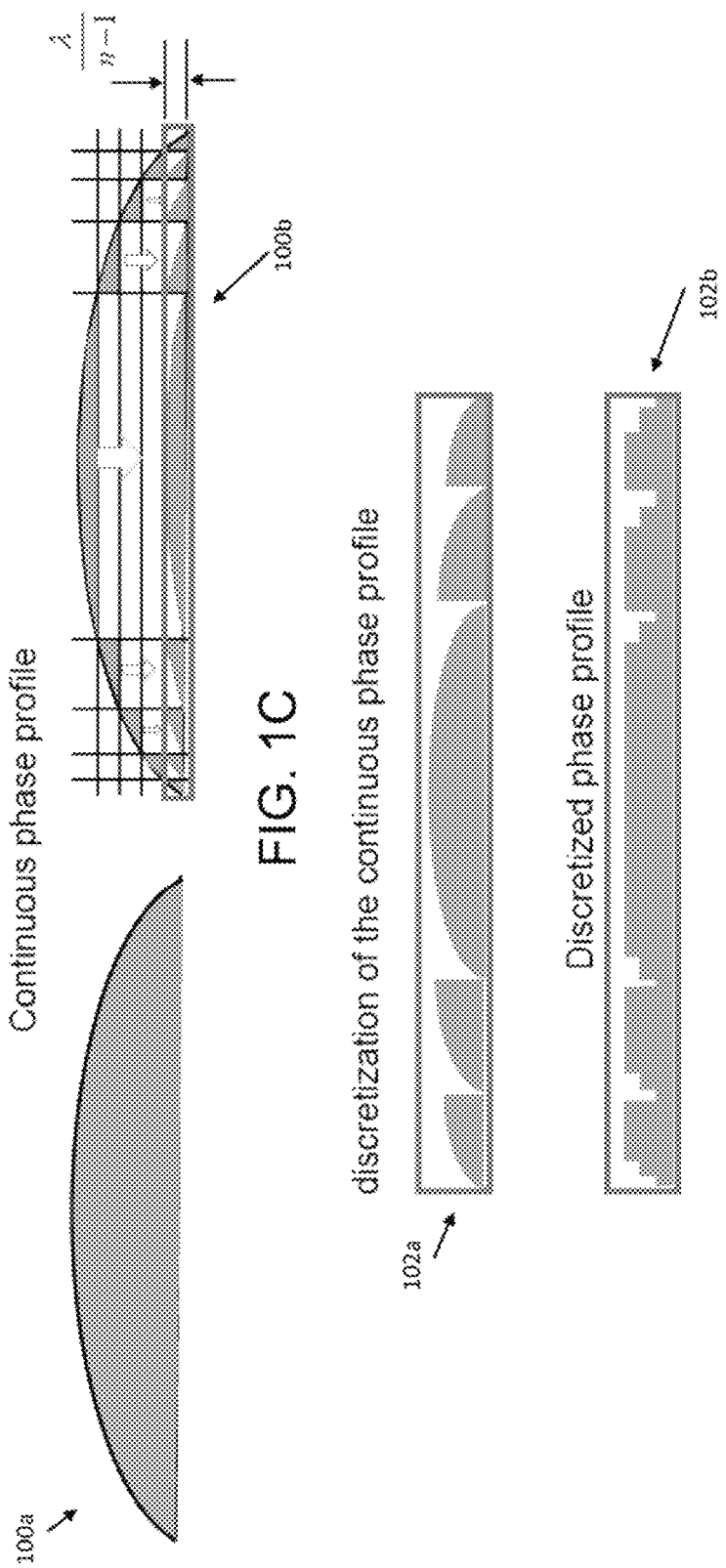

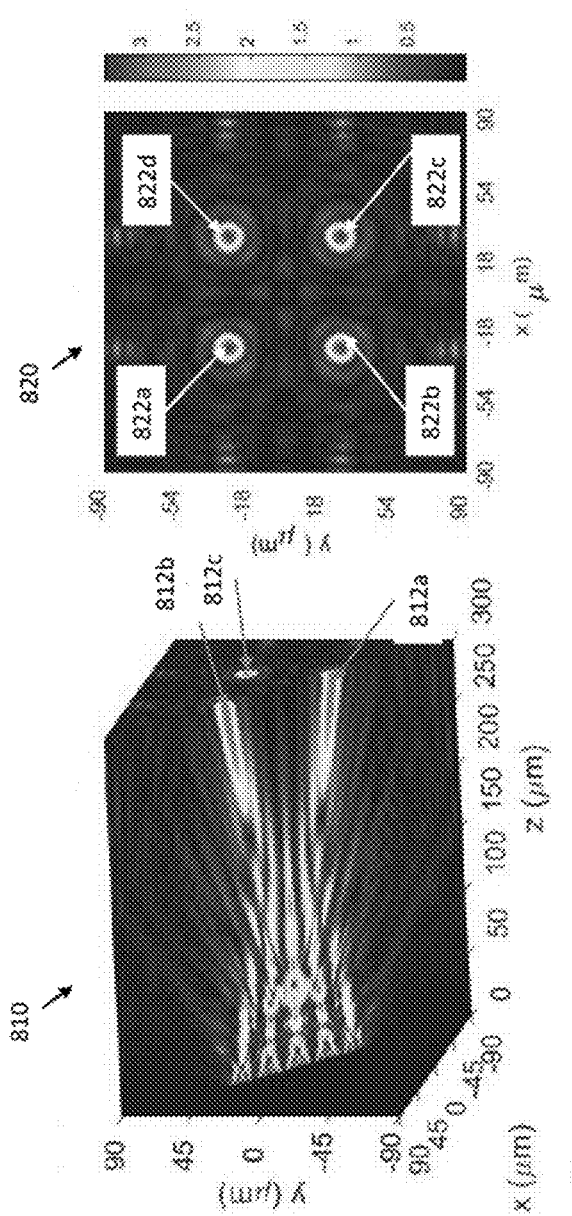
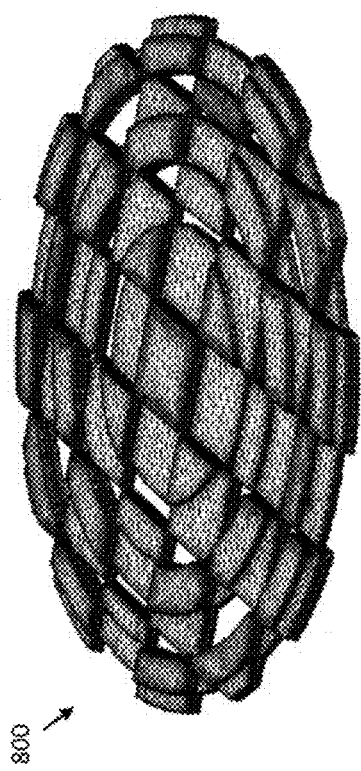
FIG. 8C
FIG. 8B
FIG. 8D

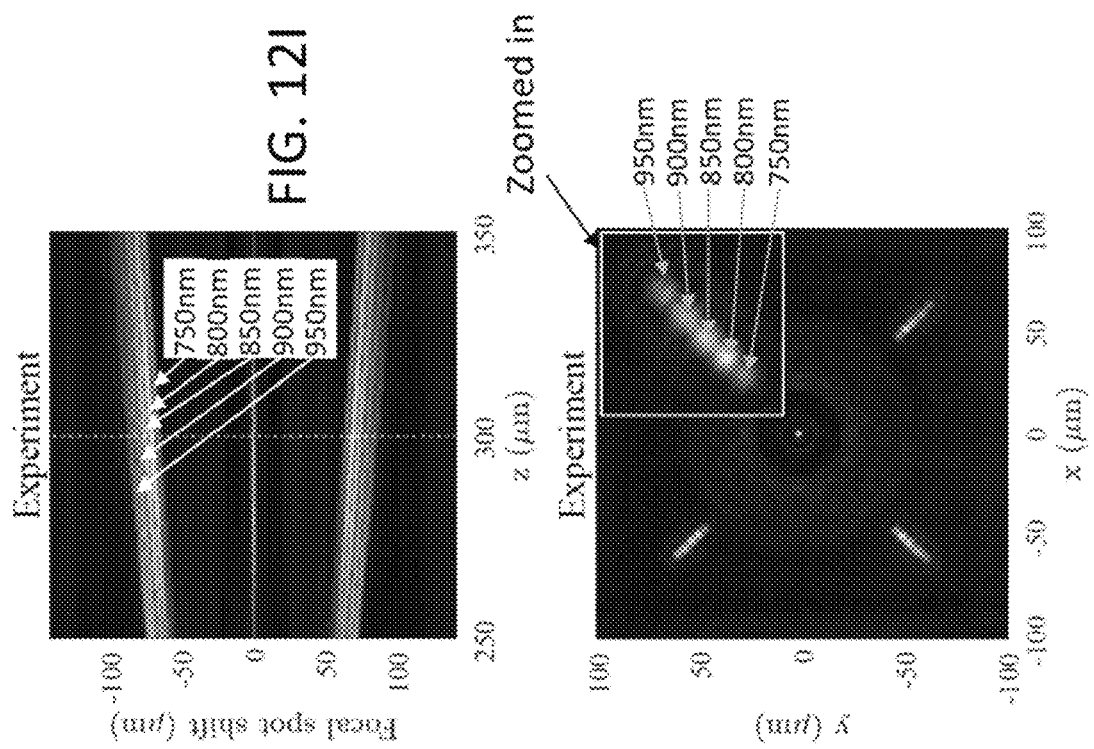
FIG. 12I
FIG. 12J
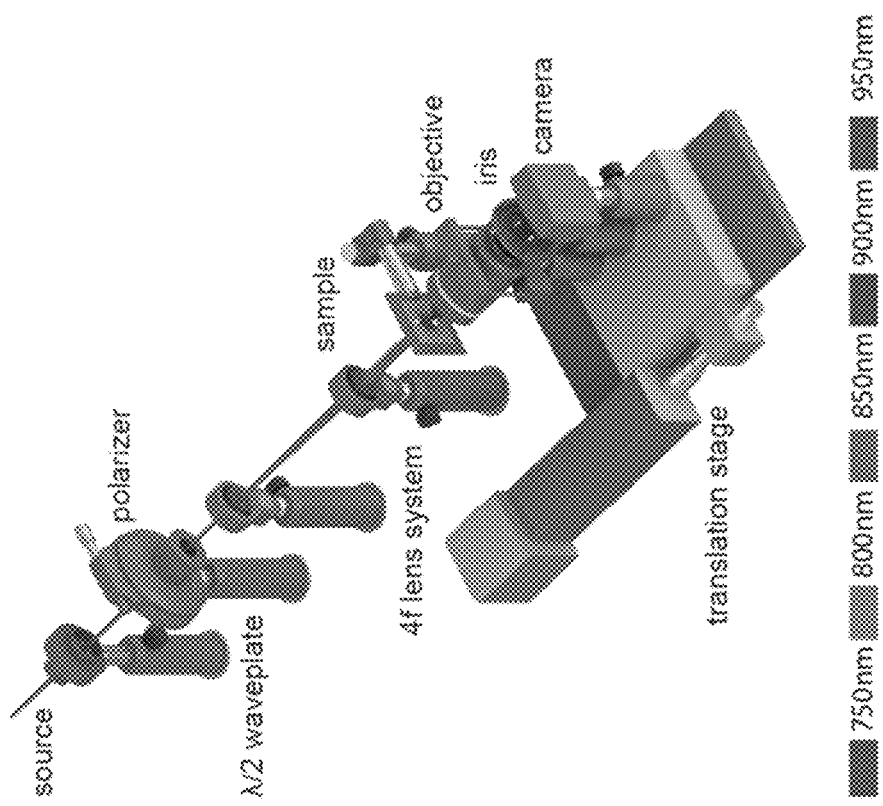
FIG. 12H

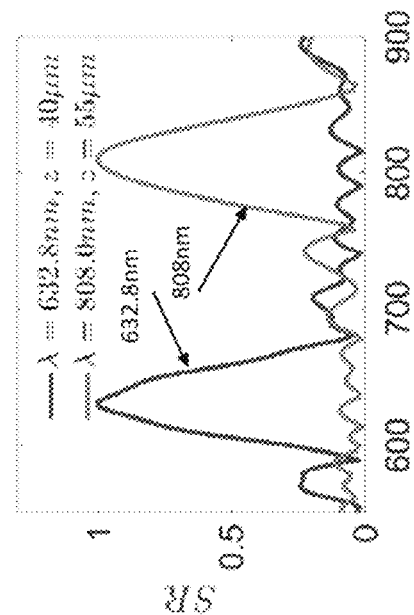
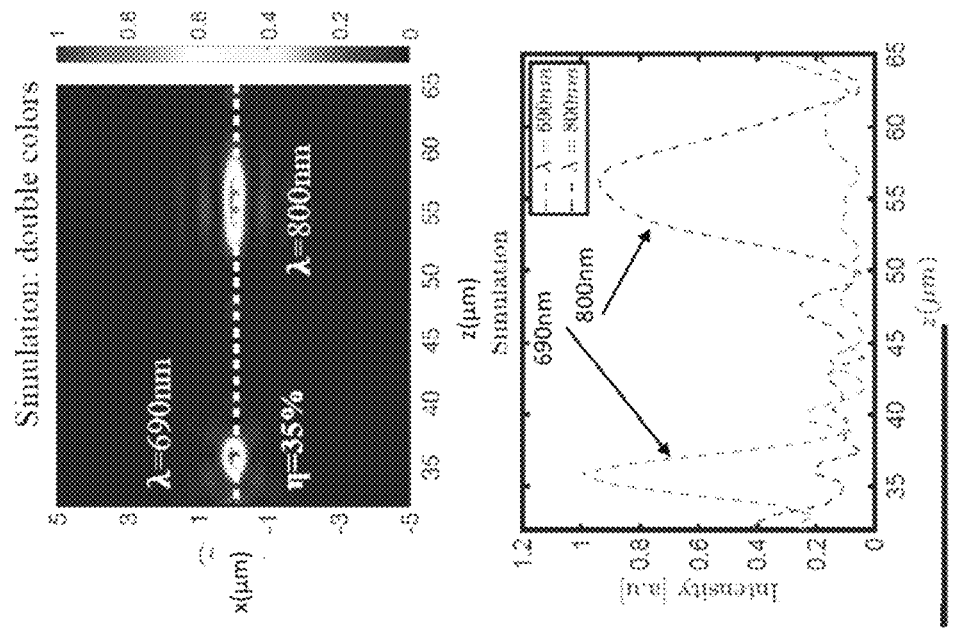
FIG. 15A
FIG. 15B
FIG. 15C

FIG. 15D
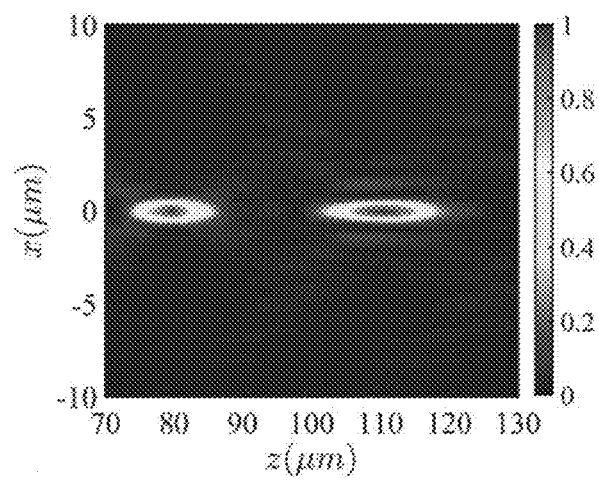
FIG. 15E
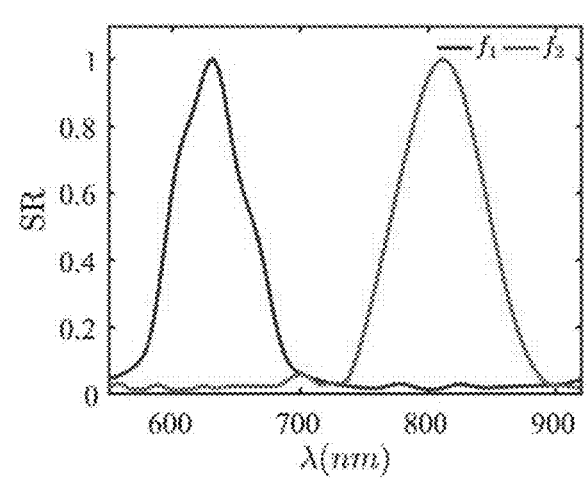
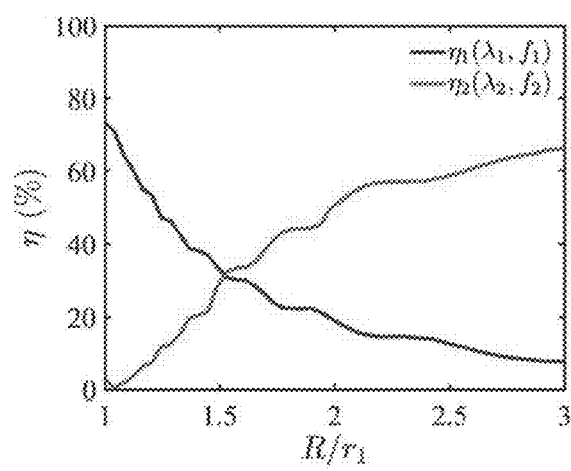
FIG. 15F
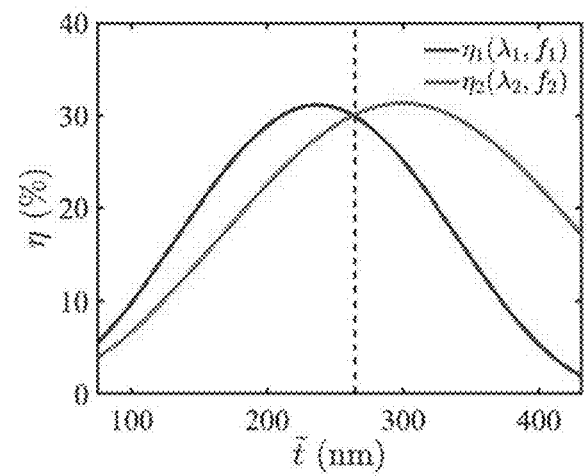
FIG. 15G
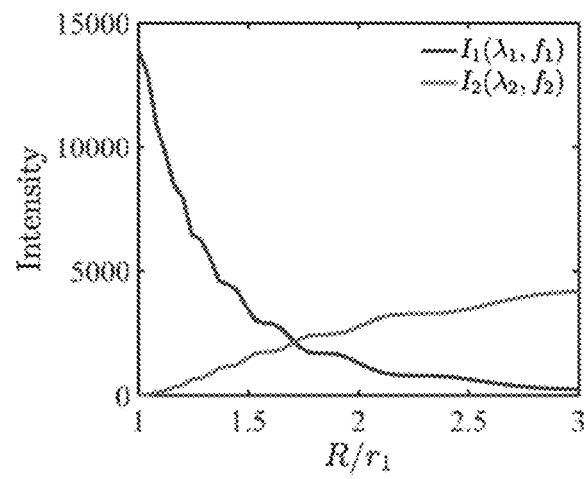
FIG. 15H

US 10,996,383 B2

DIFFRACTIVE AXILENSES AND USES THEREOF

CROSS-REFERENCE TO RELATED APPLICATIONS

This patent application claims the benefit of U.S. Provisional Patent Application No. 62/845,517, filed May 9, 2019, and U.S. Provisional Patent Application No. 62/900,009, filed Sep. 13, 2019, both of which are incorporated by reference in their entireties.

STATEMENT REGARDING FEDERALLY SPONSORED RESEARCH

This invention was made with government support under Grant No. W911NF-12-2-0023 awarded by the Army Research Laboratory and Grant No. DMR1709704 awarded by the National Science foundation. The Government has certain rights in the invention.

FIELD

The present invention relates generally to multiple level diffractive optical elements, and, more specifically, to design of multiple level diffractive optical elements that can focus incident radiation of predefined wavelength at prescribed locations in a focusing plane or along an optical axis.

BACKGROUND

Spatial and spectral discrimination of electromagnetic radiation is the basic operation mechanism that enables spectroscopic and multispectral imaging devices. Malt spectral systems are essential tools in fields such as medical diagnostics, environmental conservation, and defense technologies. Moreover, implementing these multispectral systems on-chip requires miniaturization and the introduction of novel functionalities, which currently drive the development of novel compact photonic components.

For example, focal plane arrays are widely used in modern imaging and sensing technology. In an imaging system, focal plane arrays are an array of receivers or optical detectors placed in the focal plane of the imaging system, Typically, a focal plane array is two dimensional and can contain thousands if not millions of detectors. Focal plane arrays have found uses in photo cameras and video cameras. Another area where focal plane arrays can make an impact is in spectrometers. Microlenses have been proposed to work as optical concentrators for use with focal plane arrays in order to increase sensitivity and reduce crosstalk associated with the focal plane arrays. However, current microlens solutions have several drawbacks including optical losses, high manufacturing costs, and a lack of spectral discrimination. These drawbacks, and others, hinder development of highly integrated optical devices.

Thus, embodiments of the present disclosure provide diffractive optical elements that are scalable, avoiding some of the drawbacks associated with current solutions.

SUMMARY

According to some implementations of the present disclosure, an optical element is provided. The optical element includes a substrate and a pattern. The substrate has a top surface and a bottom surface. The pattern is provided on the top surface, and the pattern includes multiple levels such that a thickness of the pattern is less than a design wavelength. The pattern is configured to focus an incident radiation, received at one of the top surface or the bottom surface of the substrate, at one or more prescribed focal locations on a detection plane. The one or more prescribed focal locations on the detection plane changes in proportion to a wavelength of the incident radiation. The detection plane is an achromatic focal plane when the incident radiation includes multiple wavelengths.

According to some implementations of the present disclosure, an optical element is provided. The optical element includes a substrate and a pattern. The substrate has a top surface and a bottom surface. The pattern is provided on the top surface. The pattern includes multiple levels such that a thickness of the pattern is less than a design wavelength. The pattern is configured to focus an incident radiation, received at one of the top surface or the bottom surface of the substrate, at one or more prescribed focal locations on an optical axis of the optical element. Each of the one or more prescribed focal locations is associated with a corresponding wavelength of the incident radiation.

According to some implementations of the present disclosure, a method for manufacturing a multi-level diffractive optical element is provided. A first mask is lithographically patterned on a top surface of a substrate. A pattern of the first mask is etched onto the top surface of the substrate to create a first layer and a second layer on the top surface of the substrate. The first mask is removed from the first layer or the second layer. A second mask is lithographically patterned on the first layer and the second layer. A pattern of the second mask is etched into the first layer and the second layer to create a third layer from etched portions of the first layer and a fourth layer from etched portions of the second layer.

Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

FIG. 1C illustrates a side profile of a diffractive optical element and a process of folding the contour of the diffractive optical element into a continuous phase profile.

FIG. 1D juxtaposes a continuous phase profile of a diffractive optical element and a 3-level discretized version of the diffractive optical element.

FIG. 78 illustrates diffraction intensities for the 4-level diffractive optical element of FIG. 7A.

FIG. 8B illustrates diffraction intensities for the 4-level diffractive optical element of FIG. 8A along the plane.

FIG. 8C illustrates diffraction intensities for the 4-level diffractive optical element of FIG. 8A at a focusing plane.

FIG. 8D illustrates a perspective view of the diffractive optical element of FIG. 8A.

FIG. 12H illustrates an experimental setup for testing a diffractive optical element according to some implementations of the present disclosure.

FIG. 12I-J illustrate experimental results for the fabricated 4-level diffractive optical element of FIG. 12D.

FIG. 15A illustrates diffraction intensities for a diffractive optical element according to some embodiments of the present disclosure.

FIG. 15B illustrates intensity of two focused wavelengths along the z direction, according to some embodiments of the present disclosure.

FIG. 15C illustrates an example frequency response showing dual band behavior of a diffractive optical element designed in accordance with the concept depicted in FIG. 13.

FIG. 15D illustrates diffraction intensities for a diffractive optical element according to some embodiments of the present disclosure.

FIG. 15E illustrates an example frequency response showing dual band behavior of a diffractive optical element designed in accordance with the concept depicted in FIG. 13.

FIG. 15F is a graph showing focusing efficiency as a function of sectioned regions of a diffractive optical element designed in accordance with the concept depicted in FIG. 13.

FIG. 15G is a graph showing focusing efficiency at two focusing locations as a function of an effective thickness of a diffractive optical element designed in accordance with the concept depicted in FIG. 13.

FIG. 15F is a graph showing intensity as a function of sectioned regions of a diffractive optical element designed in accordance with the concept depicted in FIG. 13.

Figure 1B:
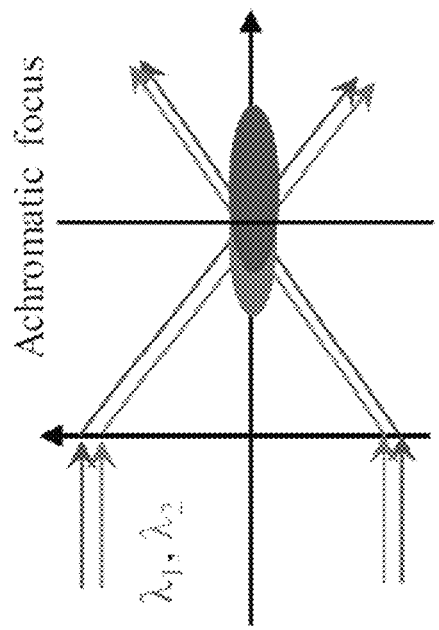
FIG. 1B illustrates an axilens focusing different chromatic components of incident radiation along the z-axis.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Embodiments of the present disclosure provide a photonic platform for addressing miniaturization needs of multispectral on-chip systems. The photonic platform is based on ultra-compact diffractive microlenses with engineered phase profiles. Some embodiments of the present disclosure can exploit multifunctional designs and complex detector architectures, providing advantages for various applications including spectroscopy, photo-detection, and multispectral sensing.

Two aspects, design and implementation, are associated with realizing microlenses. Microlens design involves manipulating an electromagnetic radiation wavefront incident on a microlens by adjusting a topography of a microlens. Microlens topography is often described as a "phase-profile," as light can be redirected by manipulating a local phase of the microlens. A single phase-profile design can be implemented with a large variety of methods (e.g., implemented as variation in bulk component material thickness, selective reflection, or filtering). However, "planar" or "flat" optics design schemes can provide several advantages for both cost and operation. These advantages include a reduction of volume of microlens component material, a reduction of microlens thickness, high efficiencies associated with the microlens, and in some cases compatibility with very large scaling integration, such as photolithographic methods. Flat microlenses can be created by assembling a series of sub-wavelength "meta-atoms" to emulate a large-scale phase profile and add polarization sensitivity. However, flat multilevel diffractive lens implementations, a type of multilevel diffractive element, can add additional advantages in scalability without losing performance efficiencies when compared to the aforementioned strategy. In addition, flat multilevel diffractive lenses enable the integration of anti-reflection coatings that can reduce reflection losses associated with interfaces with refractive index contrast.

Ever-increasing demands of highly integrated optical devices, the development of quantum computing and communication technologies utilizing non-classical correlations, and rapid innovations in multi-spectral detection schemes across the electromagnetic spectrum compels a need for miniaturized photonic components with engineered optical phase. In particular, the traditional approach to realize compact optical devices for imaging and spectroscopy relies on polymer-based diffractive optical elements. Polymer-based diffractive optical elements typically result in large footprints and sizable optical thicknesses, thus hampering on-chip integration and scalability.

Conventional diffractive lenses are based on devices such as Fresnel Zone Plates that provide focusing of a specific radiation wavelength over a fixed focusing plane. Recently, diffractive axilens components (i.e., diffractive axilenses) that additionally provide the capability to focus light over a large depth of field taking advantage of radially-dependent focusing have been demonstrated. However, these devices do not provide spectral selectivity and control of spatial location(s) of the focal spots. Spectral selectivity is a highly desirable feature for imaging and spectroscopy applications, and spectral selectivity is currently obtained by developing expensive multi-band absorbing materials or by using specialized external optics that limit size and integration of multi-color devices.

To avoid drawbacks associated with polymer-based diffractive optical elements, microlenses based on phase-engineered metasurfaces metalenses) and numerically optimized super-oscillation lenses were introduced. This approach is collectively referred to as the meta-optics approach. The meta-optics approach has received considerable attention due to a potential for realizing high-efficiency, compact photonic components with novel functionalities and sub-wavelength profiles. However, most meta-optics designs achieve their desired phase profiles through either geometrical phase modulation or an engineered resonance behavior. Geometrical phase modulation has a drawback of requiring a control of polarized radiation, and engineered resonance behavior has a drawback of introducing unavoidable losses that reduce overall focusing efficiency. Developing meta-optics devices with deep sub-wavelength elements for visible applications requires specialized nanofabrication with reduced scalability, especially when non-conventional phase gradients and modulations are realized to add novel optical functionalities beyond single-point imaging.

Overall, competing technologies that can achieve multi-spectral focusing and selectivity rely on lenslet arrays arrays of microlenses) that are inherently complex to fabricate, that are expensive to fabricate, and that suffer from a short depth of focusing with limited tunability.

As such, embodiments of the present disclosure provide optical devices that avoid drawbacks of the aforementioned approaches. Embodiments of the present disclosure provide optical devices that are scalable, that are polarization insensitive, that have high efficiency over spectral band, and that work over a large range of incidence angles. Some embodiments of the present disclosure allow for simultaneous focusing and grating responses that are necessary for multi-band detection and on-chip spectroscopic applications. Embodiments of the present disclosure provide compact diffracting elements with programmable depth of focus and wavelength selectivity, with unprecedented control on focal spot locations and characteristics. Moreover, some embodiments of the present disclosure can be fabricated using a conventional 4-level lithography. Using a widely available lithographic process can guarantee scalability and reduced costs when compared to the fabrication costs associated with competing technologies.

Some embodiments of the present disclosure provide an alternative microlens design approach based on spatial modulation of ultra-compact, phase-modulated axilenses in silicon that can be readily integrated atop substrates of focal plane arrays. These optical devices efficiently integrate characteristic phase modulation of axilenses diffractive lenses with radially-dependent focal lengths and controllable depth of focusing) with angular dispersion of grating structures.

A phase-modulated axilens device, according to some implementations of the present disclosure, operates by passively combining both electromagnetic radiation concentration and wavelength-dependent positioning of electromagnetic radiation on an achromatic plane parallel to the axilens device plane. Desip of the phase profile of the phase-modulated axilens device allows the wavelength-dependent positioning of focal distributions by the axilens to be engineered, and therefore, allows the correlation of intensity distributions in the achromatic plane with wavelength, when illuminating the device with monochromatic and/or polychromatic electromagnetic radiation. The achromatic plane is enabled by the tunable large depth of focusing of the axilens phase distribution. The large depth of focusing of the axilens allows for efficient broadband operation. The large depth of focusing also compensates for both chromatic dispersion and the angling of the axilens's focal distributions, imparted by phase modulation of the phase profile of the axilens in order to position focal distributions on the achromatic plane as a function of wavelength.

Phase modulation is defined by the variation of the phase profile and can embody analytical functions, such as 2D periodic, 1D periodic, or chirped functions, and/or numerically defined non-periodic functions. For a phase modulated optical element according to embodiments of the present disclosure, the phase profile of the optical element can be described by transverse phase modulations and/or longitudinal phase modulations.

Embodiments of the present disclosure provide flat multilevel diffractive optical elements with phase modulation. Fundamentally, the flat multilevel diffractive optical elements is materials agnostic, that is, the diffractive optical elements can work with any transparent or semi-transparent material compatible with a fabrication process for manufacturing multilevel diffractive optical elements. In some cases, phase-modulation can prescribe small feature sizes and larger redirection and/or angling of incident radiation, therefore, transparent high-index materials are used to combat these attributed effects. High-index materials are materials that have refractive index greater than or equal to 1.8. In some cases, high-index materials can improve efficiencies associated with phase-modulated multilevel diffractive optical elements, allowing larger numerical apertures and/or smaller phase-modulation periods. High-index materials can enable compactly fabricated optical elements with small thicknesses, for example, a thickness as small as 0.2λ, where λ is the design wavelength. Small thicknesses enable a potential for monolithic integration with high-index detector array designs.

Embodiments of the present disclosure provide diffractive optical elements that can be used in isolation, such as integration as a compact spectroscopic tool, or implemented into a microlens arrays for applications, such as multispectral imaging when combined with detector arrays. Before further describing diffractive optical elements according to some implementations of the present disclosure, a discussion of an axilens is provided next.

Figure 1A:
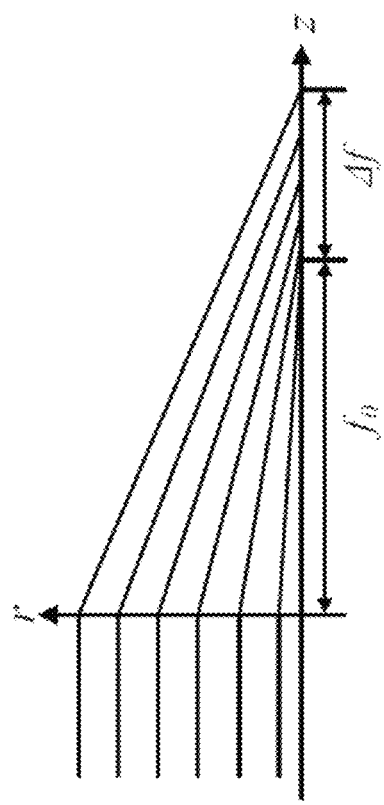
FIG. 1A illustrates a known diffractive behavior of an axilens.

FIG. 1A illustrates an example diffractive behavior of an axilens showing a radially-dependent focal length. The axilens in FIG. 1A can be defined based on parameters $f_0$ and $\Delta f$ when focusing light along the z-axis. Light can be focused in the range from $z=f_0$ to $z=f_0+\Delta f$. Another property of axilenses is illustrated in FIG. 1B. FIG. 1B shows that the axilens focuses radiation with two incident wavelengths $\lambda_1$ and $\lambda_2$ along the z-axis. FIG. 1B illustrates a longitudinal shift in focusing range as a function wavelength. FIG. 1B also illustrates an overlap between the focusing range of both wavelengths $\lambda_1$ and $\lambda_2$ such that an achromatic plane can be defined, where the focused radiation of the two incident wavelengths $\lambda_1$ and $\lambda_2$ overlap. Note that in generating FIGS. 1A and 1B, the axilens is located in the x-y plane and excited by a normally incident plane wave which results in a diffracted field that propagates along the +z direction (i.e., the optical axis of the axilens).

Phase distribution or phase profile of an axilens $\phi_{ax}$ is mathematically described by Eq. 1.

$$\phi_{ax}(r) = -\frac{2\pi}{\lambda}\left[\sqrt{\left(f_0 + \frac{r\Delta f}{R}\right)^2 + r^2} - \left(f_0 + \frac{r\Delta f}{R}\right)\right]\bigg|_{2\pi} \quad \text{(Eq. 1)}$$

In Equation 1, $\lambda$ is the design wavelength, $r=\sqrt{x^2+y^2}$, $f_0$ is the focal length, $\Delta f$ is the focal depth, and R is the maximum radius of the axilens. The $2\pi$ subscript indicates that the phase is reduced by modulo $2\pi$. (x, y) indicates a coordinate on the transverse plane where the axilens is located. Differently from the focusing behavior of traditional Fresnel lenses, axilenses are characterized by a larger focal depth that can be controlled by changing the parameter $\Delta f$ in Eq. 1. Although different wavelengths are focused at different positions along the z-axis, the larger focal depth of axilenses, compared to traditional lenses and Fresnel lenses, results in a substantial overlap of the focused intensities of the different wavelengths on the same plane, thus establishing an achromatic focal plane, as illustrated in FIG. 1B.

At the achromatic focal plane identified in FIG. 1B, focused radiation at different wavelengths will have different intensities. These intensities can be described with a first integral formulation of the Rayleigh-Sommerfeld (RS) equation provided in Eqs. 2 and 3.

$$U_2(x, y) = U_1(x', y') * h(x', y') \quad \text{(Eq. 2)}$$

$$h(x', y') = \frac{1}{2\pi}\frac{z}{r}\left(\frac{1}{r} - jk\right)\frac{e^{jkr}}{r} \quad \text{(Eq. 3)}$$

Eqs. 2 and 3, the operator * denotes convolution, $U_1$ and $U_2$ are transverse field distributions in the object and image planes with coordinates (x, y) and (x', y'), respectively. k is the incident wave number, and $r=\sqrt{(x-x')^2+(y-y')^2+z^2}$ is the Euclidean distance between points in the object and image planes, where z is the distance between the object and image planes. Achromatic behavior of axilenses described using the scalar diffraction theory based on the RS formulation of Eqs. 2 and 3 can be validated and verified using a full-vector finite element method (FEM) numerical simulations.

FIG. 1C illustrates a process of folding a phase profile of a diffractive optical element into the inclusive range of 0 to $2\pi$. FIG. 1C shows a side profile of a diffractive optical element 100a. In FIG. 1C, a continuous shape contour of the diffractive optical element 100a is folded based on a targeted wavelength λ and a number of divisions it to obtain a diffractive optical element 100b with a continuous phase profile. Folding the phase profile allows the diffractive optical element 100a to have a thickness that is smaller than the targeted wavelength λ. That is, the continuous phase profile obtained by folding, the phase profile has a sub-wavelength thickness. FIG. 1D illustrates an example of discretizing a continuous phase profile of a diffractive optical element 102a to obtain the discretized phase profile of a diffractive optical element 102b. Once a continuous phase profile is obtained, the continuous phase profile can be discretized. Discretizing the continuous phase profile can be valuable in manufacturing processes since continuous shape contours may be more difficult and costlier to realize than discrete levels. FIG. 1D illustrates an example where the continuous phase profile of the diffractive optical element 102a is converted to the discretized phase profile of the diffractive optical element 102b. The discretized phase profile shows three levels, with each level having a height of $2\pi/N \times i$, where i is the level number starting at 1 and N is the total number of levels.

Embodiments of the present disclosure combine achromatic behavior of axilenses as illustrated in the example of FIG. 1B, discretized phase profiles as illustrated in FIG. 1D, and additional periodic and/or chirped phase modulations to achieve controllable angular dispersion. The following discussion will provide examples of optical devices, which can be characterized as phase-modulated axilenses, that have new capabilities. The discussion is merely illustrative and provided as examples and not meant to limit the present disclosure to these specific examples.

Figure 2A:
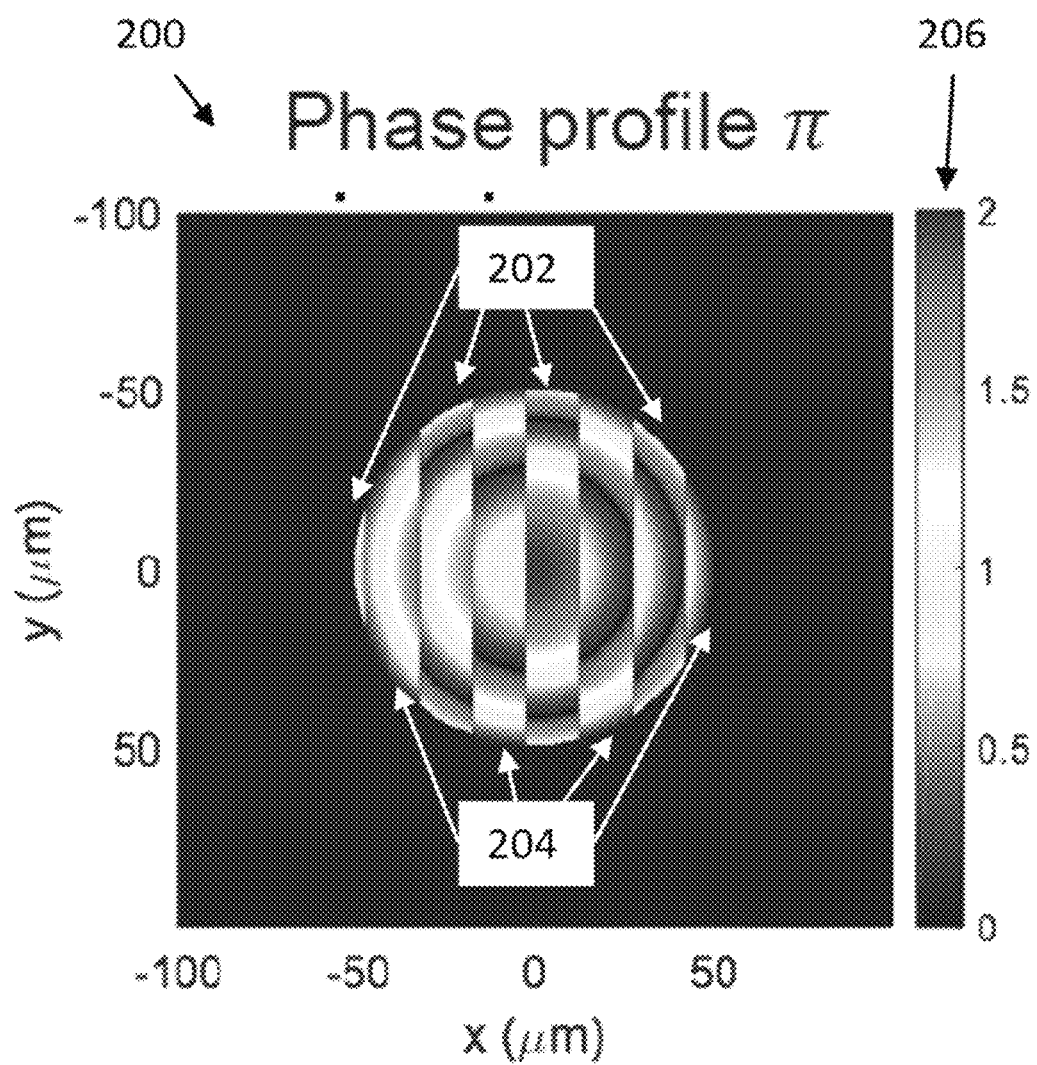
FIG. 2A illustrates a topology view of a diffractive optical element (a phase-modulated axilens) with one dimensional transverse periodic phase modulations, according to some embodiments of the present disclosure.

Referring to FIG. 2A, a topology view of a phase-modulated axilens 200 is provided according to some embodiments of the present disclosure. The phase-modulated axilens 200 is modulated with one dimensional transverse periodic phase modulations. That is, the periodic phase modulations divide the phase-modulated axilens 200 into multiple sections 202 and 204. The sections 204 disrupt a continuity of the sections 202, and vice versa. That is, the transverse periodic phase modulations introduce discontinuities in the phase profile of the phase-modulated axilens 200, such that the phase-modulated axilens 200 seems to resemble a one dimensional grating structure. The legend 206 indicates a height of different locations of the phase-modulated axilens 200. A quick way of identifying a pattern to the grating is to view the sections 202 as being ported from an axilens that is analogous to the continuous phase profile of the diffractive optical element 102a, where a center of the diffractive optical element 102a is at the maximum height. The sections 204 can be thought of as being ported from an axilens that is a radially phase shifted version of the diffractive optical element 102a. In this example, the radial phase shift is π. The radial phase shift along with the one dimensional grating makes a pattern such that a transition between the highest point and the lowest point in the sections 202 is adjacent to a midpoint in the sections 204, and a midpoint in the sections 202 are adjacent to a transition between the highest point and the lowest point in the sections 204. The phase-modulated axilens 200 has a radius of 50 μm (i.e., a diameter of 100 μm). To obtain the phase profile of the phase-modulated axilens 200 from a standard axilens, the phase of the standard axilens $\phi_{ax}$ as defined in Eq. 1 was modulated by adding a phase function $\phi_m$ according to the expression: $\phi_{mod} \phi_{ax} + \phi_m$, where $\phi_{mod}$ describes the phase profile of the phase-modulated axilens 200. The $$\phi_m = \frac{\pi}{2}\mathrm{sign}(\cos(2\pi x'/p)) + \frac{\pi}{2}$$

describes the one dimensional periodic phase modulation that is added to Eq. 1 to obtain the phase profile of the phase-modulated axilens 200. x' is an x-coordinate in FIG. 2A, and p is periodicity of the one dimensional periodic phase modulation.

Figures 2B, 2C:
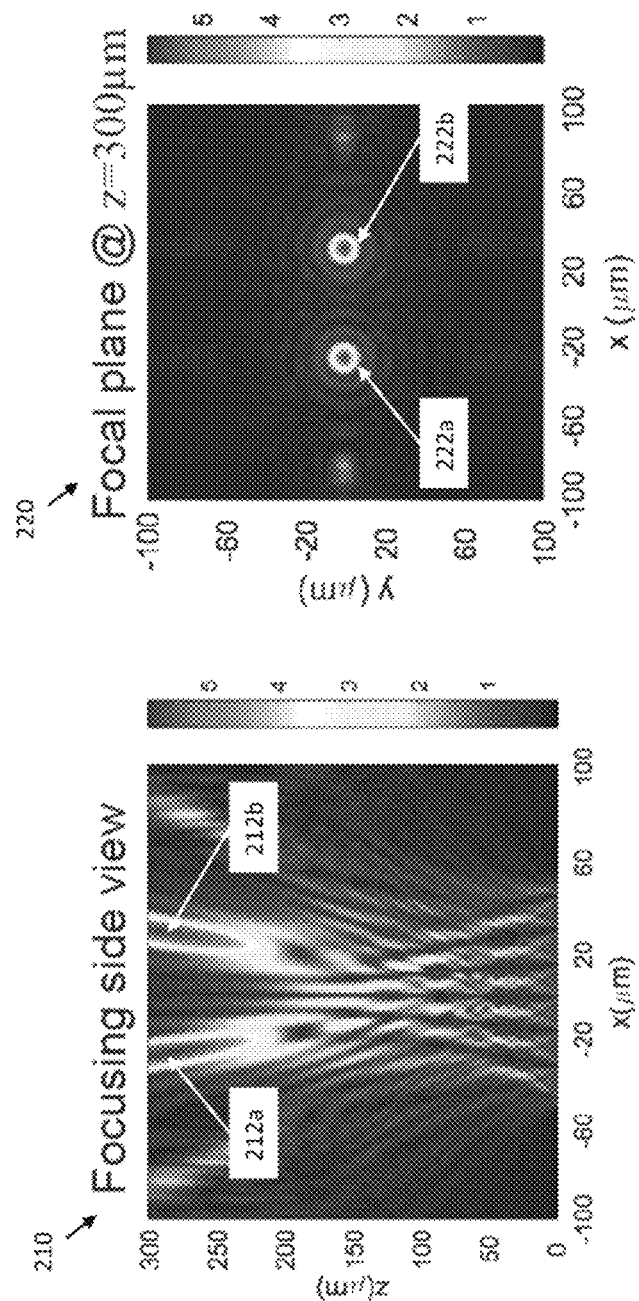
FIGS. 2B and 2C illustrate diffraction intensities for the diffractive optical element in FIG. 2A.

FIGS. 2B and 2C illustrate example diffraction intensities for the phase-modulated axilens 200 at a single wavelength using the RS formulations of Eqs. 2 and 3. FIG. 2B shows the diffraction intensities in the x-z plane at a y=0 slice. In FIGS. 2B and 2C, the phase-modulated axilens 200 is positioned in the x-y plane (at z=0 plane, as shown in FIG. 2A). Radiation at the single wavelength is incident on the phase-modulated axilens 200 causing the phase-modulated axilens 200 to create the radiation pattern 210. The radiation pattern 210 includes two focal locations, generally indicated as location 212a and location 212b. It is observed that the focal locations 212a and 212b do not lie directly on the z-axis but are moved laterally along the x-axis. It is also observed that this behavior is very different from a conventional axilens that creates only one focal location along the z-axis without any lateral displacement.

FIG. 2C shows the diffraction intensities of the radiation pattern 210 of FIG. 2B in the x-y plane at a z=300 μm plane. z=300 μm is provided as an example of a focusing plane. In the focusing plane, two focal locations 222a and 222b (corresponding to the focal locations 212a and 212b of FIG. 2B) are observed. Each of the focal locations 222a and 222b has a circular radiation pattern with a center of each of the circular radiation patterns having a highest intensity. FIG. 2C also confirms that the focal locations 222a and 222b are laterally separated in the x-direction but lie on y=0 plane. In the example of FIG. 2C, the center of the focal location 222a is provided at approximately (~25 μm, 0 μm) and the center of the focal location 222b is at approximately (40 μm, 0 μm). In some embodiments, the focal locations 222a and 222b are equidistant from the x-axis.

Figure 3A:
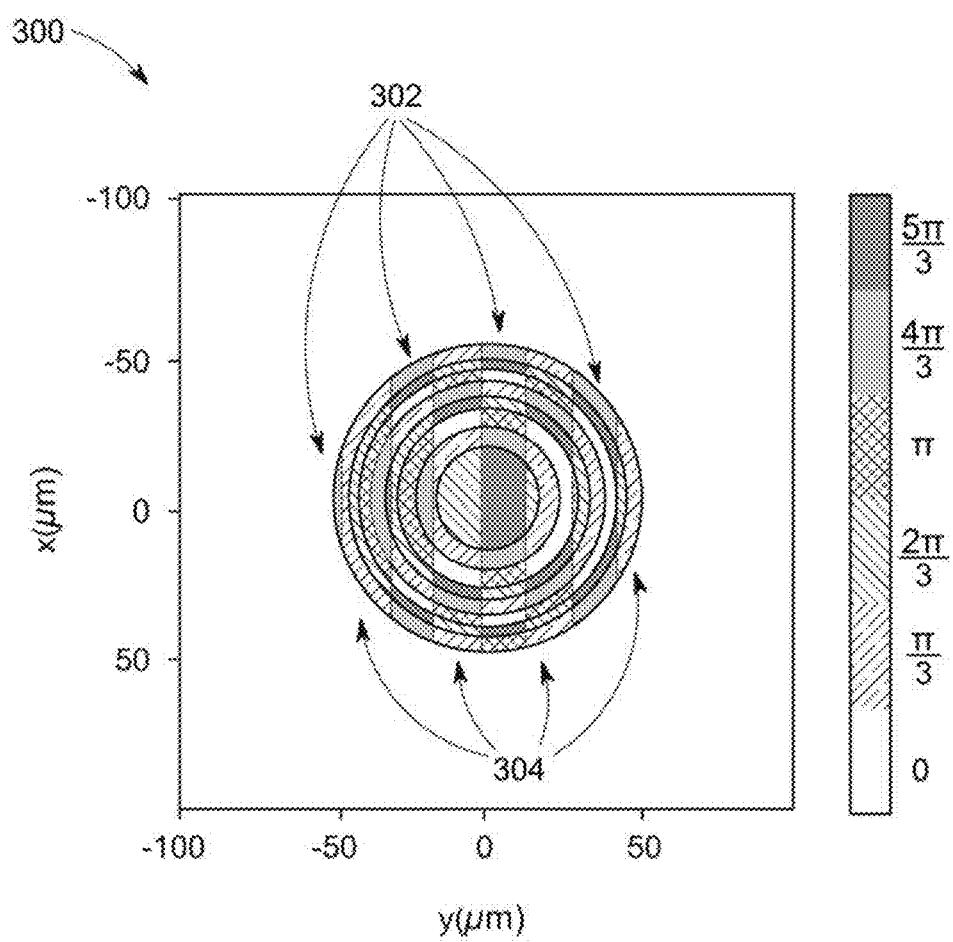
FIGS. 3A and 3B illustrate a 6-level diffractive optical element with one dimensional periodic phase modulation and a 4-level diffractive optical element with one dimensional periodic phase modulation, respectively, according to some embodiments of the present disclosure.
Figure 3B:
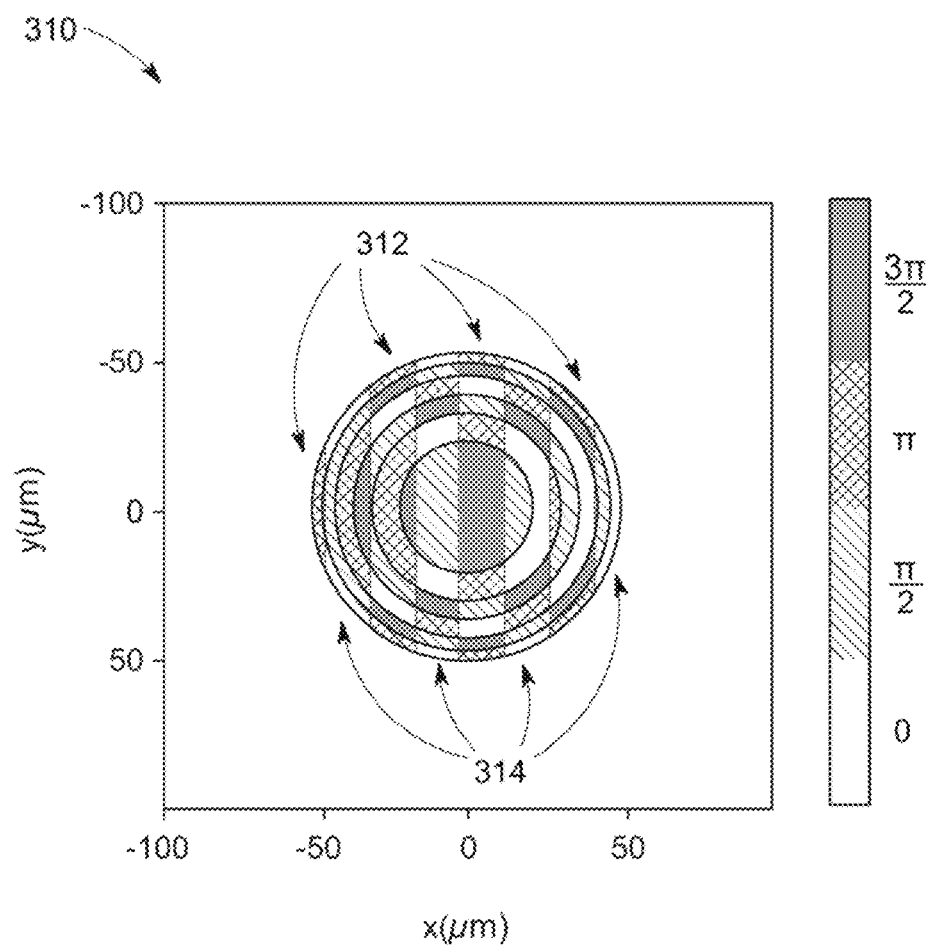

FIG. 2A illustrated the phase-modulated axilens 200 with the continuous phase profile and one dimensional transverse periodic phase modulation. FIGS. 3A and 3B illustrate phase-modulated axilenses with discretized phase profiles and one dimensional gratings. FIG. 3A illustrates a phase-modulated axilens 300 with six discretized levels. The phase-modulated axilens 300 includes a plurality of gratings, and as such, sections 302 and 304 can be defined in an analogous manner as discussed above, with respect to sections 202 and 204 in FIG. 2A. Sections 304 and 302 are similarly related by a radial phase shift of approximately π. Note that a height of the six discretized levels can be quoted by phase, that is, heights for levels one through six are 0, π/3, 2π/3, π, 4π/3, and 5π/3, respectively. FIG. 3B illustrates a phase-modulated axilens 310 with four discretized levels. The phase-modulated axilens 310 includes one dimensional transverse periodic phase modulations, and as such, sections 312 and 314 can be defined in an analogous manner as discussed above, with respect to sections 202 and 204 in FIG. 2A. Sections 314 and 312 are similarly related by a radial phase shift of approximately π. Similarly, a height of the four discretized levels can be quoted by phase, that is, heights for levels one through four are 0, π/2, π, and 3π/2, respectively.

Simulations of diffraction intensities of the radiation patterns created by the phase-modulated axilenses 300 and 310 substantially match the diffraction intensities of FIGS. 2B and 2C. The focal locations indicated by 212a, 212b, 222a, and 222b remain unchanged by the process of converting the continuous phase profile to the discrete phase profile. Focusing intensities, however, are slightly lower. Diffraction intensity for the continuous phase profile device of FIG. 2A is highest, followed by diffraction intensity for the 6-level phase-modulated device of FIG. 3A, and then followed by diffraction intensity for the 4-level phase-modulated device of FIG. 3B. Although different, the diffraction intensity does not drop off very drastically. Thus, a 4-level phase-modulated axilens according to embodiments of the present disclosure can be manufactured to provide similar results to that of a phase-modulated axilens with a continuous phase profile. A 4-level device has a lower number of manufacturing steps compared to a 6-level device or a continuous phase profile device. As such, using a 4-level design can reduce manufacturing costs.

Figure 4A:
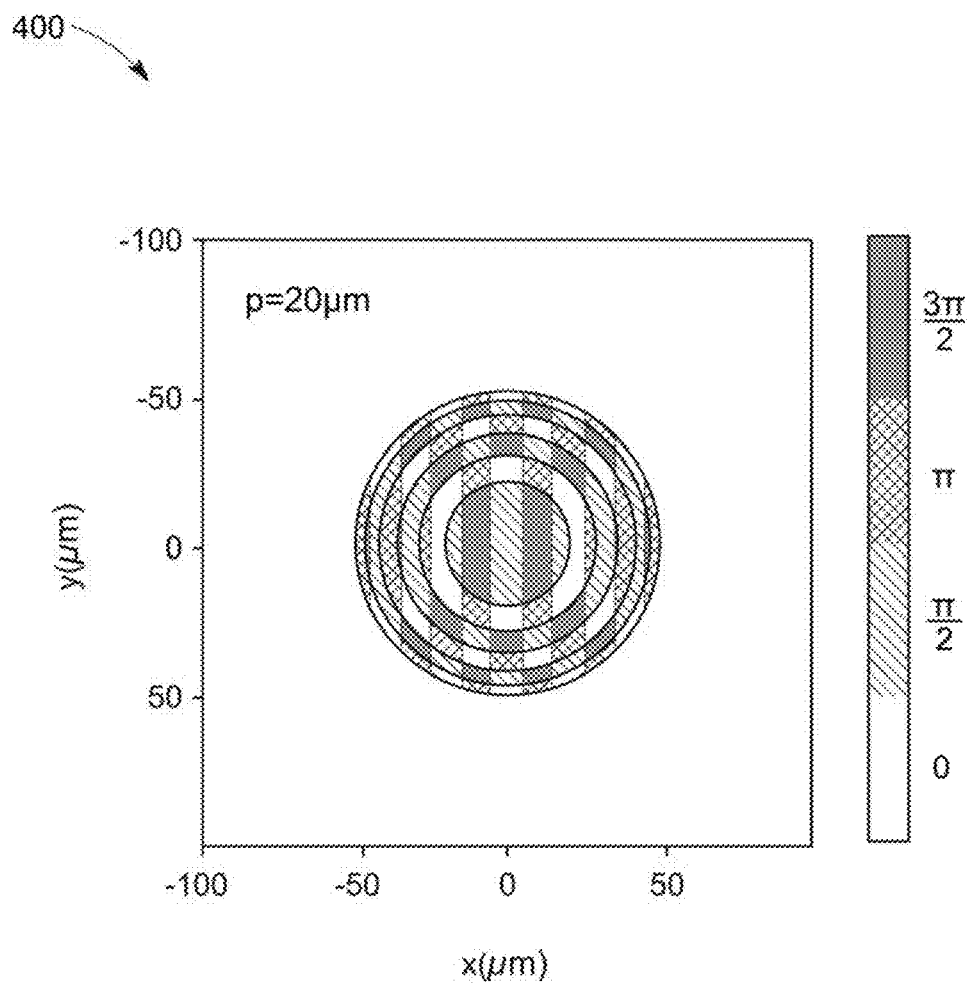
FIGS. 4A and 4B illustrate 4-level diffractive optical elements with one dimensional periodic phase modulation, according to some embodiments of the present disclosure.
Figure 4B:
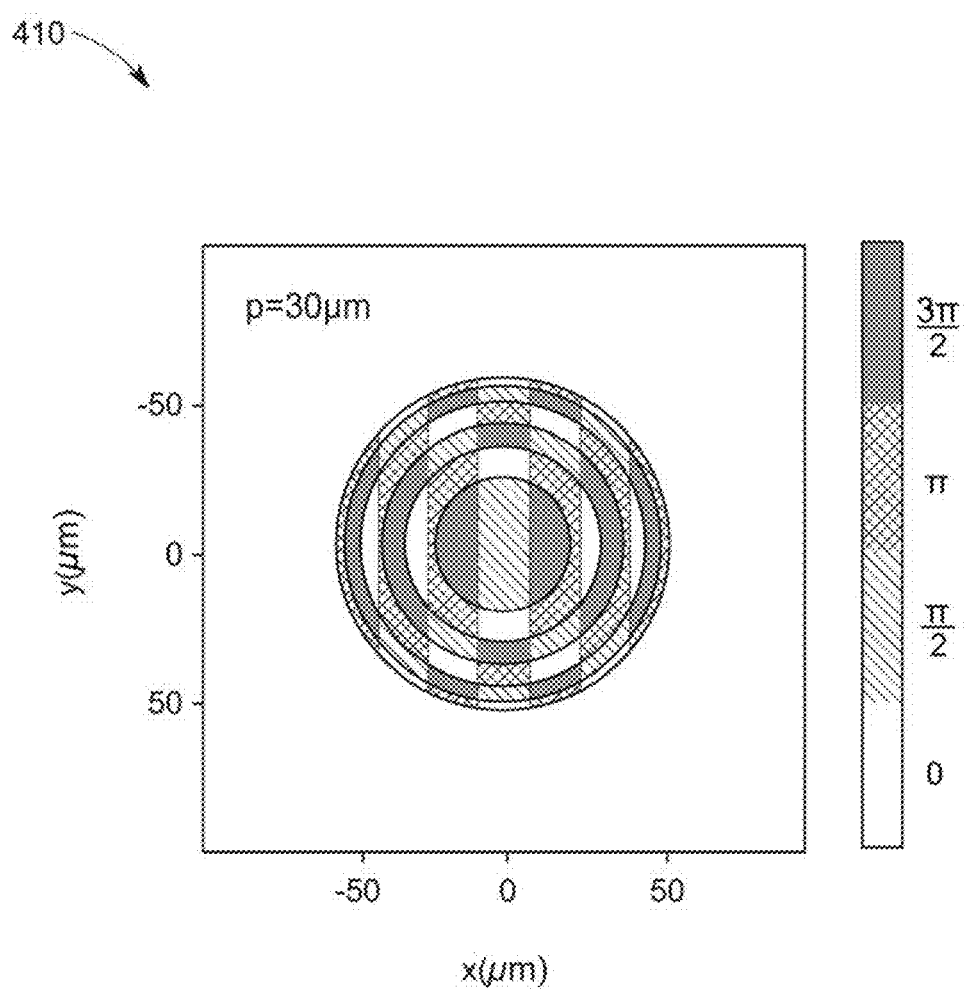

Alongside the number of discretized levels, periodicity of the phase modulation can be adjusted as well. Discretized levels controlled diffraction intensity, but adjusting periodicity of the phase modulation controls focal location separation for different wavelengths. FIGS. 4A and 4B illustrate 4-level phase-modulated axilenses with one dimensional periodic phase modulation according to some embodiments of the present disclosure. FIG. 4A illustrates a topology view of a phase-modulated axilens 400 with one dimensional periodic phase modulation that has a periodicity of 20 μm, and FIG. 4B illustrates a topology view of a phase-modulated axilens 410 with one dimensional periodic phase modulation that has a periodicity of 30 μm. For phase-modulated axilenses of a same size, a lower periodicity indicates a higher number of gratings or sections while a higher periodicity indicates a lower number of gratings or sections. FIG. 4A has a total number of eleven sections created by the one dimensional periodic phase modulation with periodicity 20 μm, and FIG. 4B has a total number of seven sections created by the one dimensional periodic phase modulation with periodicity 30 μm. The sections in both FIGS. 4A and 4B alternate as discussed above in connection to sections 202 and 204 of FIG. 2A. Similarly, radial phase shift of the section in FIGS. 4A and 4B is π, and the phase function $$\phi_m = \frac{\pi}{2}\text{sign}(\cos(2\pi x'/p) + \frac{\pi}{2}$$

describes the periodic phase modulation as previously discussed in connection with FIG. 2A.

Figure 4C:
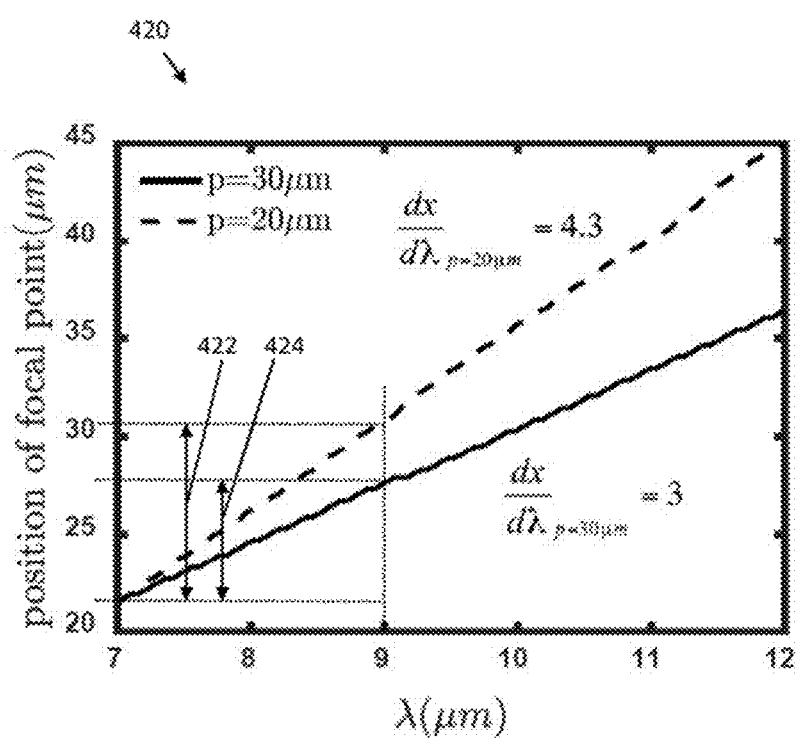
FIG. 4C is a graph showing focal location as a function of wavelength for different periodicity of a one dimensional phase modulation, according to some embodiments of the present disclosure.

FIG. 4C is a graph 420 showing focal location as a function of wavelength for the phase-modulated axilenses of FIGS. 4A and 4B with grating periodicity of 20 μm and 30 μm, respectively. Referring to FIG. 4C, for wavelength λ=7 μm, both phase-modulated axilenses 400 and 410 have a focal location at around 22 μm, i.e., (22 μm, 0 μm) on the focusing plane. For wavelength λ=9 μm, the phase-modulated axilens 410 has a focal location at around 28 μm, and the phase-modulated axilens 400 has a focal location at around 31 μm. That focal location separation between λ=7 μm and λ=9 μm is larger for the axilens with smaller periodicity. That is, focal location separation 422 is larger than focal location separation 424, and periodicity can be used to control focal location separation between wavelengths of interest. The slope of the focal location as a function of wavelength increases when grating periodicity is reduced. Slope of the local location can additionally be controlled by adjusting radius of the phase-modulated axilenses 400 and 410.

FIG. 4C quotes focal location along the +x-axis, but note that one dimensional periodic phase modulation provides two focal locations for each wavelength, so a mirror location exists along the x-axis. Note that in FIGS. 4A and 4B, the phase-modulated axilenses 400 and 410 are symmetric about the x-axis hence the mirror-like behavior of the focal locations, when compared to the phase-modulated axilens of FIG. 2A. Although 4-level and 6-level phase modulated axilenses are provided as examples, other number of levels can be realized, e.g., a two level, eight level, sixteen level, sixty-four level, one-hundred twenty-eight level, etc.

Figure 5A:
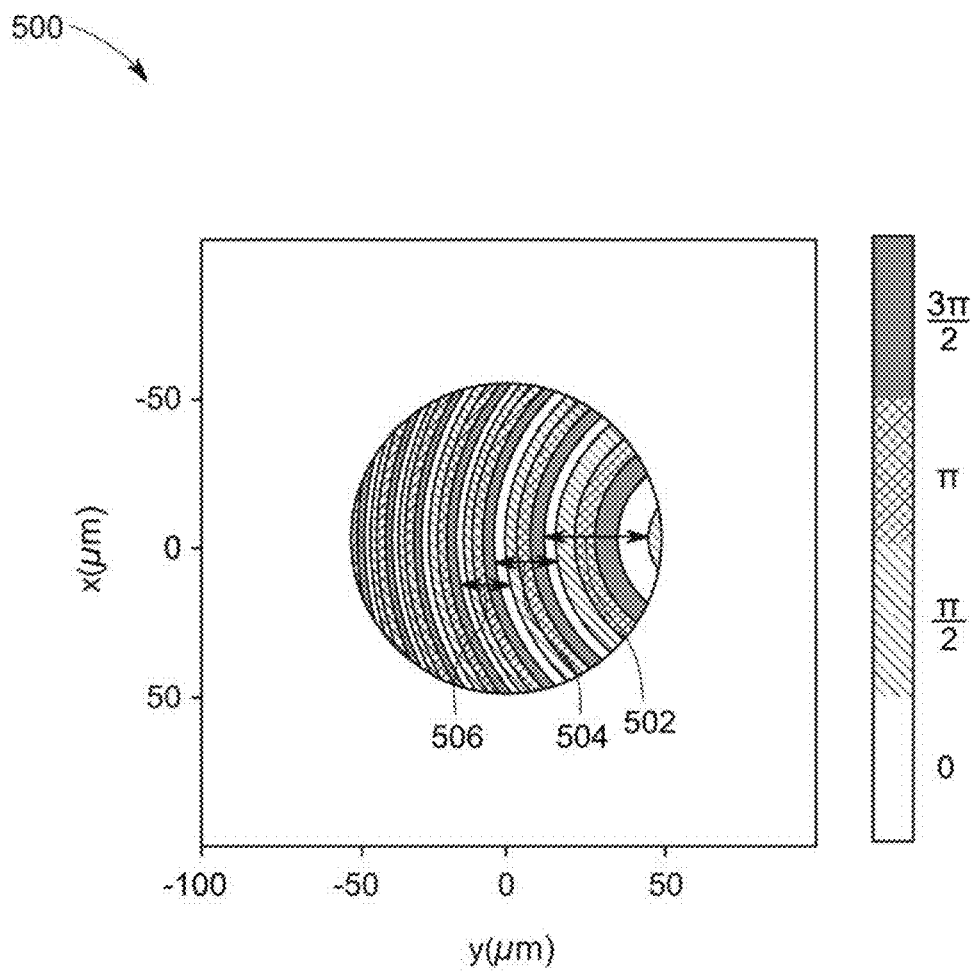
FIG. 5A illustrates a 4-level diffractive optical element with one dimensional phase modulation that represents a chirped function according to some embodiments of the present disclosure.

FIGS. 2A-2C, 3A, 3B, and 4A-4C were directed at one dimensional transverse periodic phase modulation that presented an equally-spaced grating structure. Other grating patterns are envisioned in some embodiments of the present disclosure. For example, FIG. 5A illustrates a 4-level phase-modulated axilens 500 with one dimensional periodic phase modulation that when taken as a whole represents a chirped function. The chirped function is realized by reducing a length of each section (e.g., as indicated by the arrows 502, 504, and 506 having progressively reduced lengths along the x-axis). The phase of the standard axilens $\phi_{ax}$ as defined in Eq. 1 was modulated by adding a phase function $\phi_m$ according to the expression: $\phi_{mod} = \phi_{ax} + \phi_m$, where $\phi_{mod}$ describes the phase profile of the phase-modulated axilens 500. The phase function $\phi_m = 2\pi x'/p$ describes the one dimensional periodic phase modulation added to Eq. 1 to obtain the phase profile of the phase-modulated axilens 500. x' is an x-coordinate in FIG. 5A, and p is periodicity of the one dimensional periodic phase modulation.

Figure 5B:
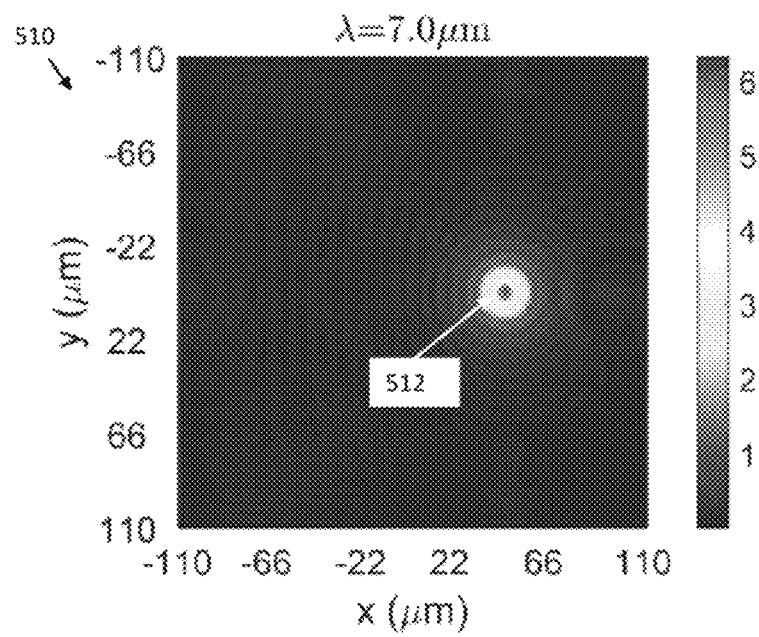
FIG. 5B illustrates diffraction intensities for the 4-level diffractive optical element of FIG. 5A.

FIG. 5B illustrates diffraction intensities for the phase-modulated axilens 500 of FIG. 5A at a single wavelength λ=7 μm in the x-y plane (for z=300 μm. Radiation at the single wavelength incident on the phase-modulated axilens 500 causes the phase-modulated axilens 500 to create the radiation pattern 510 in the focusing plane. The focusing plane in this example is z=300 μm. The radiation pattern 510 includes one focal location, indicated as location 512. The focal location 512 does not lie directly on the z-axis and is moved laterally along the x-axis. This behavior is very different from a conventional axilens that creates only one focal location along the z-axis without any lateral displacement. The focal location 512 has a center at approximately (50 μm, 0 μm) on the z=300 μm focusing plane.

Figure 5C:
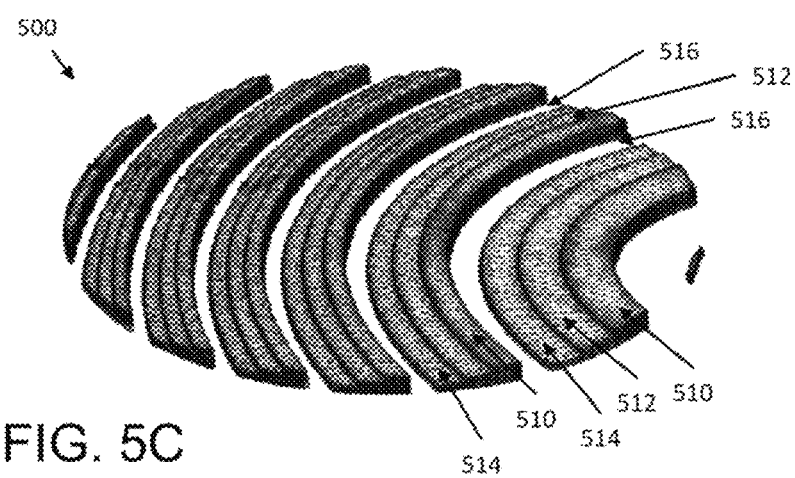
FIG. 5C illustrates a perspective view of the diffractive optical element of FIG. 5A.

FIG. 5C illustrates a perspective view of the phase-modulated axilens 500 of FIG. 5A. The phase-modulated axilens 500 has four levels identified as 510, 512, 514, and 516. Level 510 has the highest height, level 512 has the second highest height, level 514 has the third highest height, and level 516 has the lowest height. Level 516 is at a same height as a top level of a substrate on which the phase-modulated axilens 500 sits.

Figure 5D:
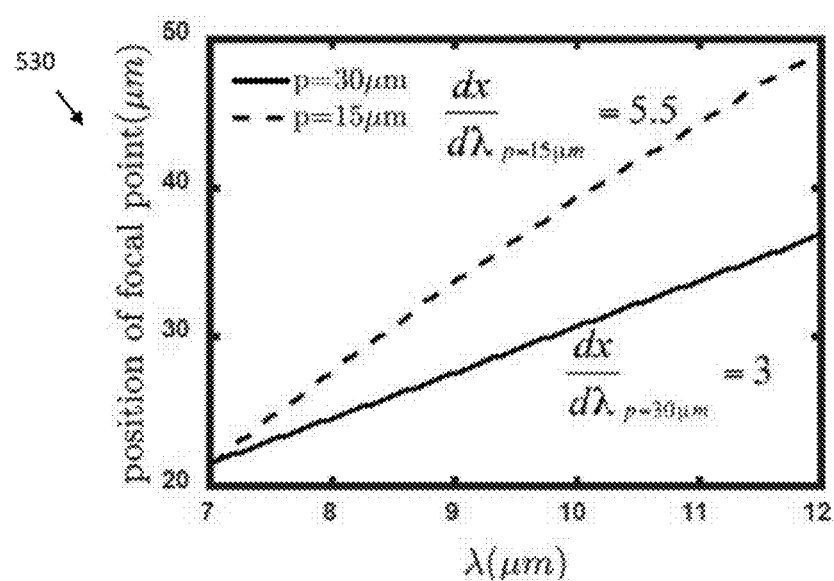
FIG. 5D is a graph showing focal location as a function of wavelength for different phase modulation periodicities, according to some embodiments of the present disclosure.

Similar to FIG. 4C where periodicity of the phase modulation affected separation of wavelengths, periodicity of the phase modulation representing the chirped function affects separation of wavelengths as illustrated in FIG. 5I. That is, as periodicity of the phase modulation increases, slope of focal location separation as a function of wavelength decreases. As periodicity of the phase modulation decreases, slope of focal location separation as a function of wavelength increases. In FIG. 5D, slope for 15 μm chirping periodicity $$\frac{dx}{d\lambda_{p=15\ \mu m}}$$

is 5.5 while slope for 30 µm chirping periodicity $$\frac{dx}{d\lambda_{p=30\ \mu m}}$$

is 3.

Figure 6A:
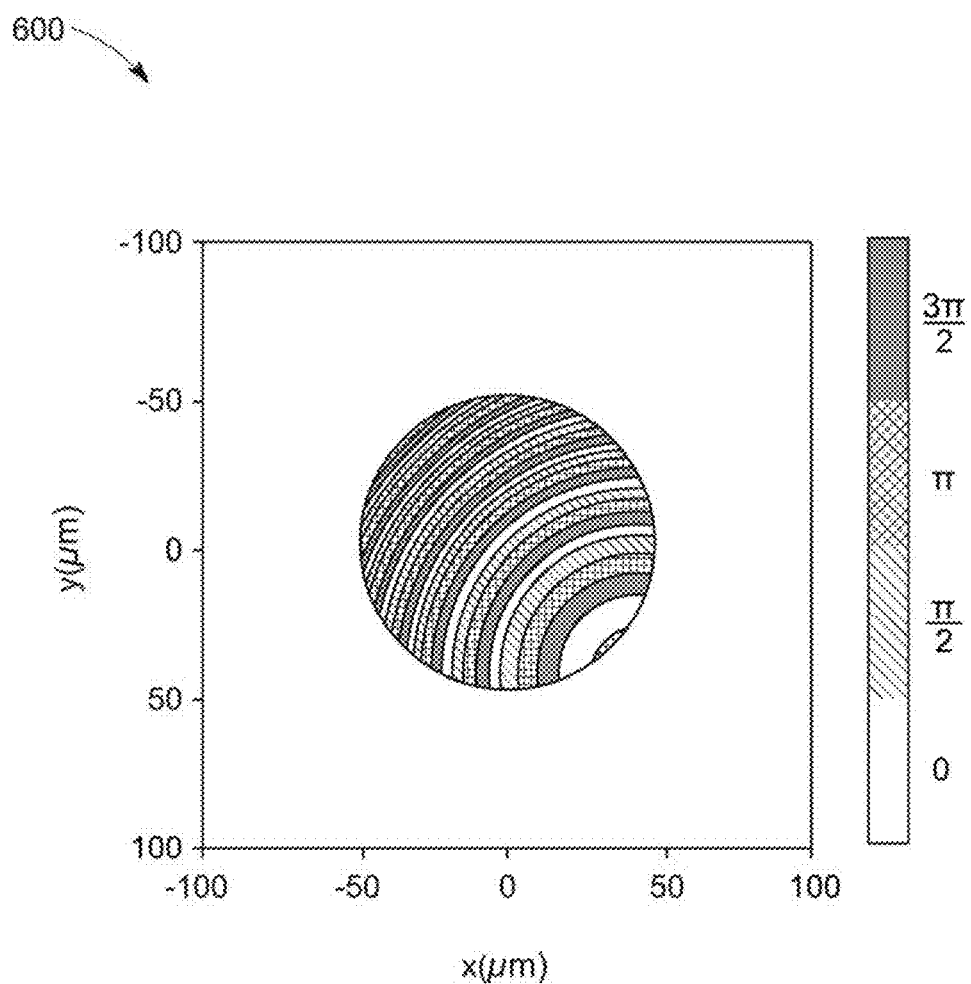
FIG. 6A illustrates a 4-level diffractive optical element with one dimensional phase modulation that represents a chirped function, according to some embodiments of the present disclosure.

FIG. 6A illustrates a 4-level phase-modulated axilens 600 with periodic phase modulation that when taken as a whole represents a chirped function. The phase-modulated axilens 600 is different from the phase-modulated axilens 500 in that the chirping pattern is rotated and positioned at an angle of 45°. Furthermore, the phase profile of the phase-modulated axilens 600 is laterally shifted by π when compared to FIG. 5A.

Figure 6B:
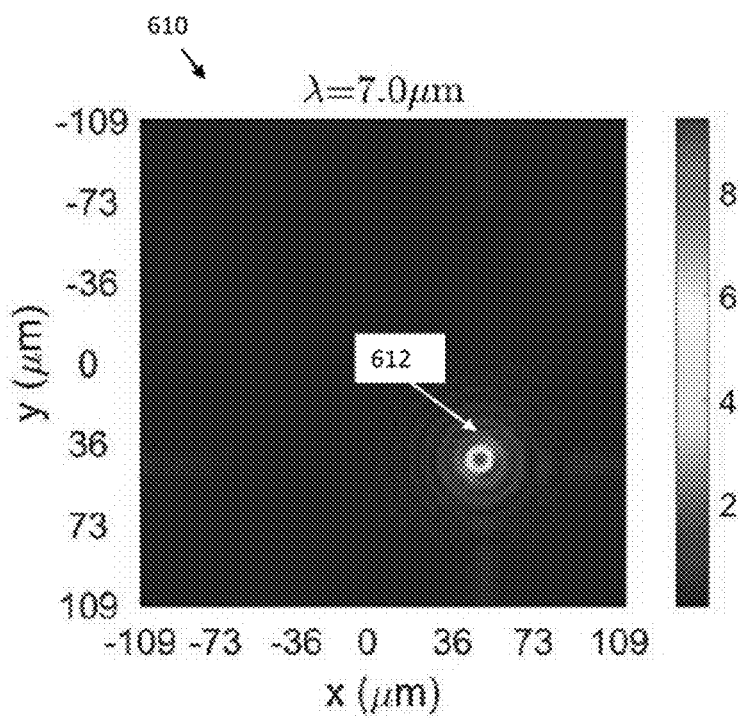
FIG. 6B illustrates diffraction intensities for the 4-level diffractive optical element of FIG. 6A.
Figure 6C:
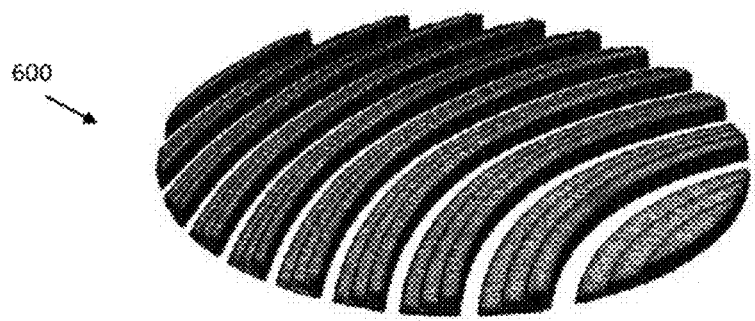
FIG. 6C illustrates a perspective view of the diffractive optical element of FIG. 6A.

FIG. 6B illustrates diffraction intensities for the 4-level phase-modulated axilens 600 of FIG. 6A at a single wavelength λ=7 µm its the x-y plane (for z=300 µm). Radiation at the single wavelength incident on the phase-modulated axilens 600 causes the phase-modulated axilens 600 to create the radiation pattern 610 in the focusing plane (i.e., z=300 µm). Similar to FIG. 5B, the radiation pattern 60 includes one focal location 612. The focal location 612 does not lie directly on the z-axis but is moved transversely within the focusing plane. The focal location 612 has a center at approximately (50 µm, 50 µm) on the focusing plane. By engineering direction of chirping, the local location can be shifted along a desired direction without defocusing. Slope for a chirping periodicity $$\frac{dx}{d\lambda_{p=15\ \mu m}}$$

can be 9.5. Thus, the 45° chirping configuration can produce the largest separation between focused radiation wavelengths on the focusing plane. FIG. 6C illustrates a perspective view of the phase-modulated axilens 600 of FIG. 6A.

Figure 7A:
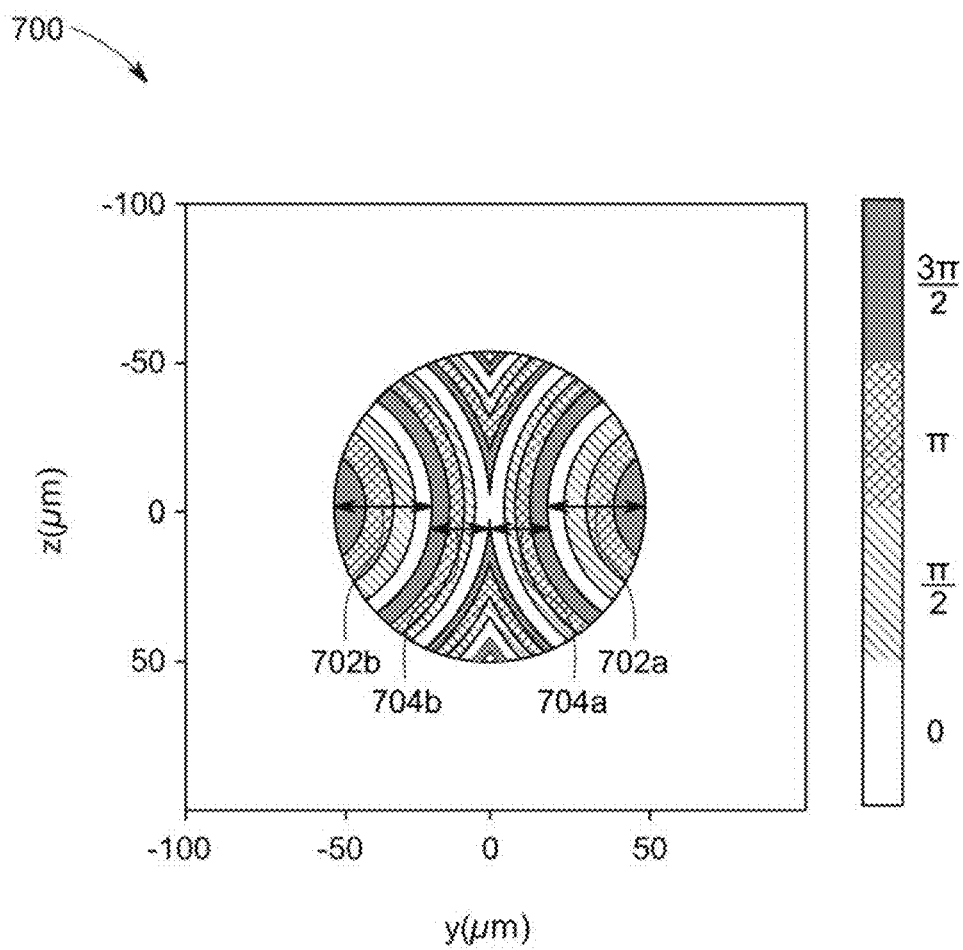
FIG. 7A illustrates a 4-level diffractive optical element with one dimensional phase modulation representing a chirped function with opposing chirping rates, according to some embodiments of the present disclosure.

Phase modulated axilenses with phase modulation that represent chirped functions can be modified to create more than one focal location on a focusing plane. Chirping rates associated with the chirped functions can be adjusted for such modification. For example, FIG. 7A illustrates a 4-level phase-modulated axilens 700 with one dimensional periodic phase modulation that represent a chirped function. The phase-modulated axilens 700 has two opposing chirping rates as shown with the length of section 702a being greater than that of section 704a and the length of section 702b being greater than that of section 704b. Going from the right edges to the center, or from the left edges to the center, the sections decrease in length. The phase-modulated axilens 700 has an axis of symmetry at y=0. The modulated axilens 700 merely provides an example, and an asymmetric opposing chirping rate design can be designed by merely shifting the axis of symmetry away from y=0.

Figure 7B:
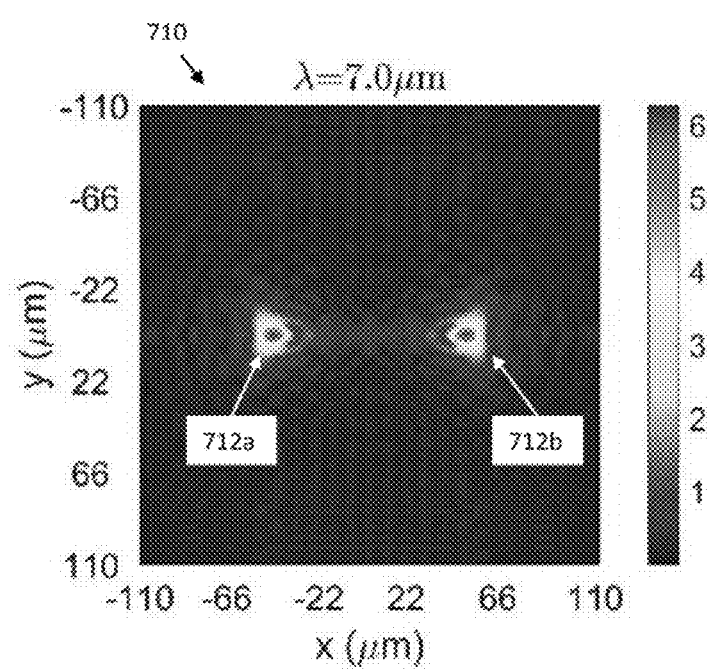

FIG. 7B illustrates diffraction intensities for the phase-modulated axilens 700 of FIG. 7A at a single wavelength λ=7 µm in the x-y plane (for z=300 µm). The opposing chirping rate design of FIG. 7A results in the radiation pattern 510 in the focusing plane. Two focal locations 712a and 712b are identified in the focusing plane. A shape of the focal spots at the focal locations 712a and 712b is elliptical when compared to the circular focal spots shown at the focal locations 612 of FIG. 6B and 512 of FIG. 5B. Furthermore, FIG. 7B provides focal locations for λ=7 µm. The focal locations shift according to a slope $$\frac{dx}{d\lambda_{p=15\ \mu m}},$$

which in some implementations is 4.8. That is, different wavelengths will show up at different focal locations on the focusing plane.

Figure 8A:
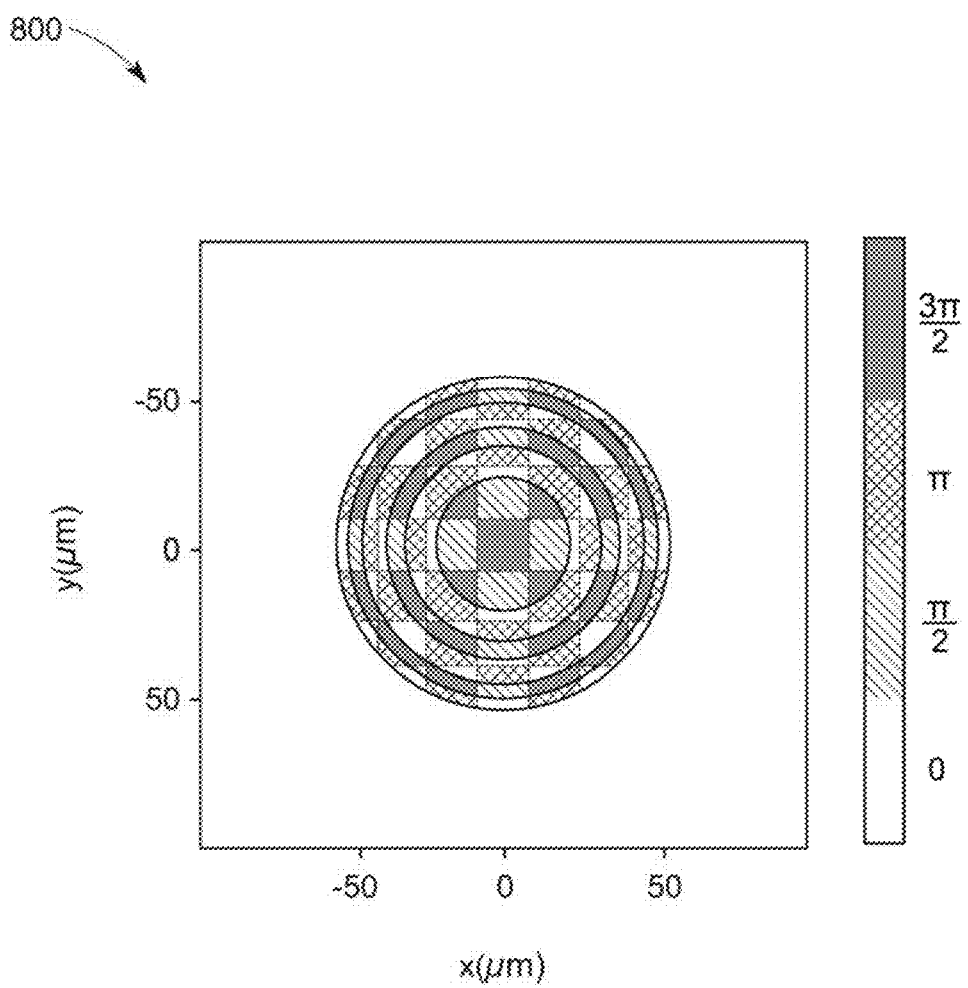
FIG. 8A illustrates a 4-level diffractive optical element with two dimensional phase modulation, according to some embodiments of the present disclosure.

Examples in FIGS. 2A and 5A provided phase-modulated axilenses with one dimensional periodic phase modulations, and examples in FIGS. 6A and 7A provided phase-modulated axilenses with one dimensional periodic phase modulations that represent chirped functions. In some implementations, axilenses can be modulated with two dimensional phase modulations. For example, FIG. 8A illustrates a 4-level phase-modulated axilens 800 with two dimensional periodic phase modulation. To obtain the phase profile of the phase-modulated axilens 800 from a standard axilens, the phase of the standard axilens $\phi_{ax}$ as defined in Eq. 1 was modulated by adding a phase function $\phi_m$ according to the expression: $\phi_{mod} = \phi_{ax} + \phi_m$, where $\phi_{mod}$ describes the phase profile of the phase-modulated axilens 800. The phase function $$\phi_m = \frac{\pi}{2}[\text{sign}(\cos(2\pi x'/p)) + \text{sign}(\cos(2\pi y'/p))] + \pi$$

describes the two dimensional periodic phase modulation that is added to Eq. 1 to obtain the phase profile of the phase-modulated axilens 800. x' is an x-coordinate in FIG. 8A, y' is an y-coordinate in FIG. 8A, and p is periodicity of the two dimensional periodic phase modulation. Here, periodicity is the same in both directions. In other embodiments, periodicity can be different in the x-direction than in the y-direction.

FIG. 8B illustrates example diffraction intensities for the phase-modulated axilens 800 of FIG. 8A at a single wavelength it along the y=-x plane. Radiation at the single wavelength is incident on the phase-modulated axilens 800 causing the phase-modulated axilens 800 to create the radiation pattern 810, The radiation pattern 810 includes four focal locations, with three of them being shown in FIG. 8B as location 812a, 812b, and 812c. The focal locations are not directly on the z-axis but are projected in space away from the z-axis. FIG. 8C illustrates diffraction intensities of the radiation pattern 810 of FIG. 8B in the x-y plane at z=300 µm plane (the focusing plane). The two dimensional phase modulation is shown to create four focusing locations 822a, 822b, 822c, and 822d in the focusing plane. FIG. 8D illustrates a perspective view of the 4-level phase-modulated axilens 800, according to some implementations of the present disclosure.

Figure 9A:
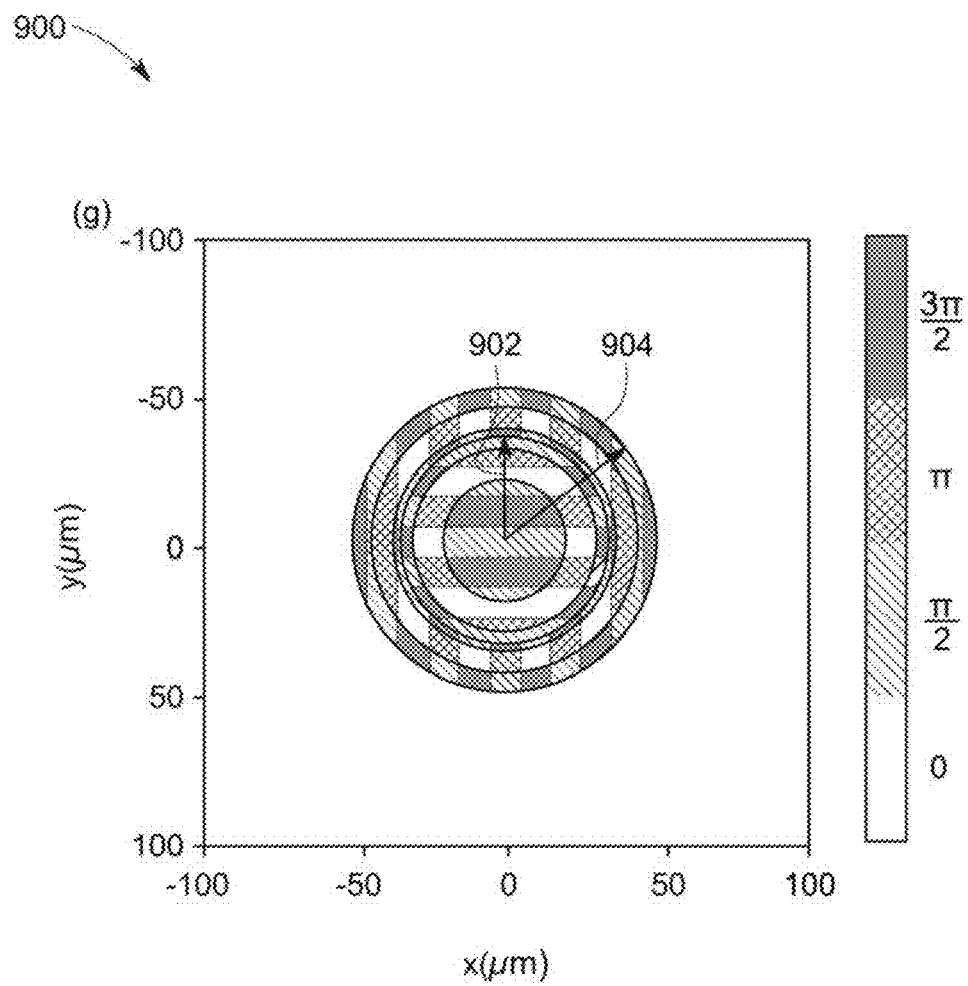
FIG. 9A illustrates a 4-level diffractive optical element with one dimensional horizontal and vertical phase modulations in non-overlapping regions, according to an embodiment of the present disclosure.

Two dimensional phase modulation can be incorporated in phase-modulated axilenses by region. For example, FIG. 9A illustrates a 4-level phase-modulated axilens 900 with phase modulation in a horizontal dimension and phase modulation in a vertical dimension. One dimensional horizontal phase modulation is used in a region within a first radius 902 of the phase-modulated axilens 900, and one dimensional vertical phase modulation is used within a region between the first radius 902 and a radius 904 of the phase-modulated axilens 900. A ratio of the radius 904 to the first radius 902 can be 1.455 in some embodiments. A ratio of 1.455 can produce equal intensity of focal spots in a focusing plane.

Figure 9B:
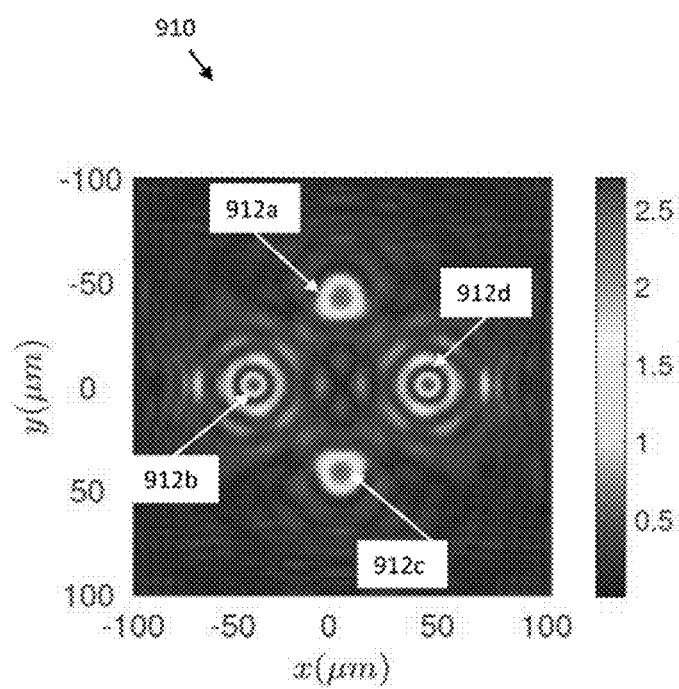
FIG. 9B illustrates diffraction intensities for the 4-level diffractive optical element of FIG. 9A at a focusing plane.

FIG. 9B illustrates diffraction intensities for the phase-modulated axilens 900 of FIG. 9A at a single wavelength λ in a focusing plane. Radiation at the single wavelength is incident on the phase-modulated axilens 900 causing the phase-modulated axilens 900 to create the radiation pattern 910. The radiation pattern 910 includes four focal locations, shown in FIG. 9B as locations 912*a*, 912*b*, 912*c*, and 912*d*. The vertical and horizontal gratings create focal locations along the x and y axes as indicated in FIG. 9B. This is different from FIG. 8C where the focal locations 822*a-d* do not lie on either of the x or y axis.

Figures 10A, 10B, 10C, 10D:
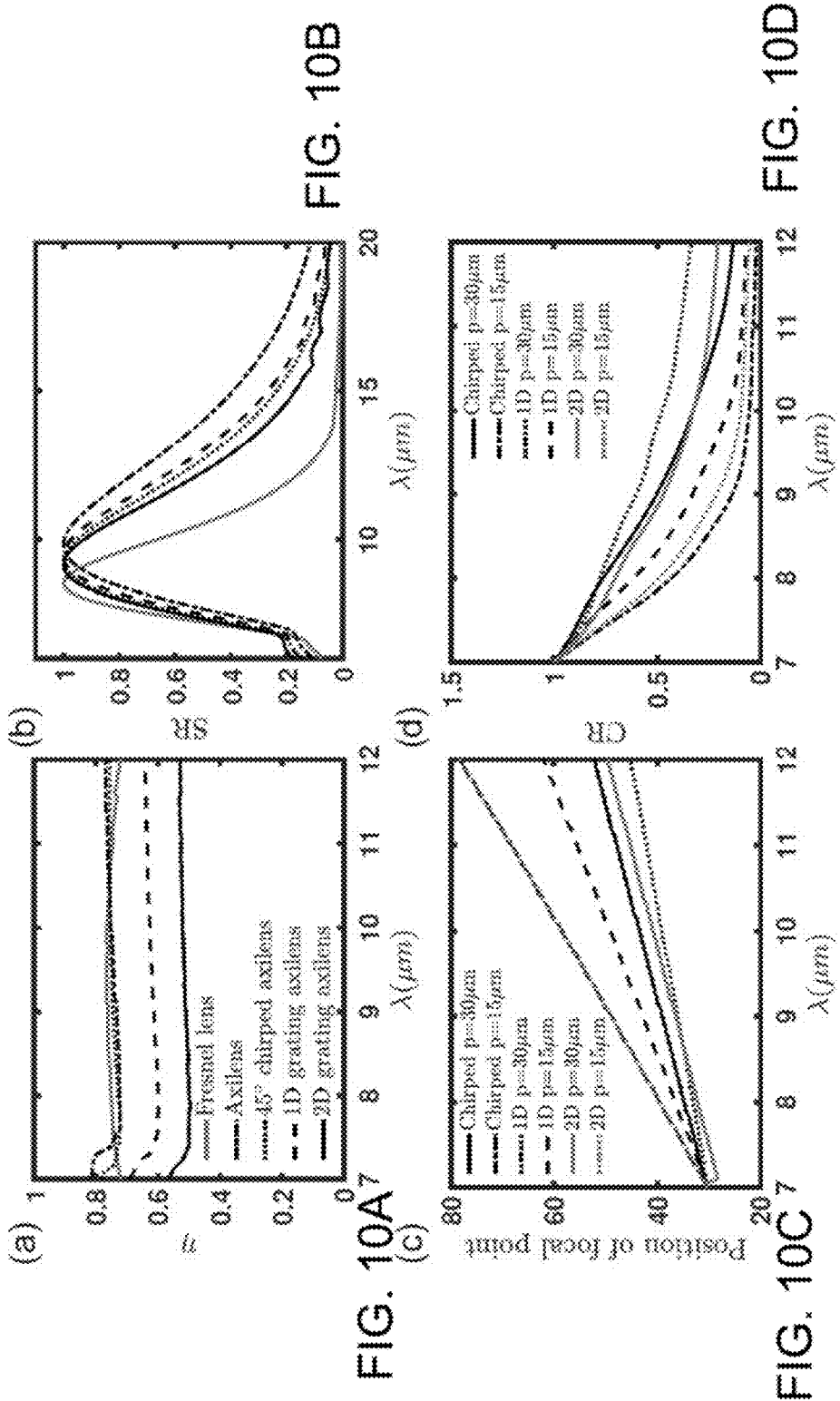
FIGS. 10A-D illustrate comparative results characterizing focusing behavior of diffractive optical elements.

FIGS. 10A-D illustrate comparative results characterizing focusing behavior of phase-modulated axilenses. FIG. 10A is a graph depicting spectral dependence of focusing efficiency η for a Fresnel lens, an axilens, and three phase-modulated axilenses according to some embodiments of the present disclosure. The three phase-modulated axilenses include a 45° chirped axilens (e.g., the phase-modulated axilens 600 of FIG. 6A), a one dimensional grating axilens (e.g., the phase-modulated axilens 410 of FIG. 4B), and a two dimensional grating axilens (e.g., the phase-modulated axilens 800 of FIG. 8A). The Fresnel lens has an $f_0$ of 300 μm, and the axilens and phase-modulated axilenses have $f_0$ of 250 μm and Δf of 120 μm. The one dimensional grating axilens, the two dimensional grating axilens, and the 45° chirped axilens have a periodicity p of 15 μm. The focusing plane was chosen to be 300 μm, and a different $f_0$ value from the Fresnel lens was chosen for the different axilenses in order to center the depth of focusing region in the z=300 μm focusing plane. Referring to FIG. 10A, despite the decrease in focusing efficiency η for the phase-modulated axilenses when compared to the conventional axilens, the phase-modulated axilenses maintain a high efficiency (~72% for the 45° chirped axilens and ~61% for the one dimensional and two dimensional grating axilenses) over the broad wavelength range of 7 μm to about 12 μm.

FIG. 10B is a graph depicting spectral response (SR) for the different optical devices identified in FIG. 10A. FIG. 10B demonstrates significantly increased spectral responses spanning across the long-wavelength infrared band for the axilens and the phase-modulated axilenses compared to the Fresnel lens due to underlying axilens phase profiles. That is, the Fresnel lens has a smaller bandwidth when compared to the different axilenses.

FIG. 10C compares position of the focal point for different optical elements identified in the legend of FIG. 10C. The focal point position shifts linearly when increasing wavelength of the incident radiation. Decreasing periodicity of phase modulation increases slope of the wavelength shift. In some implementations, further decreasing periodicity can hit a limit where the linear trend breaks down and wavelength scaling of the diffraction angle controls the location of the focal point.

FIG. 10D is a graph showing crosstalk ratio (CR) for different types of phase-modulated axilenses identified in FIG. 10C. CR is defined in Eq. 4.

$$CR = \int_{x1}^{x2} I_{ol}(x,\lambda_0,\lambda)dx / \int_{x1}^{x2} I(x,\lambda_0)dx \quad (Eq.\ 4)$$

In Equation 4, $I_{ol}$ (x, $\lambda_0$, λ) is the one dimension (1D) intensity cut through the center of the overlapping focusing regions between incident wavelength $\lambda_0$ and λ. I(x, $\lambda_0$) is the intensity cut through the center of focal point with incident wavelength $\lambda_0$. CR quantities the cross talk between $\lambda_0$ and λ at the same location. Referring to FIG. 10D, CR for the different modulated axilenses is determined by fixing $\lambda_0$ at 7 μm and sweeping λ from 7 λm to 12 μm. The phase modulation with the smallest periodicity features the smallest CR at the same wavelength since the focal points of $\lambda_0$ and λ are further separated by the periodic modulation of the phase of the device on the focal plane, as demonstrated in FIG. 10C. That is, CR is reduced by decreasing periodicity p. Consistently with the larger focal shifts reported in FIG. 10C, the 45° chirped axilens features smaller CR values compared with the one dimensional grating axilens at the same λ. However, CR drops below 0.35 when increasing λ to 9.5 μm.

Figure 10E:
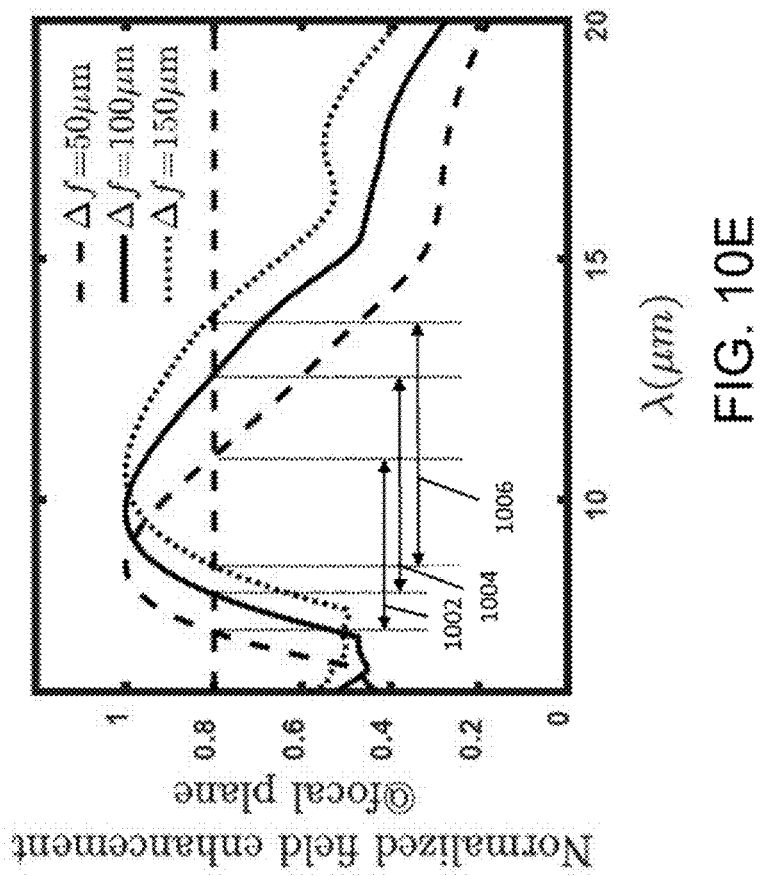
FIG. 10E illustrates changes in bandwidth for 4-level diffractive optical elements with two dimensional phase modulation, according to some embodiments of the present disclosure.

FIG. 10E illustrates changes in bandwidth for 4-level phase-modulated axilenses with two dimensional gratings according to some embodiments of the present disclosure. For 4-level axilenses of the same size, by changing the focal depth Δf, bandwidth of the phase-modulated axilens can be adjusted. As shown in FIG. 10E, enhancing the focal depth Δf from 50 μm to 100 μm to 150 μm increases bandwidth of the field response on the focal plane from bandwidth 1002 to bandwidth 1004 to bandwidth 1006, respectively. An increased focal depth Δf can sometimes require a larger phase-modulated axilens. Similarly, it can be shown that increasing a phase-modulated axilens's maximum radius R as defined in Eq. 1) while keeping other parameters the same can reduce bandwidth. That is, a larger phase-modulated axilens will have a comparatively smaller bandwidth compared to a smaller phase-modulated axilens.

Some embodiments of the present disclosure provide 4-level phase-modulated axilenses that can be designed using the RS formulation of Eqs. 2 and 3. Although RS formulation is deemed in conventional approaches to lead to inaccurate conclusions, designing 4-level phase-modulated axilenses according to some embodiments of the disclosure substantially match FEM numerical simulations. FEM simulation for such a design can take tens of hours for simulating one wavelength on a computing cluster with 40 processing unit cores and 786 Gb of RAM. The RS formulation on the other hand can provide results for one wavelength in about ten seconds. As such, compared to conventional optical element design that requires FEM simulations for validation, the design cycle is shortened by orders of magnitude when designing diffractive optical elements according to some embodiments of the present disclosure. A shortened design cycle can greatly improve time to market for phase modulated axilenses according to some embodiments of the present disclosure.

Figure 11A:
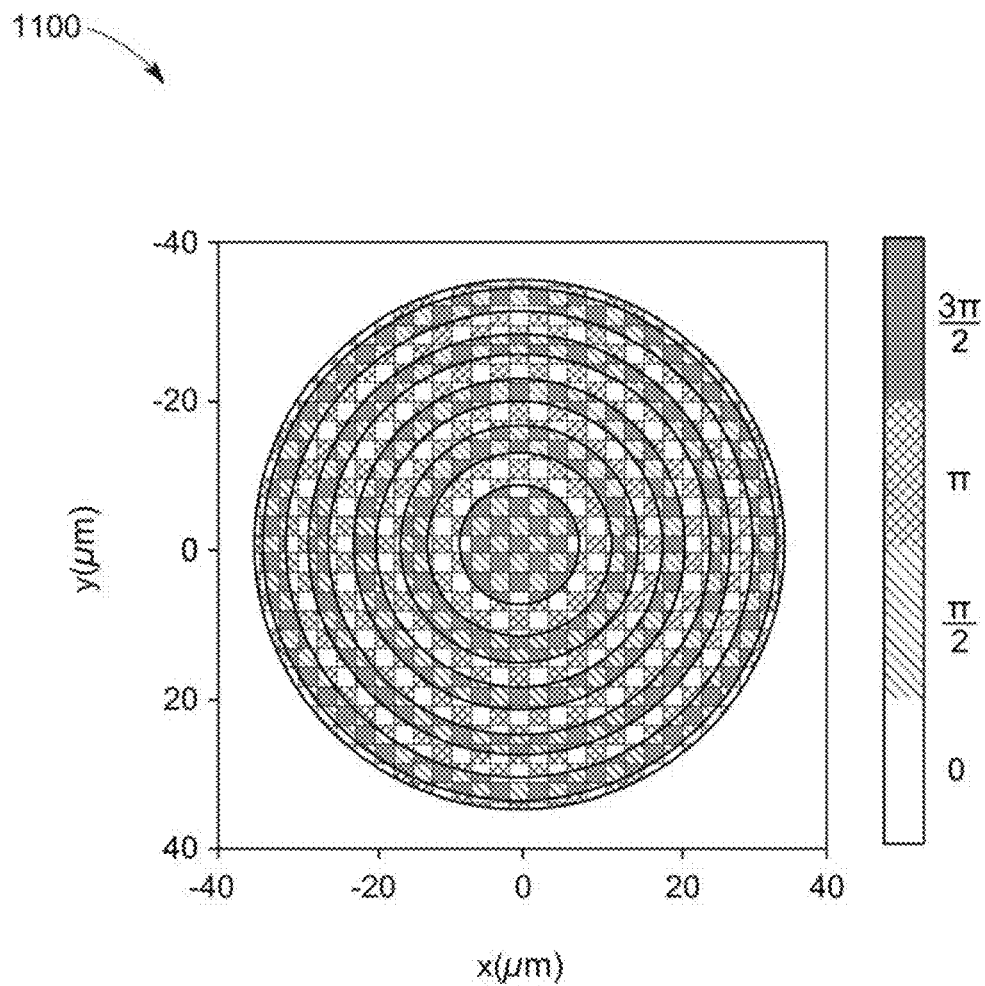
FIG. 11A illustrates a 4-level diffractive optical element with two dimensional phase modulation, according to some embodiments of the present disclosure.
Figure 11B:
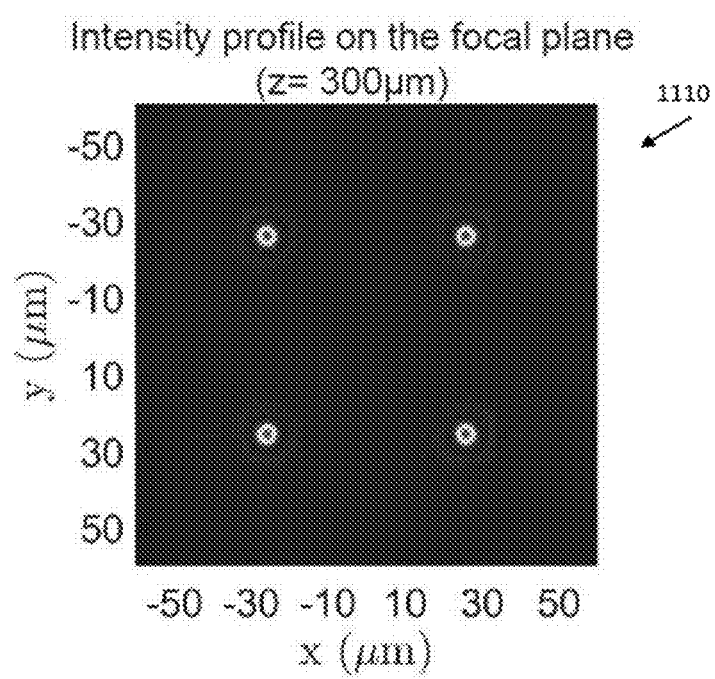
FIG. 11B illustrates diffraction intensities for the 4-level diffractive optical element of FIG. 11A at a focusing plane.

Embodiments of the present disclosure can be used to implement an on-chip single-lens microspectrometer. FIG. 11A provides a 4-level phase modulated axilens 1100 with two dimensional phase modulations having the following Eq. 1 parameters: $f_0$ of 100 μm, Δf of 200 μm, R of 35 μm, p of 5 μm, and design wavelength λ of 850 μm. The phase modulated axilens 1100 is merely provided as an example, and these parameters can be flexibly changed to address other designed spectral ranges and/or dielectric substrate thickness and the refractive indices of different materials. Similar to phase modulated axilenses already described with two dimensional phase modulation, in FIG. 11B, the phase modulated axilens 1100 creates a radiation pattern 1110 with four focal locations at the focusing plane of z=300 μm when illuminated with an incident radiation at the design wavelength λ.

Figures 11C, 11D:
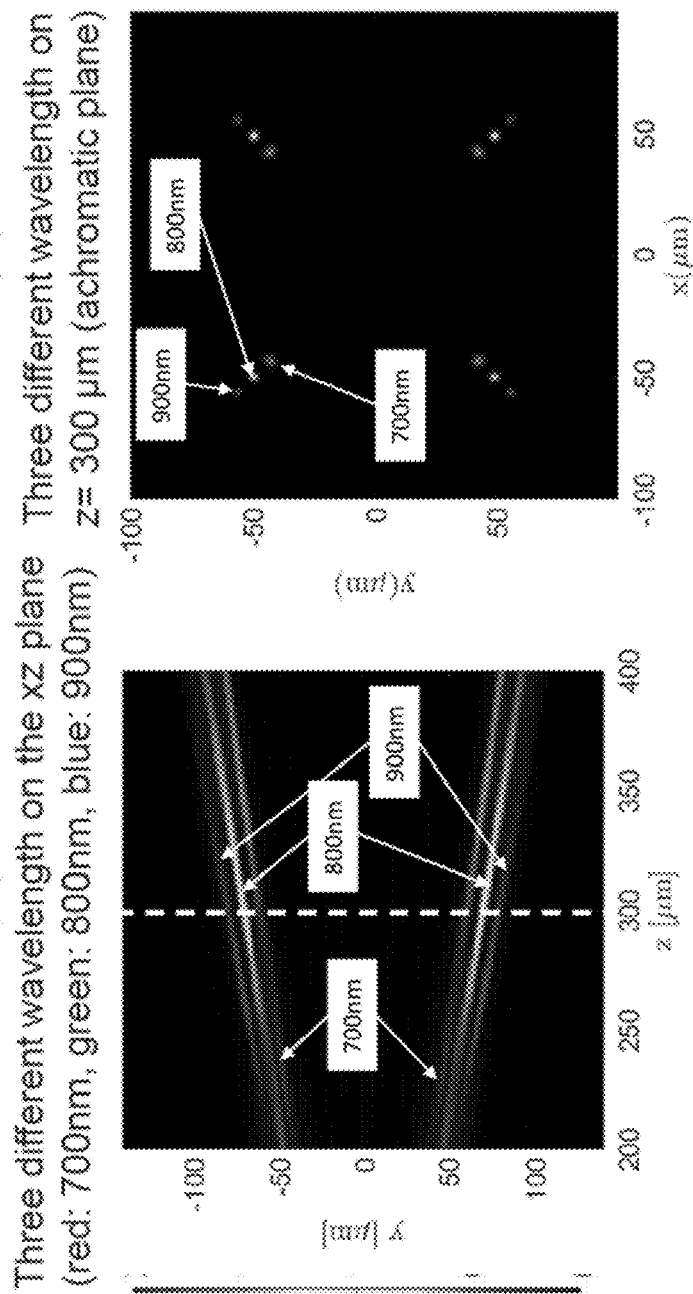
FIG. 11C illustrates diffraction behavior for the 4-level diffractive optical element of FIG. 11A at three different wavelengths on a plane.
FIG. 11D illustrates diffraction behavior for the 4-level diffractive optical element of FIG. 11A at three different wavelengths on the focusing plane.

FIG. 11C illustrates diffraction behavior for the phase-modulated axilens 1100 of FIG. 11A at three different wavelengths along a diagonal plane, that is, the y=−x plane or the y=x plane (see FIG. 8B for an analogous plane). The three different wavelengths are 700 nm, 800 nm, and 900 nm. FIG. 11D illustrates diffraction behavior for the phase-modulated axilens 1100 of FIG. 11A at the focusing plane. FIG. 11D shows that the three different wavelengths are focused at different locations in the focusing plane. Since a two dimensional phase modulation creates four focused locations, each of the three wavelengths has four focused locations on the focusing plane. A separation between the focused locations is dependent on wavelength as discussed above (see e.g., FIG. 10C which provides a graph relating focal location to wavelength).

In some implementations, there is a linear control of diffraction angle when increasing wavelength of the incident radiation. Diffraction angle is obtained by measuring spectral shift on the focusing plane with respect to the center of the phase-modulated axilens 1100. From the diffraction angle measurements, spectral resolution of $3.3 \times 10^{-4}$ rad/m can be achieved in the visible to near infrared spectral regime. The phase-modulated axilens 1100 can be utilized as ultra-compact, single-lens spectrometers. Proof of concept designs were demonstrated to exhibit 70 μm diameter and about 25% focusing efficiency at each focus location. 200 nm bandwidth was demonstrated, but 5 nm bandwidths are possible with current lithographic techniques.

Figure 11F:
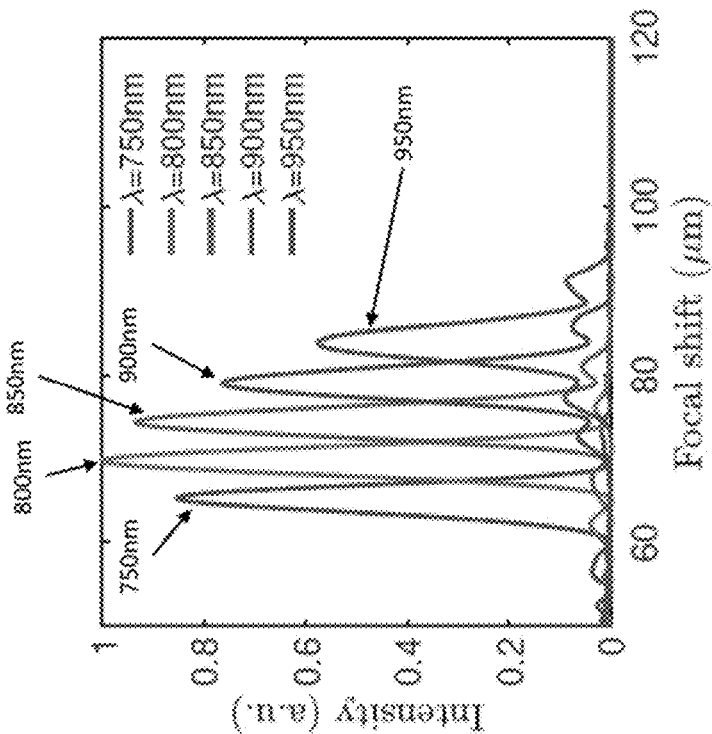
FIG. 11F is a graph showing normalized intensity profiles for different wavelengths on the focusing plane.
Figure 11E:
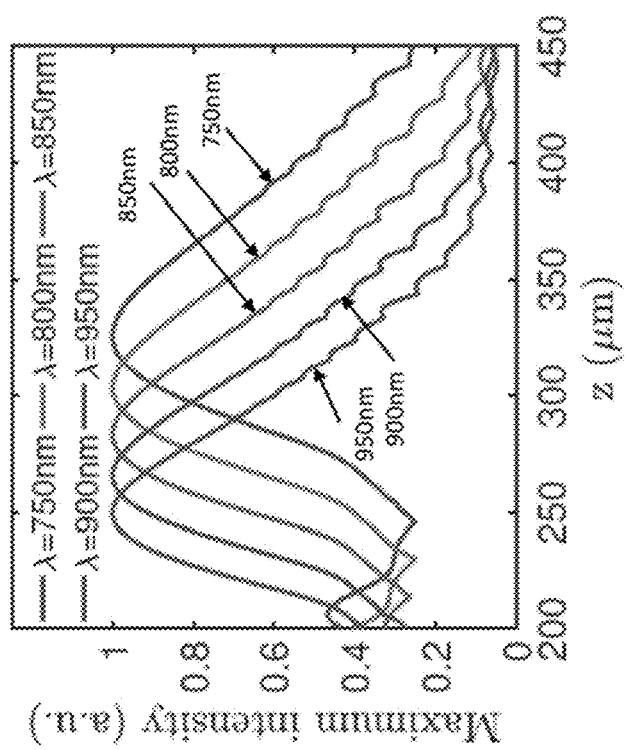
FIG. 11E is a graph showing normalized maximum intensity profiles of focused wavelengths at a distance from the 4-level diffractive optical element of FIG. 11A.

FIG. 11E is a graph showing normalized maximum intensity profiles of focused wavelengths at a distance z from the phase-modulated axilens 1100 of FIG. 11A. The different intensity profiles display an almost constant 200 μm focal depth (FWHM m FIG. 11E), FWHM stands for full width at half maximum. Since focal depth is 200 μm, a relative large intensity is observed at the focusing plane.

FIG. 11F is a graph showing normalized intensity profiles for different wavelengths on the focusing plane. FIG. 11F specifically shows transverse spatial intensity distributions on the focusing plane for different incident wavelengths sampled along the y=x plane. The phase-modulated axilens 1100 is shown to be able to focus different wavelengths on the same plane and deflect the different wavelengths at different transverse positions.

Figure 11G:
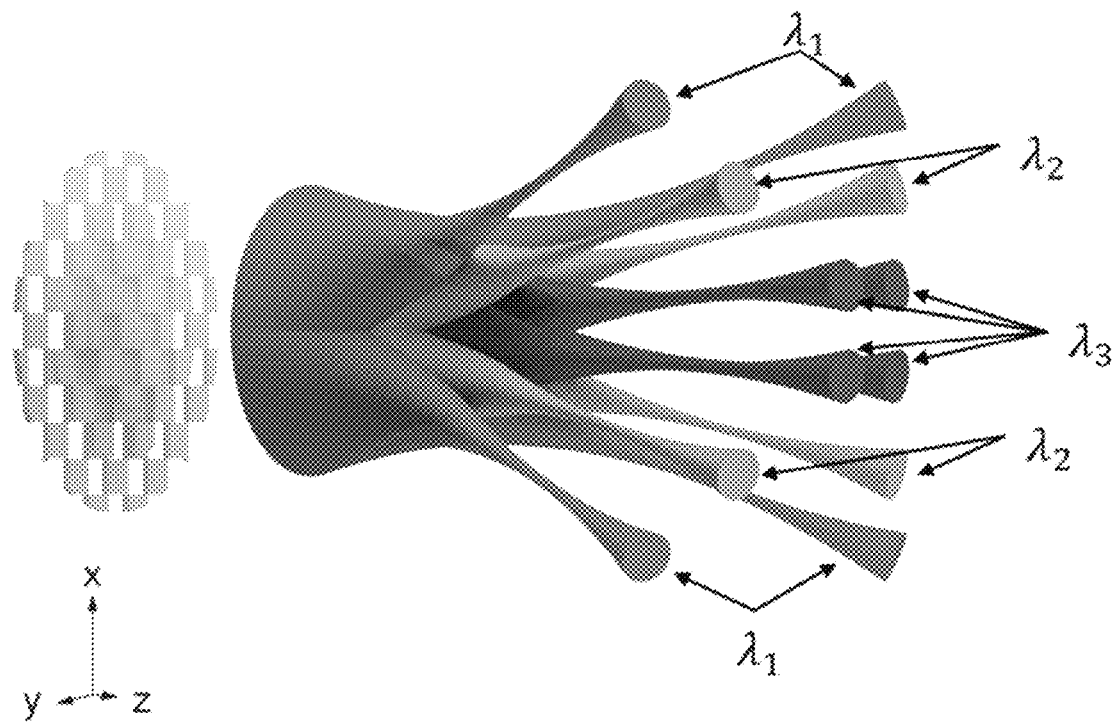
FIG. 11G illustrates a modeled diffractive behavior for the 4-level diffractive optical element of FIG. 11A.
Figure 11H:
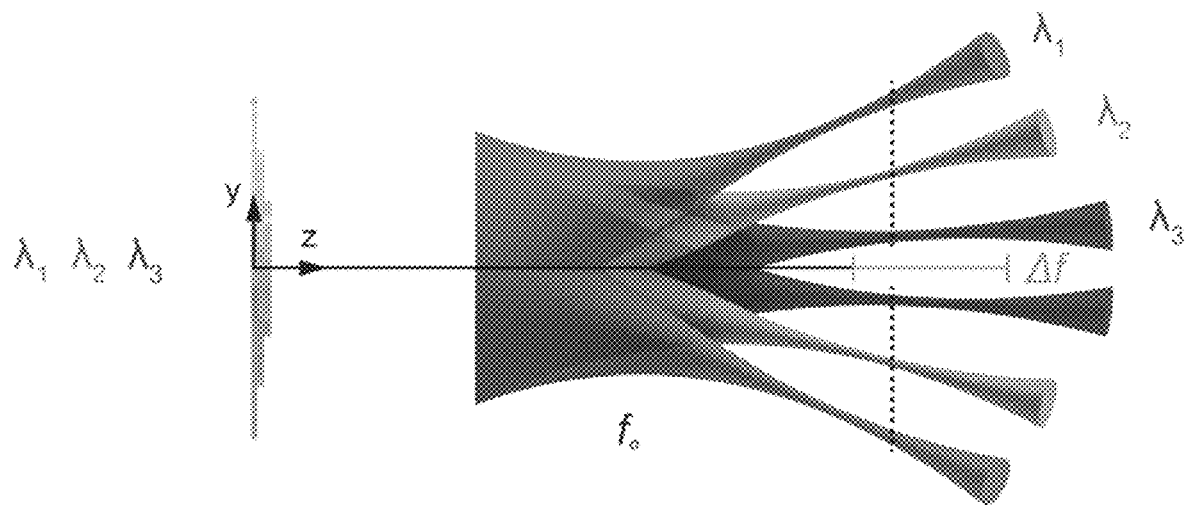
FIG. 11H illustrates a side profile view of the modeled behavior of FIG. 11G.

FIG. 11G illustrates a modeled diffractive behavior for the 4-level diffractive optical element of FIG. 11A. FIG. 11H illustrates a side profile view of the modeled behavior of FIG. 11G. Under polychromatic illumination, the 4-level diffractive optical element of FIG. 11A simultaneously splits and focuses incoming radiation at distinct spatial locations as a function of wavelength on the same focusing plane. FIG. 11H is a side-view of the achromatic focusing behavior of the 4-level diffractive optical element of FIG. 11A. The achromatic plane is indicated by the black: dashed lines.

In some embodiments of the present disclosure, the phase-modulated axilens 1100 can be manufactured using a lithography process. The phase-modulated axilens 1100 can be realized on a top surface of a material with high transparency and/or a high refractive index (e.g., n=2.0). Examples of materials include hydrogenated amorphous silicon, titanium dioxide, silicon nitride, gallium nitride, crystalline polycrystalline silicon, etc.

In some implementations, instead of a monolithic substrate, hydrogenated amorphous silicon (a-Si:H) thin films can be grown reactively on fused silica (SiO2) substrates using a sputtering system. Prior to the a-Si:H thin film deposition using the sputtering system, the silica substrate can be solvent washed, sonicated, and plasma ashed in an oxygen atmosphere. The a-Si:H films can be deposited using the following conditions: (a) a sputtering base pressure below $3 \times 10^{-7}$ Torr, (b) deposition pressure around 10 mTorr with an Ar:H2 gas flow ratio of 4:1 Sccm, (c) substrate temperature of about 300° C., and (d) radio frequency deposition power of about 200 W. After deposition, the a-Si:H thin film can have an average refractive index of 3 and an optical transmission of greater than 85% across an operating range of interest. In this example, the operating range was the visible to near infrared spectra.

Figure 12A:
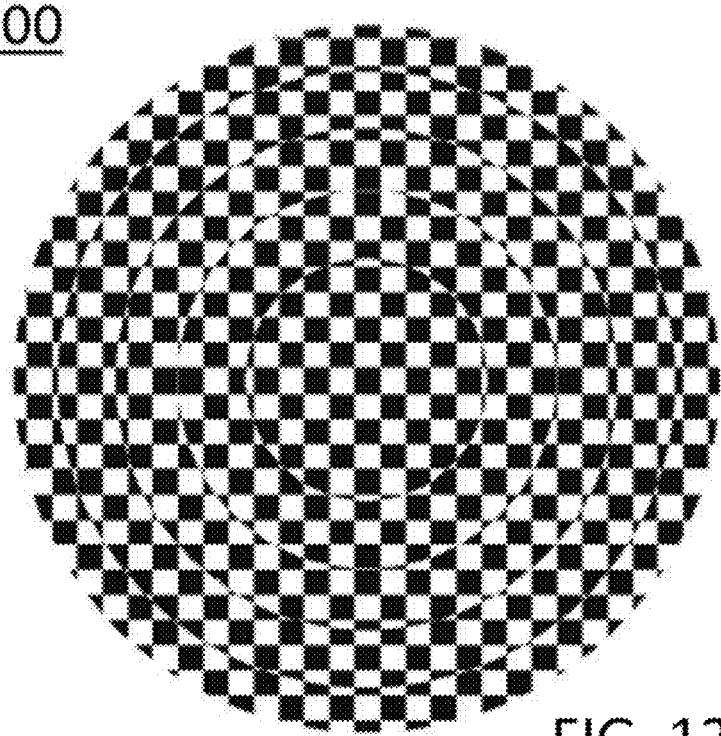
FIGS. 12A-B illustrate etch masks for a lithography process, according to some embodiments of the present disclosure.
Figure 12B:
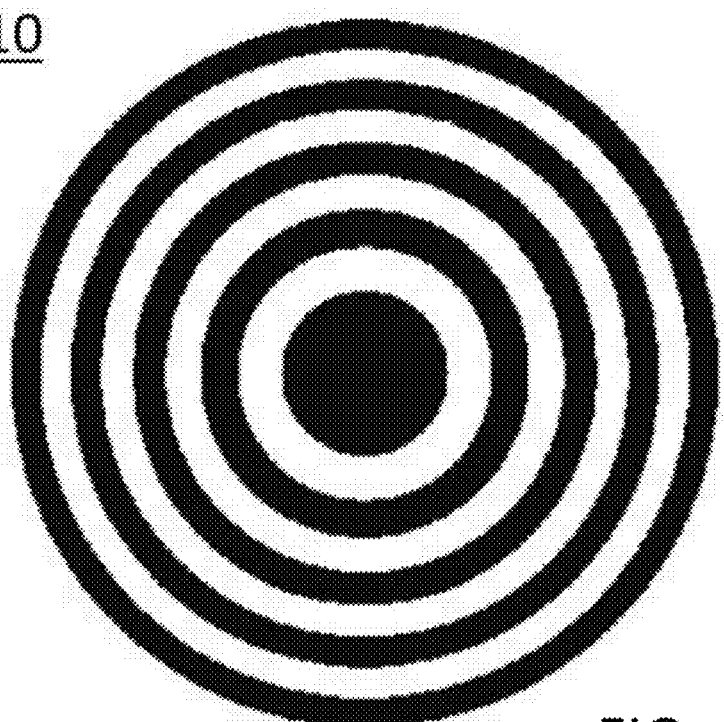

The lithography process for creating the 4-level phase-modulated axilens 1100 can use four, three, or two etch masks. The lithography process will be described herein for the case where two etch masks are used. FIGS. 12A and 12B illustrate a first etch mask design 1200 and a second etch mask design 1210, respectively, for the lithography process using two etch masks. The first etch mask is created by combining boundary definitions for the fourth and second level areas of the 4-level phase-modulated axilens 1100. The second etch mask con bines the fourth and third level areas of the 4-level phase-modulated axilens 1100.

Figure 12C:
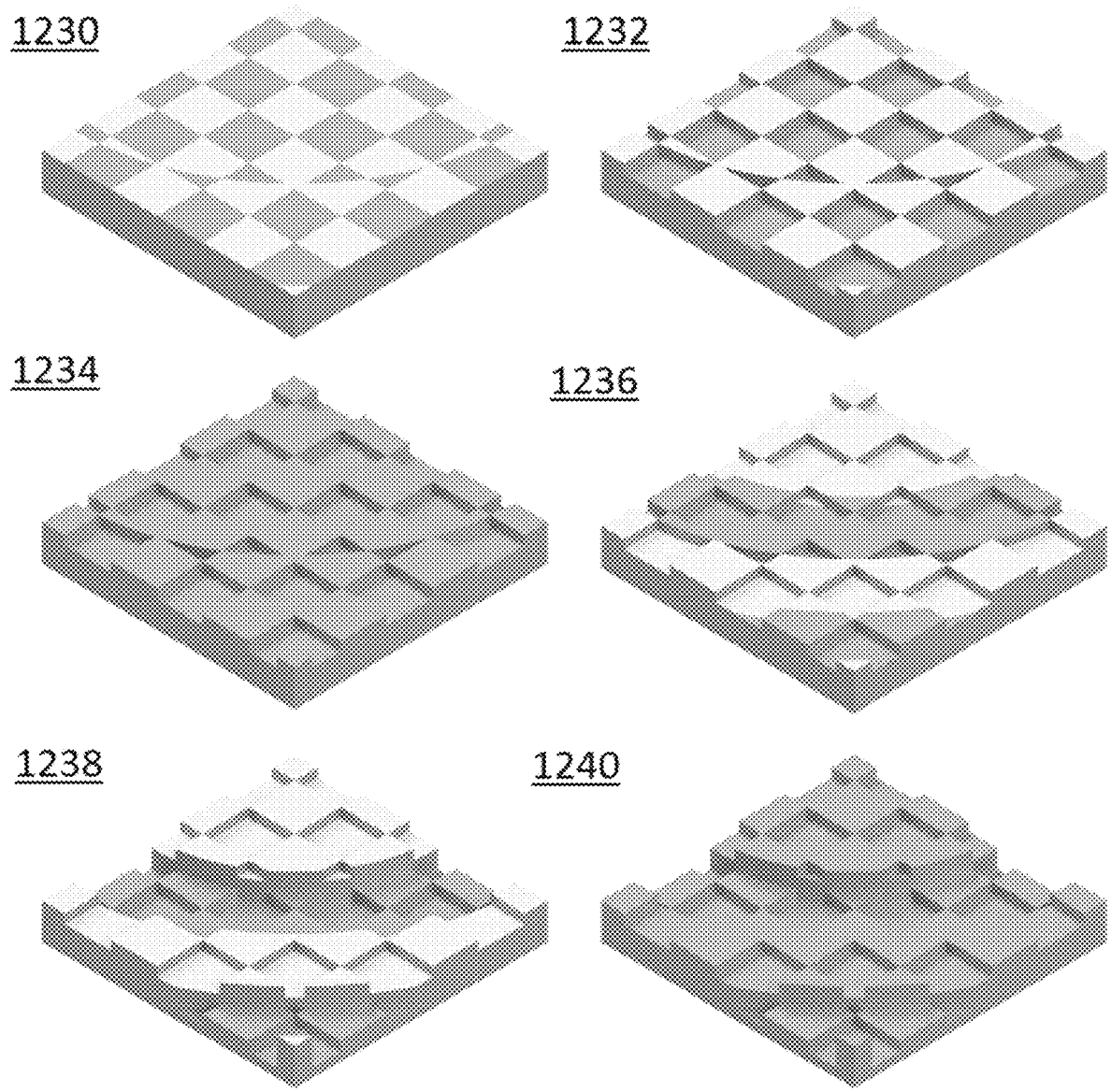
FIG. 12C illustrates a process for creating a 4-level diffractive optical element using the etch masks of FIGS. 12A-B.

FIG. 12C illustrates a process for creating the 4-level phase-modulated axilens 110 using the first and second etch mask design of FIGS. 12A and 12B. Steps 1210, 1212, and 1234 are associated with a first processing iteration, and steps 1236, 1238, and 1240 are associated with a second processing iteration. A processing iteration involves (a) a lithographic patterning of a mask on a surface, (b) etching a pattern of the mask into the surface, and (c) removing residual hard masks from the surface. Steps 1230 and 1236 are lithographic patterning of the first and the second etch masks, respectively. The designed etch masks 1200 and 1210 can be transferred to metal hard masks with lithography and electron beam evaporation using a positive resist and a lift-off process. Steps 1232 and 1238 involve defining thicknesses using deep dry etch. Steps 1234 and 1240 involve wet etch removals of the residual hard masks. Each etching step defines two new layers and the process can be extended to define more than four layers. The first etch step defined two layers, and the second etch steps defined another two layers.

In some implementations, electron beam lithography (EBL), a chromium (Cr) hardmask, and a reactive ion etching (RIE) anisotropic dry etch is used for both the first and the second processing iterations. In addition, gold (Au) alignment marks with titanium (Ti) adhesion layers are deposited on the surface before device fabrication. The positive photoresist used can be spun at around 3000 rpm and baked in an oven at around 170° C. for 20 min. After both photoresist and baking steps, a thin conducting layer of Au may be deposited using a sputtering system. Photoresist exposure can be performed at 30 keV with a 38 pA current and an area dosage of 250 μC/cm².

Before developing the exposed photoresist, the conductive Au layer can be removed with a 3 s Au wet etchant step. The photoresist can be developed for 70 s in 1:2 ratioed MIBK:IPA solution. MIBK is a solvent, and IPA is isopropyl alcohol (a non-solvent). Afterwards, the substrate can be immersed in IPA solution for 20 s prior to rinsing in deionized water (H₂O). Anisotropic dry etching can be performed with sulfur hexafluoride (SF₆) gas at 150 W. The etch rate of the thin films under these conditions is about 1.2 nm/s.

Hydrogenated amorphous silicon has excellent transparency and a high refractive index of around 3.0 at visible and near infrared wavelengths. Additionally, physical deposition by sputtering is a preferred method since sputtering is a low-cost and scalable process. Diffractive optical device material makeup can be tailored to the using any material that is transparent and/or semi-transparent in a desired wavelength range or an expected device operation range. Although described above with respect to a thin film on a substrate, diffractive optical device material can be made of a single or multiple transparent and/or semi-transparent materials suitable for device fabrication. In addition, device fabrication can originate or extend from both bulk substrate and/or nanolayer/thin film material geometries relative to the wavelength of operation.

Although a lithography process is described for fabricating some embodiments of the present disclosure, other fabrication techniques can be used. For example, 3D-printing, imprinting/nano-imprinting, casting, targeted functionalization and growth, and self-assembly are some techniques that may be used to fabricate diffractive optical elements. Additionally, medium to low contrast photoresists can be used during lithography. Gradated exposure dosages for discrete and/or continuously varying etched material profiles can also be used during lithography.

In some implementations, materials can be incorporated and/or integrated with negative real permittivity in a desired wavelength range. Materials can be incorporated or integrated with driven real and/or imaginary refractive index tunability and or modulation. Materials can also be incorporated with driven negative to positive or positive to negative real permittivity tunability and/or modulation that allow for further tuning of the radiation response. Additionally, one or more low to intermediate refractive index and/or anti-reflection coatings can be applied to diffractive optical elements to reduce index contrast-driven radiation losses and/or interference-driven radiation losses. Incident radiation wavelength filters, radiation directional filters, and/or polarization filters can be incorporated to improve functionality of diffractive optical elements.

Figure 12D:
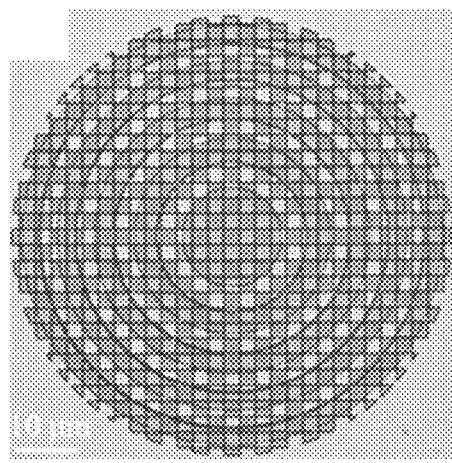
FIG. 12D illustrates a top view of an optical reflection bright field image of a fabricated 4-level diffractive optical element according to some embodiments of the present disclosure.
Figure 12E:
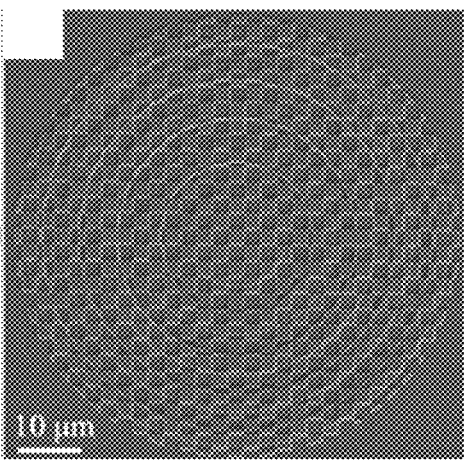
FIGS. 12E-G illustrate scanning electron microscope images of the fabricated 4-level diffractive optical element of FIG. 12D.
Figures 12F, 12G:
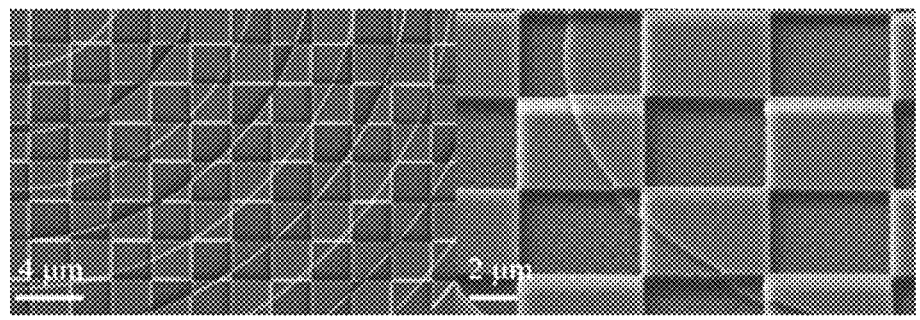

FIG. 12D illustrates a top view of an optical reflection bright field image of a fabricated 4-level diffractive optical element according to some embodiments of the present disclosure. FIGS. 12E-G illustrate scanning electron microscope (SEM) images of the fabricated 4-level diffractive optical element of FIG. 12D. FIG. 12E show a full top-view of the fabricated phase-modulated axilens, and FIGS. 12F-G show two higher magnification SEM images of the same fabricated phase-modulated axilens.

FIG. 12H illustrates an experimental setup for testing a diffractive optical element according to some implementations of the present disclosure. FIG. 12I-J illustrate experimental results for the fabricated 4-level diffractive optical element of FIG. 12D. FIG. 12I shows intensity profiles for five different wavelengths, evaluated along a 45-degree plane (analogous to FIG. 11C). FIG. 12J shows intensity profiles the z=300 μm, achromatic focusing plane. The white square is a zoom-in of the different focal spot positions for the different incident wavelengths Some embodiments of the present disclosure provide diffractive optical elements that can perform the function of a multi-focusing optical lens and spectrometer with considerable reduction in cost, complexity, and size. Specifically, targeted wavelengths or wavelength bands of incident radiation can be designed to be sharply focused at spatially separated locations along the optical axis of the device with a high focusing efficiency. Although specific wavelengths are provided as examples, these examples are not intended to limit wavelength selection. Embodiments of the present disclosure can be designed to operate at any wavelength, be it optical wavelengths, infrared wavelengths, microwave wavelengths, etc. As long as an electromagnetic wave can interact with a transparent and/or semi-transparent material and/or medium, embodiments of the present disclosure can be applied.

Dual band (and multi-band) photodetectors rely on photosensitive pixels with different spectral sensitivity that are vertically stacked on different planes. Current light focusing technology cannot adequately address all these different planes simultaneously using compact and planar device structures. Embodiments of the present disclosure can alleviate at least this drawback of current light focusing technology by providing a viable solution for simultaneous focusing of targeted radiation on different photosensitive planes and locations. Embodiments of the present disclosure can potentially solve the dual band bottleneck of infrared photodetectors and of multispectral visible cameras.

Figure 13:
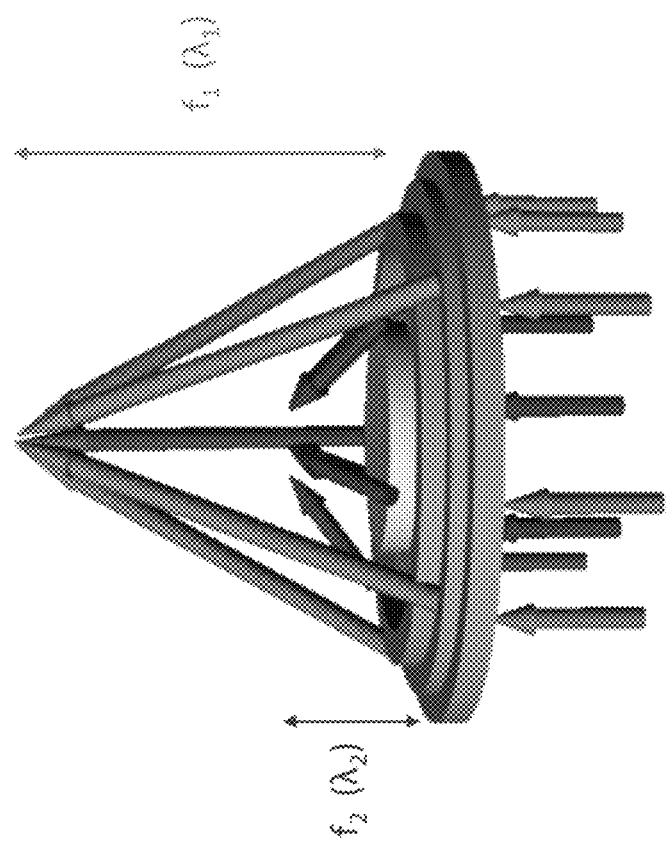
FIG. 13 is a conceptual image of a diffractive optical element that can focus incident radiation at two focusing locations along the optical axis of the diffractive optical element.

Some embodiments of the present disclosure combine multiple concentric axilenses to focus incident radiation at different focal locations along the optical axis. In some embodiments, multiple concentric Fresnel lenses are combined to focus incident radiation at different focal locations along the optical axis. FIG. 13 is a conceptual image showing an example of combining two concentric Fresnel lenses to focus incident radiation at different focal locations.

Phase distribution of a combination of two axilenses can be expressed using Eq. 5.

$$\phi(r) = \begin{cases} -\frac{2\pi}{\lambda_1}\left[\sqrt{\left(f_1 + \frac{r\Delta f}{R}\right)^2 + r^2} - \left(f_1 + \frac{r\Delta f}{R}\right)\right]\bigg|_{2\pi} & 0 < r < r_1 \\ -\frac{2\pi}{\lambda_2}\left[\sqrt{\left(f_2 + \frac{r\Delta f}{R}\right)^2 + r^2} - \left(f_2 + \frac{r\Delta f}{R}\right)\right]\bigg|_{2\pi} & r_1 < r < R \end{cases} \quad \text{(Eq. 5)}$$

Figure 14:
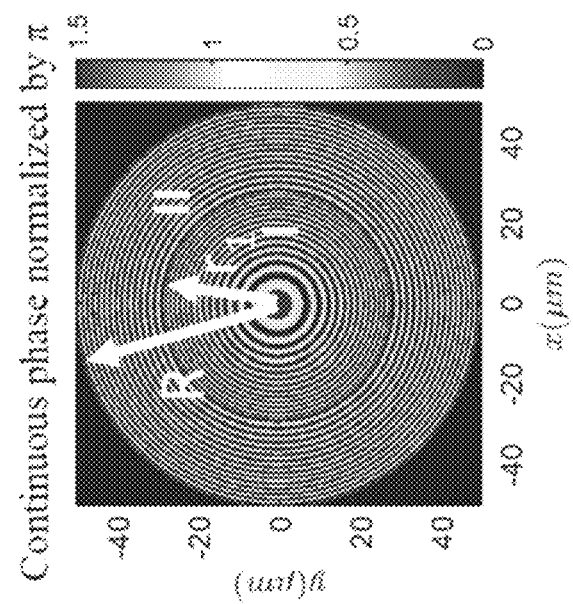
FIG. 14 is an example diffractive optical element with a continuous phase profile showing different regions with different phase profiles, according to some embodiments of the present disclosure.

FIG. 14 illustrates an example diffractive optical element 1400 with a continuous phase profile showing different regions I and II that indicating the different Fresnel lenses. Eq. 5 is generalized for an axilens, but to apply it to a Fresnel lens, the focal depth Δf is set to 0. In Equation 5, $f_1$ and $f_2$ correspond to the focal lengths for a first region defined by the radius $r_1$ (region I) and a second region defined between the radius $r_1$ and maximum radius R, respectively. Δf focal depth is designed to be the same, but there are other embodiments that can change this value so that they are different for both regions I and II. $\lambda_1$ and $\lambda_2$ are design frequencies for region I and region II, respectively.

Similar to other diffractive optical elements according to the present disclosure, the diffractive optical element 1400 with the continuous phase profile can be discretized. The number of multi-level layers that discretizes the continuous phase profile can be adjusted to a lower number to reduce fabrication steps or to a higher number to try and approximate the continuous phase profile. Furthermore, although two focusing locations are depicted and two wavelengths are depicted, more than two wavelengths and/or wavelength bands and more than two spatially separated focusing locations can be achieved. For example, three regions can be defined, four regions can be defined, etc.

FIG. 15A illustrates example diffraction intensities for a diffractive optical element designed according to the concept illustrated in FIG. 13. In FIG. 15A, focal locations for two wavelengths 690 nm and 800 nm are depicted. The focal location closer to the diffractive optical element shows a radiation pattern with a shorter focal depth when compared to the radiation pattern at the focal location farther from the diffractive optical element. FIG. 15B illustrates intensity of the two wavelengths along the z direction, showing a separation of at least 10 µm. Parameters for the diffractive optical element showing properties in FIGS. 15A-B include $\lambda_1=690$ nm, $\lambda_2=800$ nm, $f_1=40$ µm, and $f_2=55$ µm.

Area ratio between region I and region II can affect focusing efficiency η. In some implementations, an optimal η is obtained when the area ratio $R/r_1$ is 1.6. Crosstalk can be reduced in these devices to about 15% if the separation between $f_1$ and $f_2$ is larger than 5 µm. A diffractive optical device according to the concept in FIG. 13 will exhibit dual band behavior, producing a frequency response as shown in the example of FIG. 15C. Furthermore, incident light polarization is unnecessary, but if polarization is used, a larger number of focal locations (i.e., more than two) can be obtained from the same device.

FIG. 15D illustrates diffraction intensities for a diffractive optical element according to the concept in FIG. 13. Upon illumination, the diffractive optical element focuses selected wavelength bands centered at $\lambda_1$ and $\lambda_2$ at designed focal points $f_1$ and $f_2$. The intensity profile was determined using $R/r_1$ of 1.71. FIG. 15E illustrates an example frequency response showing dual band behavior of a diffractive optical element designed in accordance with the concept depicted in FIG. 13. FIG. 15F is a graph showing focusing efficiency as a function of sectioned regions of a diffractive optical element designed in accordance with the concept depicted in FIG. 13. $R/r_1$ was swept to determine dependence of focusing efficiencies $\eta_1$ and $\eta_2$ on $R/r_1$.

FIG. 15G is a graph showing; focusing efficiency at two focusing locations as a function of an effective thickness of a diffractive optical element designed in accordance with the concept depicted in FIG. 13. $R/r_1$ was set at 1.55 and the effective thickness $\tilde{t}$ was changed to determine dependence of focusing efficiencies $\eta_1$ and $\eta_2$ on the effective thickness $\tilde{t}$. Flat multilevel diffractive lenses according to some embodiments of the present disclosure exploit variations in material thickness to impart desired phase delays on the incident radiation. In some embodiments, to satisfy the designed phase condition, the material thickness of the inner region $t_1$ and outer annular region $t_2$ have to be equal to $t_k=3\lambda_k/4(n-1)$, where η is refractive index and k=1, 2. As such, four lithography process steps can be required to fabricate such a device. However, to ease this fabrication process, a design or central wavelength $\tilde{\lambda}$ can be identified to determine the effective total device thickness $\tilde{t}=3\tilde{\lambda}/4(n-1)$ across the entire device area, reducing the required lithographic process steps to only two with a small reduction in the overall efficiency. As indicated in at FIG. 15G, effective device thickness of 266 nm, indicated by the black dashed line, equalizes the focusing efficiencies $\eta_1$ and $\eta_2$ at 30%, resulting in only a 1% reduction from the intersection of focusing efficiencies $\eta_1$ and $\eta_2$ in FIG. 15F. FIG. 15H is a graph showing intensity as a function of sectioned regions of a diffractive optical element designed in accordance with the concept depicted in FIG. 13. $R/r_1$ was swept to determine dependence of intensity on $R/r_1$.

Figure 17:
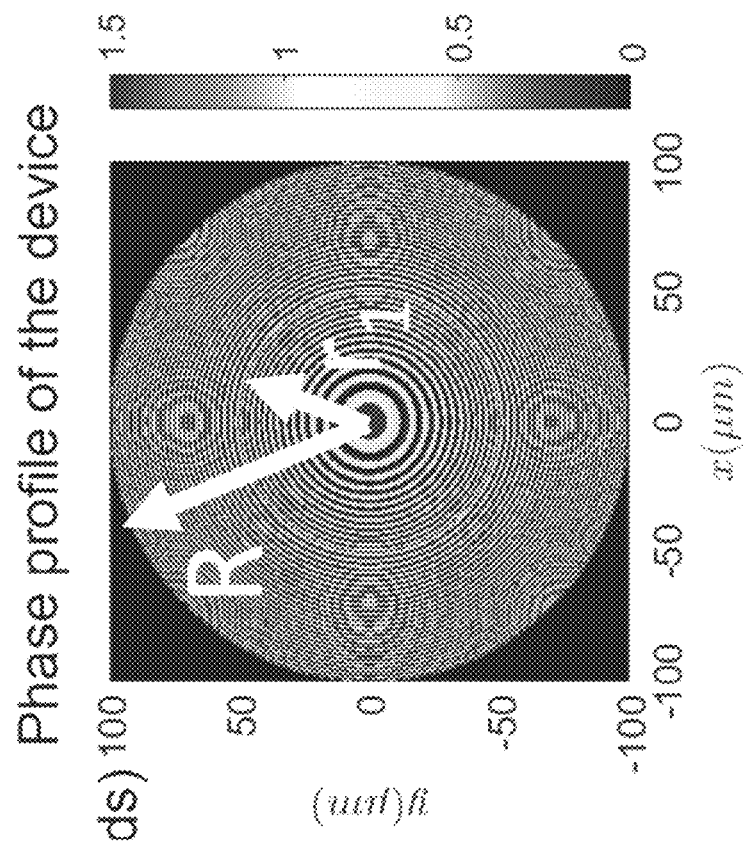
FIG. 17 is an example diffractive optical element with a continuous phase profile showing different regions with different phase profiles, according to some embodiments of the present disclosure.
Figure 16:
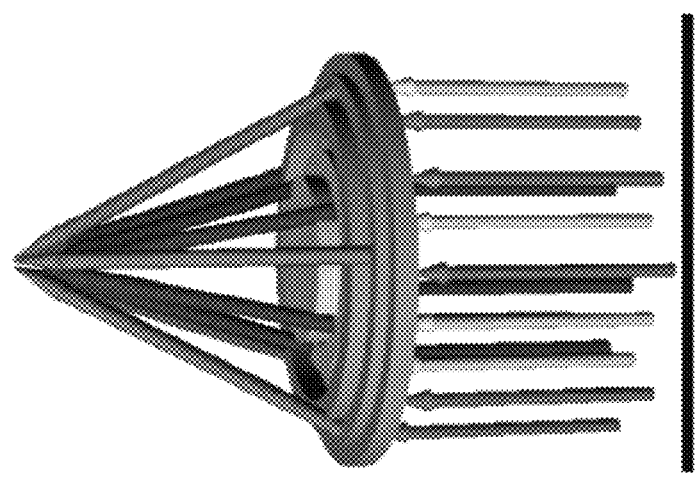
FIG. 16 is a conceptual image of a diffractive optical element that can focus incident radiation of two wavelengths at a same focusing location along the optical axis of the diffractive optical element.

FIG. 16 is a conceptual image of a diffractive optical element that can focus incident radiation of two wavelengths at a same focusing location along the optical axis of the diffractive optical element. FIG. 17 is an example diffractive optical element with a continuous phase profile showing different regions with different phase profiles, according to some embodiments of the present disclosure. The phase profile in FIG. 17 corresponds to the conceptual design depicted in FIG. 16. Focusing two wavelengths at a same location on the optical axis can be realized by designing regions I and II according to Eq. 5 and setting $f_1$ equal to $f_2$.

Figures 18A, 18B:
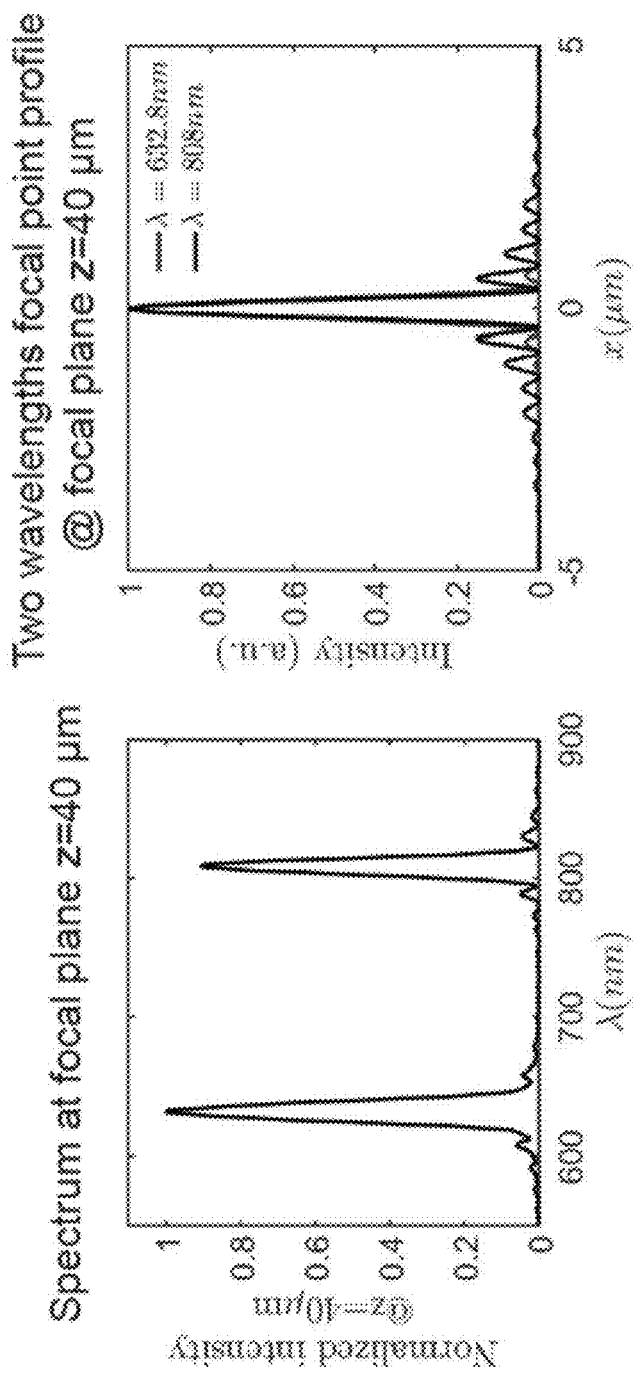
FIGS. 18A-B illustrate simulation results for a diffractive optical element designed in accordance with the concept of FIG. 16.

FIG. 18A illustrates a spectral response of a diffractive optical element, designed in accordance with the concept in FIG. 16, on a focusing plane (z=40 µm). The spectral response shows that the diffractive optical element can select for two wavelength bands. FIG. 18B illustrates a transverse intensity distribution of the focused radiation on the focusing plane. The two wavelengths 632.8 µm and 808 µm waveforms are shown to overlap, indicating that both are present at the same focusing location on the focusing plane.

In other applications, diffractive optical elements designed in accordance with the concept of FIG. 16 have potential in enhancing fluorescent molecule absorption and emission transitions or several emission transitions simultaneously. Multi-band high-efficiency focusing can be used to enhance spectroscopic detection of fluorescent molecules. This is a very important problem that currently limits the resolution of imaging and detection techniques with ramifications from bio-photonics to medical diagnostics. The diffractive optical element when using concepts associated with axilenses provide a larger focal depth which leads to enhancement of a larger volume of fluorescent molecules. In its essence it consists in the fact that many currently available fluorescent or laser molecules efficiently absorb radiation over multiple spectral bands that are well-separated from their emission bands, i.e. have a large Stokes shift. This feature normally precludes the possibility to simultaneously enhance, with great selectivity, several absorption and emission transitions. Moreover, standard excitation approaches rely on white light illumination using traditional lenses with small depth of focusing, which limits the excitation efficiency and gives rise to significant heating losses in deployed platforms.

Embodiments of the present disclosure can solve this problem by simultaneously focusing over larger focusing volumes only radiation of designed spectral bands. This approach enables more efficient excitation schemes compared to broadband focusing and offers yet-unexplored opportunities to resonantly enhance both absorption and emission transitions on demand.

Figure 19A:
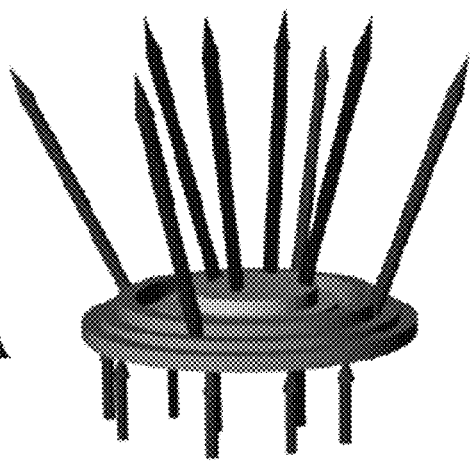
FIG. 19A is a conceptual image of a diffractive optical element that can focus incident wavelengths at two frequency bands on a focusing plane.
Figure 19B:
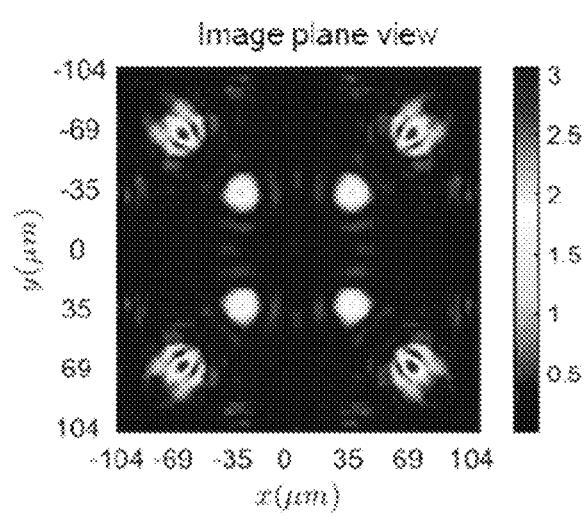
FIG. 19B illustrates diffractive intensities of a diffractive optical element, designed in accordance with the concept of FIG. 19A, on a focusing plane.
Figure 19C:
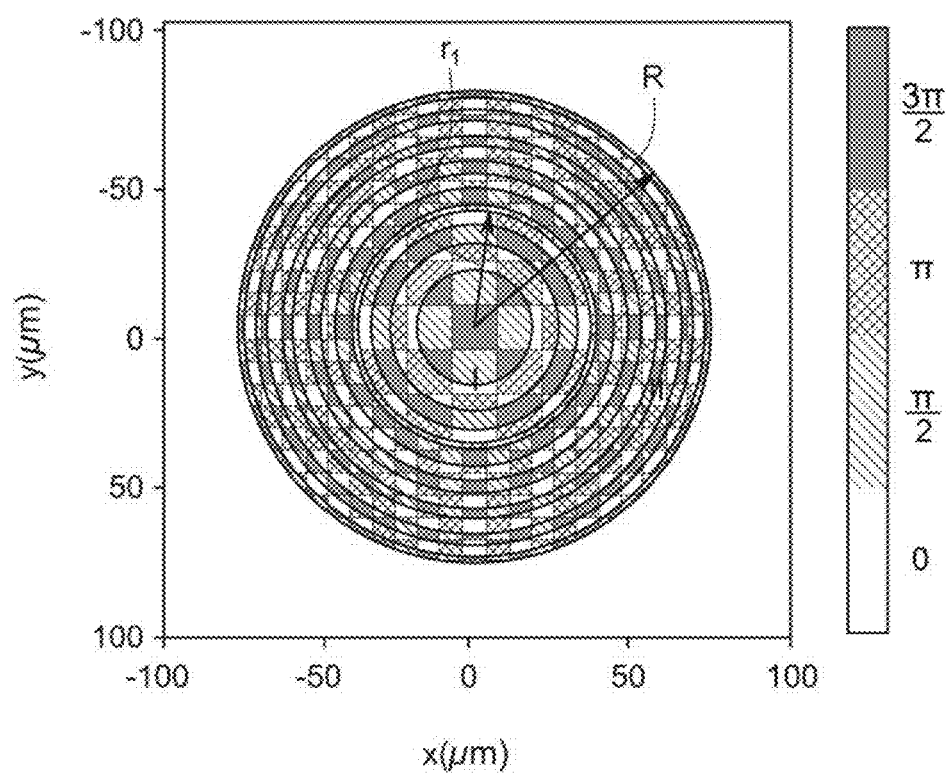
FIG. 19C depicts regions I and II showing different two dimensional grating periodicities, according to some embodiments of the present disclosure.

FIG. 19A is a conceptual image of a diffractive optical element that can focus incident wavelengths at two frequency bands on a focusing plane. A diffractive optical element can be designed to exhibit behavior of FIG. 19A by setting $f_1$ equal to $f_2$ and $\lambda_1$ equal to $\lambda_2$. Regions I and II are defined differently in that region I has a two dimensional phase modulation with a first periodicity $p_1$ and region. II has a two dimensional phase modulation with a second periodicity $p_2$. In some implementations, the first periodicity $p_1$ is greater than the second periodicity $p_2$. As discussed in connection with FIG. 10C, separation of focal locations of different incident wavelengths on a focusing plane is greater with a smaller periodicity. As such, selecting a higher periodicity for region II and a low periodicity for region I will cause eight focus locations to be present on the focusing plane as illustrated in FIG. 19B. An example configuration illustrating regions I and II are shown in FIG. 19C.

Total size of diffractive optical elements according to embodiments of the present disclosure can be increased or decreased to customize focusing efficiency, device footprint, and/or collection area. In some embodiments, size can be scaled by up to multiple orders of magnitude (e.g., two orders of magnitude, five orders of magnitude, etc.), in some embodiments, size is scaled in ratio with a targeted wavelength range. Focusing efficiencies for each wavelength band can be changed by tuning different phase profile region area ratios.

Figure 20A:
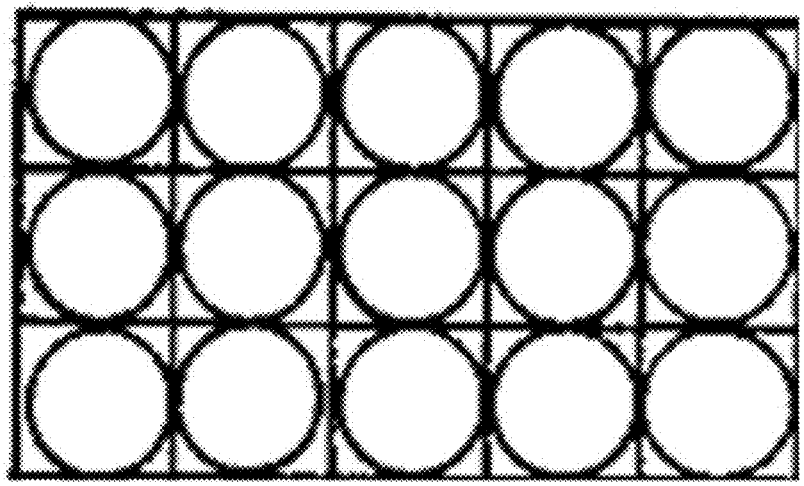
FIGS. 20A-C illustrate different ways of tiling diffractive optical elements according to some embodiments of the present disclosure.
Figure 20B:
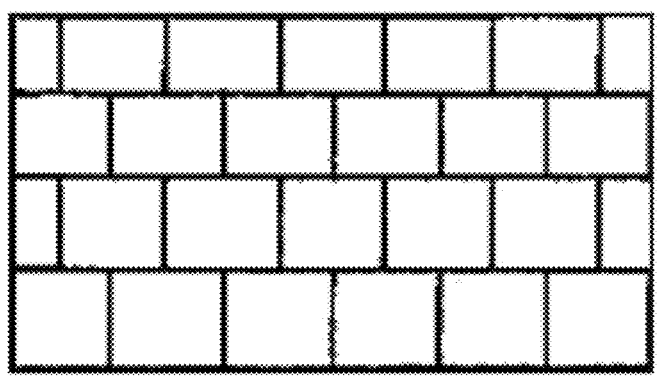
Figure 20C:
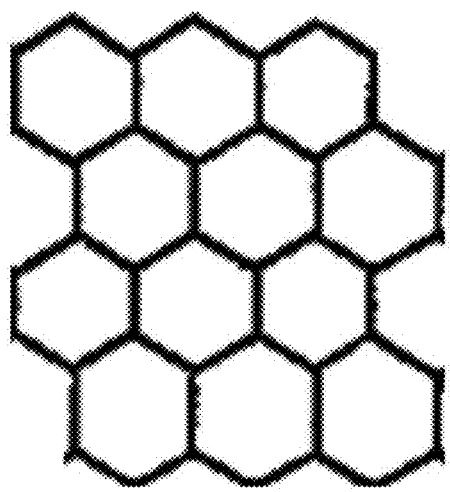
Figure 21:
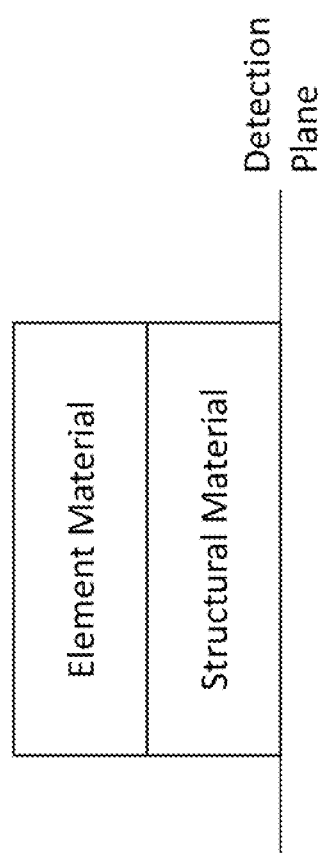
FIG. 21 illustrates a substrate according to some embodiments of the present disclosure.

FIGS. 20A-C illustrate different ways of tiling diffractive optical elements according to some embodiments of the present disclosure. In FIG. 20A, circular diffractive optical elements can be tiled periodically to form, for example, an optical array. In FIG. 20B, rectangular diffractive optical elements can be tiled in a bricklike manner to form an optical array. In FIG. 20C, hexagonal diffractive optical elements can be tiled to form an optical array.

Embodiments of the present disclosure provide multilevel diffractive optical elements based on a concept of dual-band multi-focal lenses. In some implementations, the multilevel diffractive optical elements are characterized by two concentric annular regions with tailored spatial frequency distributions that, upon illumination with a white light or polychromatic spectrum, will focus selected chromatic components, or individual wavelength bands, at designed locations along the optical axis of the multilevel diffractive optical element. This behavior departs from traditional multifocal lenses that generate multiple longitudinal (i.e., along the optical axis) focal spots at the same wavelength. In contrast, multilevel diffractive optical elements according to some implementations of the present disclosure controls focusing behavior of different spectral bands simultaneously.

Embodiments of the present disclosure provide novel types of multi-level diffractive optical elements (or multi-level phase modulated axilenses) that can focus the incident radiation at prescribed locations on a detection plane. Focal locations (or focal spots) are steered by the diffractive optical elements in proportion to the wavelength of the incoming radiation incident on the diffractive optical elements. Since focal location on a single detector plane is controlled by the wavelength of the incident radiation, diffractive optical elements according to embodiments of the present disclosure enable multi-color imaging and spectroscopy using conventional infrared photodetector arrays. Embodiments of the present disclosure can be implemented using fully-dielectric (transparent) materials and 4-level phase discretization layouts that yield large (>80%) diffraction efficiency and field enhancement values greater than 10. Embodiments of the present disclosure can be used in a photosensitive pixel array to focus radiation of different colors over different (spatially separated) pixels with negligible cross talk and high multi-spectral efficiency.

Embodiments of the present disclosure can be directly fabricated on the back substrate layer of a pixel detector array and can focus radiation of different colors through the substrate and on different pixels on the photodetector plane, thus enabling multi-spectral capabilities. Embodiments of the present disclosure are directly applicable to infrared detector technology with primary wavelengths in the range of 3 to 10 microns. The frequency can flexibly be scaled to different operational ranges where spectroscopic applications are targeted. Embodiments of the present disclosure are material-agnostic since any transparent dielectric material within the range of operational wavelengths can be used.

Embodiments of the present disclosure provide a compact, high-efficiency, integrated solution that con bines diffractive axilenses and wavelength-selective rating capabilities in a single optical device. In some implementations, this is achieved by spatially modulating the optical phase according to periodic or aperiodic (chirp) functions that enable focused beam steering in direct proportion to wavelength of incoming radiation.

Embodiments of the present disclosure enables focusing of incident radiation with different wavelengths on at different spatial locations on a same detection plane without defocusing effects. Multi-level phase discretization can be used to makes fabrication easier when compared to a continuous phase profile. Improved performances can be achieved using a different discretization levels at the cost of fabrication ease. In some implementations, embodiments of the present disclosure target infrared spectral regions (7 to 10 microns). Generally, embodiments of the present disclosure can be scaled to different wavelengths by reducing or increasing a size of the diffractive elements within the range of 50 nm to 50 microns.

Some embodiments of the present disclosure provide novel ultra-compact high index phase-modulated axilens devices, which combine efficient point focusing and grating selectivity within scalable multi-level phase mask configurations. The proposed axilens devices are polarization insensitive, maintain a large focusing efficiency over a broad spectral band, and demonstrate linear control of multi-wavelength focusing with a large depth of focus on a single achromatic plane. Those features enable ultra-compact single lens spectrometers and multifunctional imaging systems suited for monolithic integration atop the substrate layers of sensors and detector arrays, such as focal plane arrays and CCD for a number of applications ranging from spectral sorting to multispectral imaging and detection.

Some embodiments of the present disclosure provide multifunctional and compact diffractive microlenses with sub-wavelength thickness and the capability to simultaneously focus two or more separate spectral bands at two or more different focal positions along the optical axis with large focusing efficiency. High-index and low-loss dielectric materials are utilized to enabling sub-wavelength thicknesses. Moreover, the proposed flat lens concept is polarization insensitive and can be readily designed to operate across any desired wavelength regime. Imaging under broadband illumination with independent focal planes for two targeted spectral bands was experimentally demonstrated, enabling the encoding of the depth information of a sample into different spectral images. In addition, the proposed multifunctional and compact diffractive microlenses can be readily integrated with vertical detector arrays to simultaneously concentrate and spectrally select electromagnetic radiation. This provides opportunities for spectroscopic and multispectral imaging systems with advanced detector architectures.

ALTERNATIVE IMPLEMENTATIONS

Alternative implementation 1. An optical element comprising: (a) a substrate having a top surface and a bottom surface; (b) a pattern provided on the top surface, the pattern including multiple levels such that a thickness of the pattern is less than a design wavelength, wherein the pattern is configured to focus an incident radiation received at one of the top surface or the bottom surface of the substrate at one or more prescribed focal locations on a detection plane, wherein the one or more prescribed focal locations on the detection plane changes in proportion to a wavelength of the incident radiation, and wherein the detection plane is an achromatic focal plane when the incident radiation includes multiple wavelengths.

Alternative implementation 2. The optical element according to alternative implementation 1 wherein the pattern further includes transverse phase modulations such that when the incident radiation includes the multiple wavelengths, the one or more prescribed focal locations on the detection plane are two or more prescribed focal locations on the detection plane.

Alternative implementation 3. The optical element according to any one of alternative implementations 1 or 2, wherein the wavelength of the incident radiation includes one or more wavelengths within a transparency window of a material of the substrate.

Alternative implementation 4. The optical element according to any one of alternative implementations 1 to 3, wherein the pattern further includes a periodic phase modulation of an axilens such that when the incident radiation includes one wavelength, the one or more prescribed focal locations on the detection plane are two prescribed focal locations on the detection plane.

Alternative implementation 5. The optical element according to any one of alternative implementations 1 to 3, wherein the pattern further includes a periodic phase modulation of an axilens such that when the incident radiation includes one wavelength, the one or more prescribed focal locations on the detection plane are four prescribed focal locations on the detection plane.

Alternative implementation 6. The optical element according to any one of alternative implementations 1 to 5, wherein the detection plane is parallel to the optical element and substantially transverse to a direction of the incident radiation.

Alternative implementation 7. The optical element according to alternative implementation 6, wherein the detection plane is provided on the bottom surface of the substrate.

Alternative implementation 8. The optical element according to any one of alternative implementation 1, 2, 3, 6 or 7, wherein the pattern with multiple levels is a pattern with four levels, the pattern including a periodic phase modulation of an axilens.

Alternative implementation 9. The optical element according to alternative implementation 8, wherein the periodic phase modulation of the axilens is in one dimension or two dimensions.

Alternative implementation 10. The optical element according to any one of alternative implementation 8 or 9, wherein periodicity of the periodic phase modulation determines the one or more prescribed focal locations on the detection plane associated with a first wavelength and a second wavelength of the incident radiation, such that (i) decreasing the periodicity increases a separation between a prescribed focal location associated with the first wavelength and a prescribed focal location associated with the second wavelength, and (ii) increasing the periodicity decreases the separation between the prescribed focal location associated with the first wavelength and the prescribed focal location associated with the second wavelength.

Alternative implementation 11. The optical element according to any one of alternative implementations 8 to 10, wherein each period of the periodic phase modulation varies in size and spacing such that the periodic phase modulation represents a chirped function.

Alternative implementation 12. The optical element according to any one of alternative implementations 1 to 11, wherein the pattern has a continuous phase profile in the perpendicular or longitudinal direction.

Alternative implementation 13. The optical element according to any one of alternative implementations 1 to 11, wherein the pattern has a discrete phase profile along the multiple levels such that the multiple levels are two levels, four levels, six levels, eight levels, sixteen levels, sixty-four levels, or one hundred and twenty-eight levels.

Alternative implementation 14. The optical element according to any one of alternative implementations 1 to 13, wherein the substrate comprises a structural material and an element material, the pattern being provided on the element material and the element material comprising a transparent high-index material.

Alternative implementation 15. The optical element according to alternative implementation 14, wherein the element material is a thin film deposited or grown on the structural material, the structural material being one of a transparent high-index material or a transparent low-index material.

Alternative implementation 16. The optical element according to any one of alternative implementations 1 to 15, further including an antireflective coating provided on the top surface or the bottom surface of the substrate.

Alternative implementation 17. An optical array including multiple optical elements according to any one of alternative implementations 1 to 16, the multiple optical elements arranged in a periodic or an aperiodic pattern.

Alternative implementation 18. An optical element comprising: (a) a substrate having a top surface and a bottom surface; (b) a pattern provided on the top surface, the pattern including multiple levels such that a thickness of the pattern is less than a design wavelength; wherein the pattern is configured to focus an incident radiation received at one of the top surface or the bottom surface of the substrate at one or more prescribed focal locations on an optical axis of the optical element, wherein each of the one or more prescribed focal locations is associated with a corresponding wavelength of the incident radiation.

Alternative implementation 19. The optical element according to alternative implementation 18, wherein the one or more prescribed focal locations on the optical axis is one focal location on the optical axis, such that the pattern is configured to focus selected wavelengths of the incident radiation at the one focal location.

Alternative implementation 20. The optical element according to alternative implementation 18, wherein the one or more prescribed focal locations on the optical axis are two prescribed focal locations on the optical axis.

Alternative implementation 21. The optical element according to alternative implementation 20, wherein the two prescribed focal locations include a first prescribed focal location and a second prescribed focal location, the first prescribed focal location designated for a first band of wavelengths and the second prescribed focal location designated for a second hand of wavelengths, wherein the first band of wavelengths and the second band of wavelengths do not overlap.

Alternative implementation 22. The optical element according to any one of alternative implementations 18 to 21, wherein die pattern includes a first region having a phase profile designed according to a first wavelength and a second region having a phase profile designed according to a second wavelength, the first wavelength and the second wavelength being different wavelengths.

Alternative implementation 23. The optical element according to alternative implementation 22, wherein a thickness of the first region is different than a thickness of the second region.

Alternative implementation 24. The optical element according to alternative implementation 22, wherein a thickness of the first region is equal to a thickness of the second region.

Alternative implementation 25. The optical element according to alternative implementation 24, wherein the design wavelength has a value between the first wavelength and the second wavelength and the thickness of the first region and the second region is determined based on the design wavelength such that lithographic process steps are reduced during manufacturing.

Alternative implementation 26. The optical element according to any one of alternative implementations 22 to 25, wherein focusing efficiency for the first wavelength and the second wavelength is based on a ratio of an area of the first region to an area of the second region.

Alternative implementation 27. The optical element according to any one of alternative implementations 22 to 26, wherein intensity enhancement for the first wavelength and the second wavelength is based on a ratio of an area of the first region to an area of the second region.

Alternative implementation 28. The optical element according to any one of alternative implementation 18 to 27, wherein the pattern includes a first region with a first modulation periodicity and a second region with a second modulation periodicity, the first modulation periodicity and the second modulation periodicity being different values.

Alternative implementation 29. The optical element according to alternative implementation 28, wherein the first region with the first modulation periodicity includes two dimensional periodic modulations and the second region with the second modulation periodicity includes two dimensional periodic modulations.

Alternative implementation 30. The optical element according to any one of alternative implementations 18 to 29, further comprising an antireflective coating provided on the top surface or the bottom surface of the substrate.

Alternative implementation 31. An optical array comprising multiple optical elements according to any one of alternative implementations 18 to 30, the multiple optical elements arranged in a periodic or an aperiodic pattern.

Alternative implementation 32. A method for manufacturing a multi-level diffractive optical element, comprising: (a) lithographic patterning a first mask on a top surface of a substrate; (b) etching a pattern of the first mask onto the top surface of the substrate to create a first layer and a second layer on the top surface of the substrate; (c) removing the first mask from the first layer or the second layer; (d) lithographic patterning a second mask on the first layer and the second layer; and (e) etching a pattern of the second mask into the first layer and the second layer to create a third layer from etched portions of the first layer and a fourth layer from etched portions of the second layer.

Alternative implementation 33. The method of alternative implementation 32 wherein a lithographic resist thickness increases with successive lithographic patterning steps.

Alternative implementation 34. The method of any one of alternative implementation 32 or 33, wherein the first mask and the second mask are adjusted to remove features smaller than a minimum lithographic resolution.

Alternative implementation 35. The method of any one of alternative implementations 32 to 34, wherein the first mask includes a checkered pattern with concentric circular gratings.

Alternative implementation 36. The method of any one of alternative implementations 32 to 35, wherein the second mask includes concentric circles.

Alternative implementation 37. The method of any one of alternative implementations 32 to 36, wherein the substrate comprises a structural material and an element material, wherein the element material is a thin film material and the top surface of the substrate being a surface of the thin film material.

The terminology used herein is for the purpose of describing particular embodiments only, and is not intended to be limiting of the invention. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising."

Unless otherwise defined, terms (including technical and scientific terms) used herein have the same meaning as commonly understood by one of ordinary skill in the art. Furthermore, terms, such as those defined in commonly used dictionaries, should be interpreted as having a meaning that is consistent with their meaning in the context of the relevant art, and will not be interpreted in an idealized or overly formal sense unless expressly so defined herein.

While various embodiments of the present invention have been described above, it should be understood that they have been presented by way of example only, and not limitation. Numerous changes to the disclosed embodiments can be made in accordance with the disclosure herein, without departing from the spirit or scope of the invention. Thus, the breadth and scope of the present invention should not be limited by any of the above described embodiments. Rather, the scope of the invention should be defined in accordance with the following claims and their equivalents.

What is claimed is:

1. An optical element comprising:
a substrate having a top surface and a bottom surface;
a pattern provided on the top, surface, the pattern including multiple phase discretization levels such that a thickness of the pattern is less than a design wavelength, the pattern having a spatial distribution of dielectric elements with engineered thicknesses and shapes that implement a phase transformation $\phi_m(p, \lambda, r, f_0, \Delta f, R, N)$ on a phase $\phi_{ax}$ of an axilens according to the expression $\phi_{ax}(r)+\phi_m(p, \lambda, r, f_0, \Delta f, R, N)$, where $$\phi_{ax}(r) = -\frac{2\pi}{\lambda}\left[\sqrt{\left(f_0 + \frac{r\Delta f}{R}\right)^2 + r^2} - \left(f_0 + \frac{r\Delta f}{R}\right)\right]\bigg|_{2\pi},$$

p is the vector period of the modulation phase function, $\lambda$ is the design wavelength, $r=\sqrt{x^2+y^2}$, $f_0$ is the focal length, $\Delta f$ is the focal depth, and R is the maximum radius of the axilens, and N is the number of phase discretization levels,
wherein the pattern is configured to focus an incident radiation received at one of the top surface or the bottom surface of the substrate at one or more prescribed focal locations on a detection plane, wherein the one or more prescribed focal locations on the detection plane changes in proportion to a wavelength of the incident radiation, and wherein the detection plane is an achromatic focal plane when the incident radiation includes multiple wavelengths.

2. The optical element according to claim 1, wherein the pattern includes transverse phase modulations defined by the vector period, such that when the incident radiation includes the multiple wavelengths, the one or more prescribed focal locations on the detection plane are two or more prescribed focal locations on the detection plane.

3. The optical element according to claim 1, wherein the wavelength of the incident radiation includes one or more wavelengths within a transparency window of a material of the substrate.

4. The optical element according to claim 1, wherein the phase transformation $\phi_m(p, \lambda, r, f_0, \Delta f, R)$ on the phase $\phi_{ax}$ of the axilens is periodic such that when the incident radiation on the pattern includes one wavelength, the one or more prescribed focal locations on the detection plane are two prescribed focal locations on the detection plane.

5. The optical element according to claim 1, wherein the phase transformation $\phi_m(p, \lambda, r, f_0, \Delta f, R)$ on the phase $\phi_{ax}$ of the axilens is periodic such that when the incident radiation on the pattern includes one wavelength, the one or more prescribed focal locations on the detection plane are four prescribed focal locations on the detection plane.

6. The optical element according to claim 1, wherein the detection plane is provided on the bottom surface of the substrate.

7. The optical element according to claim 1, wherein the pattern with multiple levels is a pattern with four levels.

8. The optical element according to claim 1, wherein the period of the modulation phase function is in one dimension or in two dimensions.

9. The optical element according to claim 1, wherein the period of the modulation phase function determines the one or more prescribed focal locations on the detection plane associated with a first wavelength and a second wavelength of the incident radiation, such that (i) decreasing the period increases a separation between a prescribed focal location associated with the first wavelength and a prescribed focal location associated with the second wavelength, and (ii) increasing the period decreases the separation between the prescribed local location associated with the first wavelength and the prescribed, focal location associated with the second wavelength.

10. The optical element according to claim 1, wherein the phase transformation $\phi_m(p, \lambda, r, f_0, \Delta f, R)$ on the phase $\phi_{ax}$ of the axilens represents a chirped function with each period of the chirped function varying in size and spacing.

11. The optical element according to claim 1, wherein the pattern has a discrete phase profile along the multiple levels such that the multiple levels are two levels, four levels, six levels, eight levels, sixteen levels, sixty-four levels, or one hundred and twenty-eight levels.

12. The optical element according to claim 1, wherein the substrate comprises a structural material and an element material, the pattern being provided on the element material and the element material comprising a transparent high refractive index material.

13. The optical element according to claim 12, wherein the element material is a thin film deposited or grown on the structural material, the structural material being one of a transparent high refractive index material or a transparent low refractive index material.

14. The optical element according to claim 1, further comprising:
an antireflective coating provided on the top surface or the bottom surface of the substrate.

15. An optical element comprising:
a substrate having a top surface and a bottom surface; and
a pattern provided on the top surface, the pattern including multiple phase discretization levels such that a thickness of the pattern is less than a design wavelength, the pattern having a spatial distribution of dielectric elements with engineered thicknesses and shapes that implement a phase transformation $\phi_m(p, \lambda(r), r, f_0(r), \Delta f(r), R, N)$ on a phase $\phi_{ax}$ of an axilens according to the expression $\phi_{ax}(r) + \phi_m(p, \lambda(r), r, f_0(r), \Delta f(r), R, N)$, where $$\phi_{ax}(r) = -\frac{2\pi}{\lambda(r)}\left[\sqrt{\left(f_0(r) + \frac{r\Delta f(r)}{R}\right)^2 + r^2} - \left(f_0(r) + \frac{r\Delta f(r)}{R}\right)\right]\Bigg\|_{2\pi},$$

p is the vector period of the modulation phase function, $\lambda(r)$ is the design wavelength, $r=\sqrt{x^2+y^2}$, $f_0(r)$ is the focal length as a function of r, $\Delta f(r)$ is the focal depth as a function of r, R is the maximum radius of the axilens, and N is the number of phase discretization levels,
wherein the pattern is configured to focus an incident radiation received at one of the top surface or the bottom surface of the substrate at one or more prescribed focal locations on an optical axis of the optical element, wherein each of the one or more prescribed focal locations is associated with a corresponding wavelength of the incident radiation.

16. The optical element according to claim 15, wherein the one or more prescribed focal locations on the optical axis is one focal location on the optical axis, such that the pattern is configured to focus selected wavelengths of the incident radiation at the one focal location.

17. The optical element according to claim 15, wherein the one or more prescribed focal locations on the optical axis are two prescribed focal locations on the optical axis.

18. The optical element according to claim 17, wherein the two prescribed focal locations include a first prescribed focal location and a second prescribed focal location, the first prescribed focal location designated for a first band of wavelengths and the second prescribed focal location designated for a second band of wavelengths, wherein the first band of wavelengths and the second band of wavelengths do not overlap.

19. The optical element according to claim 15, wherein the pattern includes a first region having a phase profile designed according to a first wavelength and a second region having a phase profile designed according to a second wavelength, the first wavelength and the second wavelength being different wavelengths.

20. The optical element according to claim 19, wherein a thickness of the first region is different from a thickness of the second region.

21. The optical element according to claim 19, wherein a thickness of the first region is equal to a thickness of the second region.

22. The optical element according to claim 21, wherein the design wavelength has a value between the first wavelength and the second wavelength and the thickness of the first region and the second region is determined based on the design wavelength such that lithographic process steps are reduced during manufacturing.

23. The optical element according to claim 21, wherein focusing efficiency tor the first wavelength and the second wavelength is based on a ratio of an area of the first region to an area of the second region.

24. The optical element according to claim 21, wherein intensity enhancement for the first wavelength and the second wavelength is based on a ratio of an area of the first region to an area of the second region.

25. The optical element according to claim 15, wherein the pattern includes a first region with a first modulation periodicity defined by the vector period and a second region with a second modulation periodicity defined by the vector period, the first modulation periodicity and the second modulation periodicity being different values.

26. The optical element according to claim 25, wherein the first region includes two dimensional periodic modulations and the second region includes two dimensional periodic modulations.

27. The optical element according to claim 15, further comprising:
antireflective coating provided on the top surface or the bottom surface of the substrate.

28. A method for manufacturing a multi-level diffractive optical element, comprising:
lithographic patterning a first mask on a top surface of a substrate;
etching a pattern of the first mask onto the top surface of the substrate to create a first layer and a second layer on the top surface of the substrate;
removing the first mask from the first layer or the second layer;
lithographic patterning a second mask on the first layer and the second layer; and
etching a pattern of the second mask into the first layer and the second layer to create a third layer from etched portions of the first layer and a fourth layer from etched portions of the second layer, the combination of the created first layer, the second layer, the third layer, and the fourth layer forming a pattern on the top surface of the substrate, the pattern on the top surface of the substrate having a spatial distribution of dielectric elements with engineered thicknesses and shapes that implement a phase transformation $\phi_m(p, \lambda, r, f_0, \Delta f, R, N)$ on a phase $\phi_{ax}$ of an axilens according to the expression $\phi_{ax}(r)+\phi_m(p, \lambda, r, f_0, \Delta f, R, N)$, where $$\phi_{ax}(r) = -\frac{2\pi}{\lambda}\left[\sqrt{\left(f_0 + \frac{r\Delta f}{R}\right)^2 + r^2} - \left(f_0 + \frac{r\Delta f}{R}\right)\right]\bigg|_{2\pi},$$

p is the vector period of the modulation phase function, $\lambda$ is the design wavelength, $r=\sqrt{x^2+y^2}$, $f_0$ is the focal length, $\Delta f$ is the focal depth, and R is the maximum radius of the axilens, and N is the number of phase discretization levels.

* * * * *

UNITED STATES PATENT AND TRADEMARK OFFICE
CERTIFICATE OF CORRECTION

PATENT NO. : 10,996,383 B2
APPLICATION NO. : 16/870741
DATED : May 4, 2021
INVENTOR(S) : Dal Negro et al.

Page 1 of 1

It is certified that error appears in the above-identified patent and that said Letters Patent is hereby corrected as shown below:

At Column 29, Line 31 (Claim 9, Line 10), please delete "prescribed local location associated with the first wavelength" and insert --prescribed focal location associated with the first wavelength-- therefor.

At Column 30, Line 55 (Claim 23, Line 2), please delete "focusing efficiency tor the first wavelength" and insert --focusing efficiency for the first wavelength-- therefor.

At Column 31, Line 7 (Claim 27, Line 3), please delete "antireflective coating provided on the top surface" and insert --an antireflective coating provided on the top surface-- therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*